(12) United States Patent
Miller et al.

(10) Patent No.: US 7,462,123 B2
(45) Date of Patent: *Dec. 9, 2008

(54) CONTINUOUSLY VARIABLE PLANETARY GEAR SET

(75) Inventors: Donald C Miller, Fallbrook, CA (US); David J Allen, Soquel, CA (US); Robert A Smithson, Cedar Park, TX (US)

(73) Assignee: Fallbrook Technologies Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,849

(22) Filed: Aug. 7, 2007

(65) Prior Publication Data

US 2007/0287579 A1 Dec. 13, 2007

Related U.S. Application Data

(63) Continuation of application No. 10/949,741, filed on Sep. 24, 2004, now Pat. No. 7,261,663, which is a continuation-in-part of application No. 10/844,821, filed on May 12, 2004, now Pat. No. 7,166,052, which is a continuation of application No. 10/788,736, filed on Feb. 26, 2004, now Pat. No. 7,011,600.

(60) Provisional application No. 60/537,938, filed on Jan. 21, 2004, provisional application No. 60/512,600, filed on Oct. 16, 2003, provisional application No. 60/494,376, filed on Aug. 11, 2003.

(51) Int. Cl.
*F16H 15/26* (2006.01)

(52) U.S. Cl. .............................. 475/5; 476/38; 903/918; 903/951

(58) Field of Classification Search ...................... 475/5, 475/10; 476/36–39; 903/909, 918
See application file for complete search history.

(56) References Cited

U.S. PATENT DOCUMENTS

| | | | |
|---|---|---|---|
| 719,595 | A | 2/1903 | Huss |
| 1,121,210 | A | 12/1914 | Techel |
| 1,175,677 | A | 3/1916 | Barnes |
| 1,380,006 | A | 5/1921 | Nielson |
| 1,629,902 | A | 5/1927 | Arter et al. |
| 1,858,696 | A | 5/1932 | Weiss |

(Continued)

FOREIGN PATENT DOCUMENTS

CH 118064 12/1926

(Continued)

*Primary Examiner*—Tisha D Lewis
(74) *Attorney, Agent, or Firm*—Knobbe, Martens, Olson & Bear LLP

(57) ABSTRACT

A continuously variable planetary gear set is described having a generally tubular idler, a plurality of balls distributed radially about the idler, each ball having a tiltable axis about which it rotates, a rotatable input disc positioned adjacent to the balls and in contact with each of the balls, a rotatable output disc positioned adjacent to the balls opposite the input disc and in contact with each of the balls such that each of the balls makes three-point contact with the input disc, the output disc and the idler, and a rotatable cage adapted to maintain the axial and radial position of each of the balls, wherein the axes of the balls are oriented by the axial position of the idler.

20 Claims, 22 Drawing Sheets

U.S. PATENT DOCUMENTS

| | | |
|---|---|---|
| 1,903,228 A | 3/1933 | Thomson |
| 2,060,884 A | 11/1936 | Madle |
| 2,086,491 A | 7/1937 | Dodge |
| 2,112,763 A | 3/1938 | Cloudsley |
| 2,152,796 A | 4/1939 | Erban |
| 2,209,254 A | 7/1940 | Ahnger |
| 2,469,653 A | 5/1949 | Kopp |
| 2,596,538 A | 5/1952 | Dicke |
| 2,675,713 A | 4/1954 | Acker |
| 2,730,904 A | 1/1956 | Rennerfelt |
| 2,868,038 A | 1/1959 | Billeter |
| 2,913,932 A | 11/1959 | Oehru |
| 2,931,234 A | 4/1960 | Hayward |
| 2,931,235 A | 4/1960 | Hayward |
| 2,959,063 A | 11/1960 | Perry |
| 2,959,972 A | 11/1960 | Madson |
| 3,184,983 A | 5/1965 | Kraus |
| 3,216,283 A | 11/1965 | General |
| 3,248,960 A | 5/1966 | Schottler |
| 3,273,468 A | 9/1966 | Allen |
| 3,280,646 A | 10/1966 | Lemieux |
| 3,487,726 A | 1/1970 | Burnett |
| 3,487,727 A | 1/1970 | Gustafsson |
| 3,661,404 A | 5/1972 | Bossaer |
| 3,695,120 A | 10/1972 | Titt |
| 3,707,888 A | 1/1973 | Schottler |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,891,235 A | 6/1975 | Shelly |
| 3,954,282 A | 5/1976 | Hege |
| 3,984,129 A | 10/1976 | Hege |
| 3,996,807 A | 12/1976 | Adams |
| 4,169,609 A | 10/1979 | Zampedro |
| 4,177,683 A | 12/1979 | Moses |
| 4,227,712 A | 10/1980 | Dick |
| 4,382,186 A | 5/1983 | Cronin |
| 4,382,188 A * | 5/1983 | Cronin .................. 290/1 C |
| 4,391,156 A | 7/1983 | Tibbals |
| 4,459,873 A | 7/1984 | Black |
| 4,464,952 A | 8/1984 | Stubbs |
| 4,496,051 A | 1/1985 | Ortner |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,700,581 A | 10/1987 | Tibbals, Jr. |
| 4,735,430 A | 4/1988 | Tomkinson |
| 4,744,261 A | 5/1988 | Jacobson |
| 4,756,211 A | 7/1988 | Fellows |
| 4,856,374 A | 8/1989 | Kreuzer |
| 4,857,035 A | 8/1989 | Anderson |
| 4,869,130 A | 9/1989 | Wiecko |
| 4,900,046 A | 2/1990 | Aranceta-Angoitia |
| 4,909,101 A | 3/1990 | Terry |
| 4,961,477 A | 10/1990 | Sweeney |
| 5,020,384 A | 6/1991 | Kraus |
| 5,037,361 A | 8/1991 | Takahashi |
| 5,069,655 A | 12/1991 | Schivelbusch |
| 5,121,654 A | 6/1992 | Fasce |
| 5,125,677 A | 6/1992 | Ogilvie et al. |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,273,501 A | 12/1993 | Scheivelbusch |
| 5,318,486 A | 6/1994 | Lutz |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,451,070 A | 9/1995 | Lindsay et al. |
| 5,508,574 A | 4/1996 | Vlock |
| 5,601,301 A | 2/1997 | Liu |
| 5,645,507 A | 7/1997 | Hathaway |
| 5,651,750 A | 7/1997 | Imanishi et al. |
| 5,690,346 A | 11/1997 | Keskitalo |
| 5,746,676 A | 5/1998 | Kawase et al. |
| 5,846,155 A | 12/1998 | Taniguchi et al. |
| 5,899,827 A | 5/1999 | Nakano et al. |
| 5,967,933 A | 10/1999 | Valdenaire |
| 5,984,826 A | 11/1999 | Nakano |
| 6,000,707 A | 12/1999 | Miller |
| 6,045,481 A | 4/2000 | Kumagai |
| 6,053,833 A | 4/2000 | Masaki |
| 6,053,841 A | 4/2000 | Kolde et al. |
| 6,066,067 A | 5/2000 | Greenwood |
| 6,071,210 A | 6/2000 | Kato |
| 6,095,940 A | 8/2000 | Ai et al. |
| 6,119,539 A | 9/2000 | Papanicolaou |
| 6,119,800 A | 9/2000 | McComber |
| 6,159,126 A | 12/2000 | Oshidan |
| 6,186,922 B1 | 2/2001 | Bursal et al. |
| 6,241,636 B1 | 6/2001 | Miller |
| 6,243,638 B1 | 6/2001 | Abo et al. |
| 6,322,475 B2 | 11/2001 | Miller |
| 6,325,386 B1 | 12/2001 | Shoge |
| 6,340,067 B1 | 1/2002 | Fujiwara |
| 6,390,946 B1 | 5/2002 | Hibi et al. |
| 6,406,399 B1 | 6/2002 | Xioalan |
| 6,419,608 B1 | 7/2002 | Miller |
| 6,461,268 B1 | 10/2002 | Milner |
| 6,499,373 B2 | 12/2002 | Van Cor |
| 6,551,210 B2 | 4/2003 | Miller |
| 6,575,047 B2 | 6/2003 | Reik et al. |
| 6,676,559 B2 | 1/2004 | Miller |
| 6,679,109 B2 | 1/2004 | Gierling et al. |
| 6,689,012 B2 | 2/2004 | Miller |
| 6,805,654 B2 | 10/2004 | Nishii |
| 6,931,316 B2 | 8/2005 | Joe et al. |
| 6,945,903 B2 | 9/2005 | Miller |
| 6,949,049 B2 | 9/2005 | Miller |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,086,979 B2 | 8/2006 | Frenken |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |

| | | |
|---|---|---|
| 7,175,565 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,219 B2 | 5/2007 | Miller |
| 7,232,395 B2 | 6/2007 | Miller et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,246,672 B2 | 7/2007 | Shirai et al. |
| 7,250,018 B2 | 7/2007 | Miller et al. |
| 7,261,663 B2 | 9/2007 | Miller et al. |
| 7,275,610 B2 | 10/2007 | Kuang et al. |
| 2001/0008192 A1 | 7/2001 | Morisawa |
| 2003/0022753 A1 | 1/2003 | Mizuno et al. |
| 2003/0221892 A1 | 12/2003 | Matsumoto et al. |
| 2005/0079948 A1 | 4/2005 | Miller et al. |
| 2005/0178893 A1 | 8/2005 | Miller et al. |
| 2005/0227809 A1 | 10/2005 | Bitzer et al. |
| 2005/0255957 A1 | 11/2005 | Miller et al. |
| 2006/0084549 A1 | 4/2006 | Smithson et al. |
| 2006/0108956 A1 | 5/2006 | Clark |
| 2006/0180363 A1 | 8/2006 | Uchisasai |
| 2007/0041823 A1 | 2/2007 | Miller |
| 2007/0049450 A1 | 3/2007 | Miller |
| 2007/0142161 A1 | 6/2007 | Miller |
| 2007/0155567 A1 | 7/2007 | Miller et al. |
| 2007/0155580 A1 | 7/2007 | Nichols et al. |
| 2007/0167274 A1 | 7/2007 | Miller |
| 2007/0167276 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller et al. |
| 2007/0197337 A1 | 8/2007 | Miller et al. |

FOREIGN PATENT DOCUMENTS

| | | |
|---|---|---|
| CN | 1157379 A | 8/1997 |
| DE | 498 701 | 5/1930 |
| DE | 2 310880 | 9/1974 |
| DE | 2 136 243 | 1/1975 |
| DE | 39 40 919 A1 | 6/1991 |
| DE | 10155372 A1 | 5/2003 |
| EP | 0 432 742 | 12/1990 |
| EP | 635639 A1 | 1/1995 |
| EP | 1136724 | 9/2001 |
| EP | 1811202 A1 | 7/2007 |
| FR | 620375 | 4/1927 |
| FR | 2590638 | 5/1987 |
| FR | 2590638 A1 * | 5/1987 |
| GB | 592320 | 9/1947 |
| GB | 906 002 A | 9/1962 |
| GB | 1 376 057 | 12/1974 |
| GB | 2 035 482 | 6/1980 |
| GB | 2 080 452 | 8/1982 |
| JP | 42-2844 | 2/1967 |
| JP | 48-54371 | 7/1973 |
| JP | 51-150380 | 12/1976 |
| JP | 47-20535 | 8/1977 |
| JP | 53 048166 | 1/1978 |
| JP | 55-135259 | 4/1979 |
| JP | 59069565 | 4/1984 |
| JP | 63219953 | 9/1988 |
| JP | 02157483 | 6/1990 |
| JP | 02271142 | 6/1990 |
| JP | 52-35481 | 9/1993 |
| JP | 08170706 A | 7/1996 |
| JP | 09024743 A * | 1/1997 |
| JP | 411063130 | 3/1999 |
| JP | 2004162652 A | 6/2004 |
| JP | 8-247245 | 9/2004 |
| JP | 2005/240928 A | 9/2005 |
| NE | 98467 | 7/1961 |

\* cited by examiner

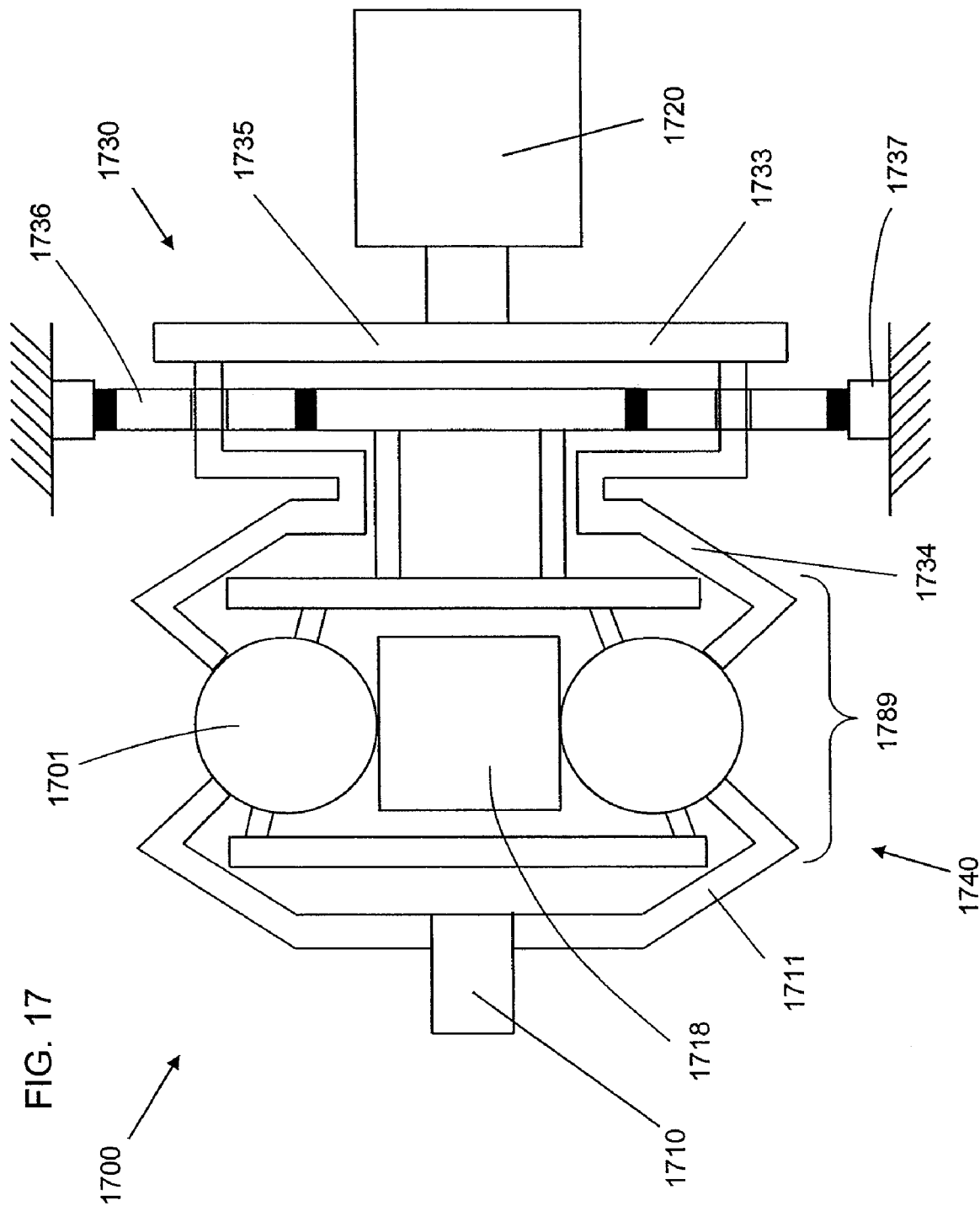

US 7,462,123 B2

CONTINUOUSLY VARIABLE PLANETARY GEAR SET

RELATED APPLICATIONS

This application is a continuation of U.S. patent application Ser. No. 10/949,741, filed Sep. 24, 2004, which is a continuation-in-part of U.S. application Ser. No. 10/844,821, filed May 12, 2004, which claims priority to U.S. Provisional Application No. 60/494,376 filed Aug. 11, 2003, U.S. Provisional Application No. 60/512,600 filed Oct. 16, 2003, U.S. Provisional Application 60/537,938 filed Jan. 21, 2004. U.S. application Ser. No. 10/844,821 is also a continuation of U.S. patent application Ser. No. 10/788,736, filed Feb. 26, 2004. Each of the above identified applications is hereby incorporated by reference in its entirety.

This application is related to U.S. patent application Ser. No. 11/834,903, U.S. patent application Ser. No. 11/834,928, U.S. patent application Ser. No. 11/834,865, U.S. patent application Ser. No. 11/834,881, U.S. patent application Ser. No. 11/834,879, U.S. patent application Ser. No. 11/834,857, U.S. patent application Ser. No. 11/834,970, U.S. patent application Ser. No. 11/834,895, U.S. patent application Ser. No. 11/834,875, U.S. patent application Ser. No. 11/835,005, and U.S. patent application Ser. No. 11/834,919, all filed on even date and which are hereby incorporated by reference in their entirety.

This application is also related to U.S. Pat. No. 7,166,052, issued on Jan. 23, 2007, U.S. Pat. No. 7,214,149, issued on May 8, 2007, U.S. Pat. No. 7,217,215, issued on May 15, 2007, U.S. Pat. No. 7,198,582, issued on Apr. 3, 2007, U.S. Pat. No. 7,201,693, issued on Apr. 10, 2007, U.S. Pat. No. 7,201,695, issued on Apr. 10, 2007, U.S. Pat. No. 7,204,777, issued on Apr. 17, 2007, U.S. Pat. No. 7,198,584, issued on Apr. 3, 2007, U.S. Pat. No. 7,198,583, issued on Apr. 3, 2007, and U.S. Pat. No. 7,201,694, issued on Apr. 10, 2007.

This application is also related to U.S. Pat. No. 7,011,600, issued on Mar. 14, 2006, U.S. Pat. No. 7,036,620, issued on May 2, 2006, U.S. Pat. No. 7,232,395, issued on Jun. 19, 2007, U.S. Pat. No. 7,125,297, issued on Oct. 24, 2006, U.S. Pat. No. 7,198,585, issued on Apr. 3, 2007, U.S. Pat. No. 7,166,056, issued on Jan. 23, 2007, U.S. Pat. No. 7,235,031, issued on Jun. 26, 2007, U.S. Pat. No. 7,169,076, issued on Jan. 30, 2007, U.S. patent application Ser. No. 11/030,372, filed on Jan. 5, 2005, U.S. patent application Ser. No. 11/030,415, filed on Jan. 5, 2005, U.S. patent application Ser. No. 11/030,624, filed on Jan. 5, 2005, U.S. patent application Ser. No. 11/030,442, filed on Jan. 5, 2005, U.S. patent application Ser. No. 11/030,211, filed on Jan. 5, 2005, U.S. patent application Ser. No. 11/030,627, filed on Jan. 5, 2005, and U.S. patent application Ser. No. 11/176,545, filed on Jul. 7, 2005.

BACKGROUND OF THE INVENTION

1. Field of the Invention

The field of the invention relates generally to transmissions, and more particularly the invention relates to continuously variable planetary gear sets that can be used in transmissions as well as other industrial and land, air and waterborne vehicles.

2. Description of the Related Art

In order to provide a continuously variable transmission, various traction roller transmissions, in which power is transmitted through traction rollers supported in a housing between torque input and output discs, have been developed. In such transmissions, the traction rollers are mounted on support structures which, when pivoted, cause the engagement of traction rollers with the torque discs in circles of varying diameters depending on the desired transmission ratio.

However, the success of these traditional solutions has been limited. For example, in one solution, a driving hub for a vehicle with a variable adjustable transmission ratio is disclosed. This method teaches the use of two iris plates, one on each side of the traction rollers, to tilt the axis of rotation of each of the rollers. However, the use of iris plates can be very complicated due to the large number of parts that are required to adjust the angular position of the iris plates during shifting of the transmission. Another difficulty with this transmission is that it has a guide ring that is configured to be predominantly stationary in relation to each of the rollers. Since the guide ring is stationary, shifting the axis of rotation of each of the traction rollers is difficult.

A key limitation of this design and improvements of this design is the absence of means for generating and adequately controlling the axial force acting as normal contact force to keep the input disc and output disc in sufficient frictional contact against the balls as the speed ratio of the transmission changes. Due to the fact that rolling traction continuously variable transmissions require various magnitudes of axial force at various torque levels and speeds in order to prevent the driving and driven rotating members from slipping on the speed changing friction balls, where a constant level of axial force is applied, excessive force is applied when torque transmission levels are lower. This excessive axial force lowers efficiency and causes the transmission to fail significantly faster than if the proper amount of force was applied for any particular gear ratio. The excessive force also makes it more difficult to shift the transmission. Improvements in the field of axial force production have been made but further advances are required.

Further improvements have been developed for the increased performance and efficiency of continuously variable transmissions. There is a need to incorporate these improvements into an advanced design for a continuously variable transmission.

SUMMARY OF INVENTION

The systems and methods illustrated and described herein have several features, no single one of which is solely responsible for its desirable attributes. Without limiting the scope as expressed by the description that follows, its more prominent features will now be discussed briefly. After considering this discussion, and particularly after reading the section entitled "Detailed Description of the Preferred Embodiments" one will understand how the features of the system and methods provide several advantages over traditional systems and methods.

In a first embodiment a power-assisted steering system is described, comprising a steering wheel, an elongated steering shaft connected at a first end to the steering wheel and connected at a second end to a pinion of a rack and pinion steering assembly, a motor that provides rotational power, a plurality of balls distributed radially about the steering shaft, each ball having a tiltable axis about which it rotates, a rotatable input disc positioned adjacent to the balls and in contact with each of the balls, a rotatable output disc positioned adjacent to the balls opposite the input disc and in contact with each of the balls, a rotatable idler coaxial and rotatable about the steering shaft and positioned radially inward of and in contact with each of the balls, and a tubular output shaft positioned coaxially about the steering shaft and connected at a first end to the output disc and connected at a second end to the pinion. In this embodiment, the axes of the balls are collectively responsive to an angular orientation of the steering shaft and are adapted to orient the balls in order to convert the rotational power of the motor to an output torque that is transmitted through the output disc to the output shaft in response to a change in the angular orientation of the steering shaft.

In some of these embodiments, a cage is described that is adapted to maintain a radial and axial orientation of the balls about the idler, wherein the cage is adapted to rotate about the steering shaft. In some embodiments the input disc is fixed and does not rotate and the motor is coupled to the cage.

An alternative embodiment is described further comprising; a planetary gear set, which comprises a sun gear rotatable about the steering shaft and coupled to the cage, a plurality of planet positioned about, engaged with and each of which orbit the sun gear, wherein each planet gear rotates a planet shaft of its own, a ring gear that surrounds the planet gears and engages each planet gear at each planet gears furthest radial position from the steering shaft, and a generally annular planet carrier which is rotatable about and coaxial with the steering shaft and which retains and positions each of the planet shafts. In some of these alternative embodiments, the motor is connected to the planet carrier and the planet shafts each extend from the planet carrier and terminate at a connection point with the input disc so that the planet carrier rotates the planets about the sun gear and rotates the input disc about the steering shaft.

Some steering system embodiments comprise a tubular shifter having a first end that is dynamically attached to the idler, the shifter being angularly aligned with the steering shaft and a second end that engages the output shaft and is positioned axially by the output shaft such that any rotation of the steering shaft with respect to the output shaft moves the shifter axially, which in turn moves the idler axially, and wherein the axes of the balls are controlled by the axial position of the idler. Other alternative embodiments of the steering system are also described.

In another embodiment, a four wheeled vehicle steering system is described that comprises four variable speed wheel transmissions, each adapted to provide torque to one wheel, wherein each of the wheel transmissions comprising, a longitudinal axis, a plurality of balls distributed radially about the longitudinal axis, each ball having a tiltable axis about which it rotates, a rotatable input disc positioned adjacent to the balls and in contact with each of the balls, a rotatable output disc positioned adjacent to the balls opposite the input disc and in contact with each of the balls, and a rotatable idler coaxial about the longitudinal axis and positioned radially inward of and in contact with each of the balls. These embodiments also comprise a plurality of torque supplies, one for each transmission, that are adapted to provide a separate input to each wheel transmission, and a control system adapted to independently control the axial position of each of the idlers in response to a request by an operator and thereby shift a transmission ratio of each of the wheel transmissions independently such that the wheels of the vehicle can turn at different rates causing the vehicle to turn.

Some alternative embodiments of the four wheel steering system further comprise a planetary gear set mounted about the longitudinal axis of each of the wheel transmissions.

In yet another embodiment, a hybrid vehicle is described comprising; a first source of rotational energy, a second source of rotational energy, and a transmission adapted to accept rotationally energy from both the first and second sources. In many of these embodiments the transmission comprises a longitudinal axis, a plurality of balls distributed radially about the longitudinal axis, each ball having a tiltable axis about which it rotates, a rotatable input disc positioned adjacent to the balls and in contact with each of the balls, a rotatable output disc positioned adjacent to the balls opposite the input disc and in contact with each of the balls, a rotatable idler coaxial about the longitudinal axis and positioned radially inward of and in contact with each of the balls, and a rotatable cage adapted to maintain the axial and radial position of each of the balls. In such embodiments, the first source supplies rotational energy to the cage and the second energy source supplies rotational energy to the input disc. In some embodiments of the hybrid vehicle, the first source of rotational energy is an internal combustion engine and the second source of rotational energy is an electric motor.

Some of the embodiments of the hybrid vehicle are described as further comprising an axial force generator adapted to generate a contact force between the input disc, the output disc, the balls and the idler that is proportional to an amount of torque to be transmitted by the transmission. The axial force generator of some embodiments comprises; a bearing disc coaxial with and rotatable about the longitudinal axis having an outer diameter and an inner diameter and having a threaded bore formed in its inner diameter, a plurality of perimeter ramps attached to a first side of the bearing disc near its outer diameter, a plurality of bearings adapted to engage the plurality of bearing disc ramps, a plurality of input disc perimeter ramps mounted on the input disc on a side opposite of the balls adapted to engage the bearings, a generally cylindrical screw coaxial with and rotatable about the longitudinal axis and having male threads formed along its outer surface, which male threads are adapted to engage the threaded bore of the bearing disc, a plurality of central screw ramps attached to an end of the screw facing the speed adjusters, and a plurality of central input disc ramps affixed to the input disc and adapted to engage the plurality of central screw ramps.

In still other embodiments, a variable planetary gear set is described comprising; a generally tubular idler, a plurality of balls distributed radially about the idler, each ball having a tiltable axis about which it rotates, a rotatable input disc positioned adjacent to the balls and in contact with each of the balls, a rotatable output disc positioned adjacent to the balls opposite the input disc and in contact with each of the balls such that each of the balls makes three-point contact with the input disc, the output disc and the idler, and a rotatable cage adapted to maintain the axial and radial position of each of the balls. In such embodiments, the axes of the balls are oriented by the axial position of the idler.

Some embodiments of the planetary gear set are describe such that the cage further comprises; an input stator support in the general shape of a disc positioned between the balls and the input disc, an output stator support in the general shape of a disc positioned between the balls and the output disc, and a plurality of spacers adapted to extend between and rigidly connect the input stator and output stator.

Some embodiments of the planetary gear set further comprise an axial force generator adapted to provide a contact force between the input disc, the output disc, the balls and the idler that is proportional to the amount of torque to be transferred through the gear set. In some of these embodiments, the axial force generator comprises a generally disc-shaped thrust washer that is coaxial with the idler and is positioned near the side of the input disc facing away from the balls having a first side facing the input disc and having a set of thrust ramps formed on the first side, a set of thrust-receiving ramps formed on the input disc facing the thrust washer, and a plurality of thrust elements located between and in contact with the thrust ramps and the thrust-receiving ramps.

BRIEF DESCRIPTION OF THE DRAWINGS

FIG. 17 is a schematic diagram of an embodiment of an infinitely variable transmission illustrating one possible kinematic configuration.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The transmissions and drives described herein are of the type that utilizes speed adjuster balls with axes that tilt as described in U.S. Pat. Nos. 6,241,636, 6,322,475, and 6,419,608. The embodiments described in these patents and those described herein typically have two sides generally separated by a variator portion, to be described below, an input side and an output side. The driving side of the transmission, that is the side that receives the torque or the rotational force into the transmission is termed the input side, and the driven side of the transmission or the side that transfers the torque from the transmission out of the transmission is termed the output side. As a general and abstract description of the operation of the ratio variation of many of the embodiments herein, an input disc and an output disc are in contact with the speed adjuster balls. As the balls tilt on their axes, the point of rolling contact on one disc moves toward the pole or axis of the ball, where it contacts the ball at a circle of decreasing diameter, and the point of rolling contact on the other disc moves toward the equator of the ball, thus contacting the disc at a circle of increasing diameter.

If the axis of the ball is tilted in the opposite direction, the input and output discs respectively experience the converse relationship. In this manner, the ratio of rotational speed of the input disc to that of the output disc, or the transmission ratio, can be changed over a wide range by simply tilting the axes of the speed adjuster balls. As an arbitrary assumption for use herein, the plane connecting the centers of the balls will be considered to define the border between the input side and the output side of the transmission and similar components that are located on both the input side of the balls and the output side of the balls are generally described herein with the same reference numbers. As a convention often used in the following description similar components located on both the input and output sides of the transmission generally have the suffix "a" attached at the end of the reference number if they are located on the input side, and the components located on the output side of the transmission generally have the suffix "b" attached at the end of their respective reference numbers.

Figure 1:
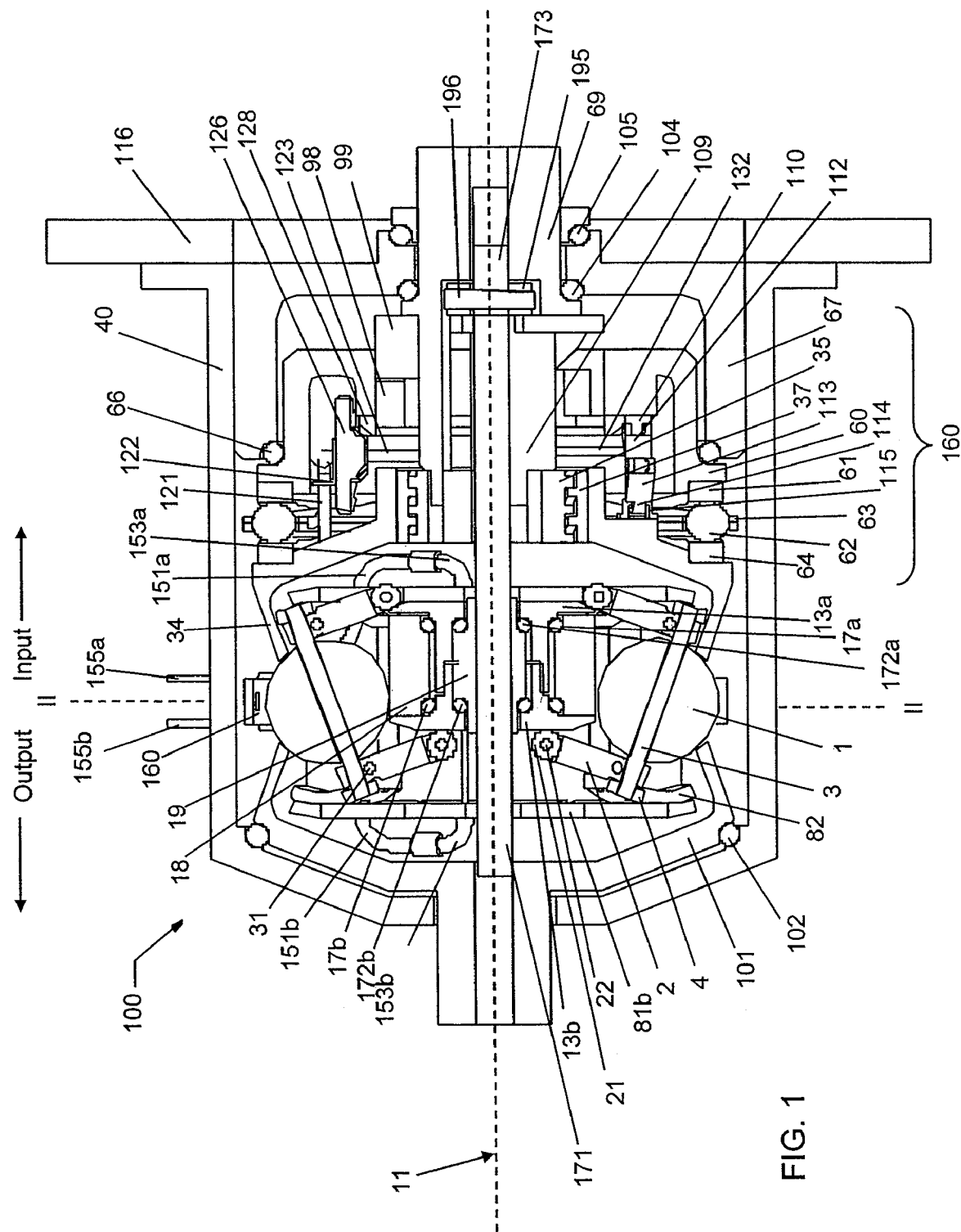
FIG. 1 is a schematic cutaway side view of an embodiment of a transmission shifted into high.
Figure 2:
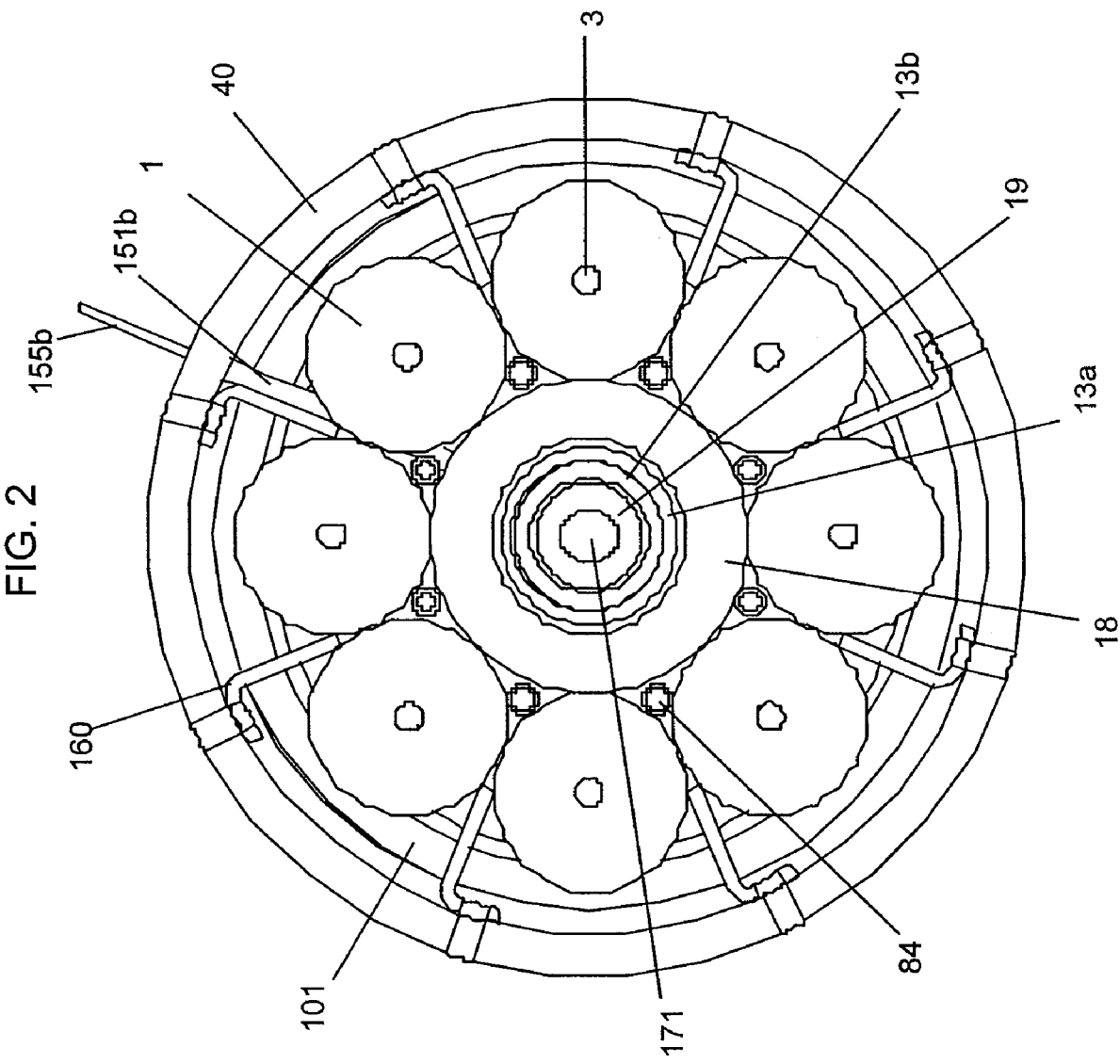
FIG. 2 is a partial cross-sectional view of the transmission taken along line II-II of FIG. 1.

Referring to FIGS. 1 and 2, an embodiment of a transmission 100 is illustrated having a longitudinal axis 11 about which multiple speed adjusting balls 1 are radially distributed. The speed adjusting balls 1 of some embodiments stay in their annular and spatial positions about the longitudinal axis 11, while in other embodiments the balls 1 are free to orbit about the longitudinal axis 11. The balls 1 are contacted on their input side by an input disc 34 and on their output side by an output disc 101. The input and output discs 34, 101 are annular discs extending from an inner bore near the longitudinal axis 11 on their respective input and output sides of the balls 1 to a radial point at which they each make contact with the balls 1. The input and output discs 34, 101 each have a contact surface that forms the contact area between each disc 34 101, and the balls 1. In general, as the input disc 34 rotates about the longitudinal axis 11, each portion of the contact area of the input disc 34 rotates about the longitudinal axis 11 and sequentially contacts each of the balls 1 during each rotation. This is similar for the output disc 101 as well.

Figure 7:
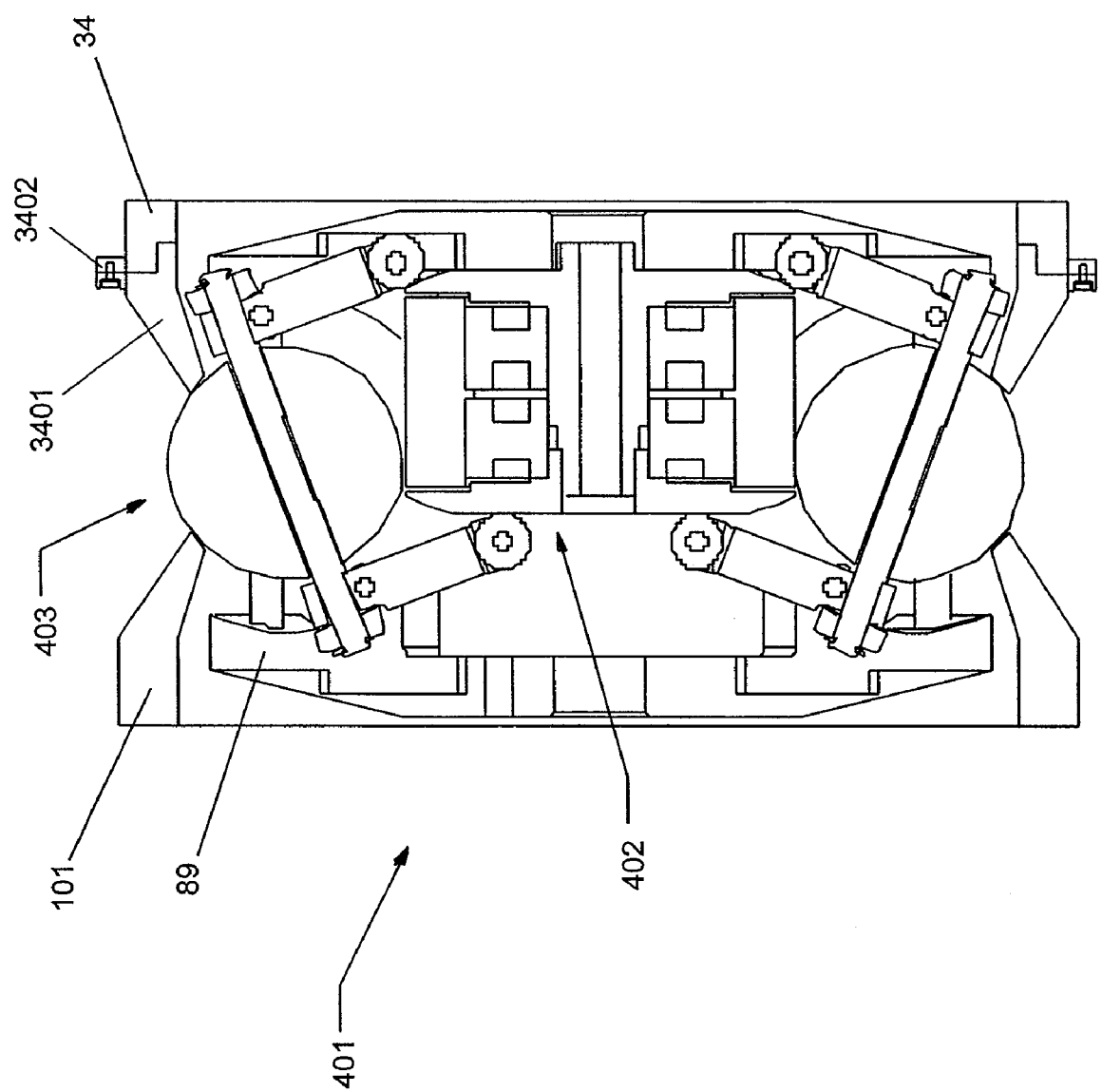
FIG. 7 is a cutaway side view of the variator sub-assembly of the transmission of FIG. 1.

The input disc 34 and the output disc 101 can be shaped as simple discs or can be concave, convex, cylindrical or any other shape, depending on the configuration of the input and output desired. In one embodiment, the input and output discs 34, 101 are spoked to make them lighter for weight sensitive applications, to allow ease of assembly by providing one or more openings wherein access is provided through the input or output disc 34, 101, and to allow fluid, such as lubricant and/or coolant to flow through input and output discs 34, 101. The rolling contact surfaces of the discs 34, 101 where they engage the speed adjuster balls 1 can have a flat, concave, convex or other shaped profile, depending on the torque and efficiency requirements of the application. A concave profile where the discs 34, 101 contact the balls 1 decreases the amount of axial force required to prevent slippage while a convex profile increases efficiency. In some embodiments the contact surface of each of the input and output discs 34, 101 is a separate replaceable component that can be easily removed and replaced. In such embodiments, the contact surface can be a ring made of the appropriate material that is threaded into the rest of the input or output disc 34, 101, while in other embodiments the contact surface has a flange or other attachment surface and is attached by fasteners. The variator 401 embodiment shown in FIG. 7 illustrates an input disc 34 having an input disc 34 that utilizes a separate and detachable disc ring 3401 attached by such a flange assembly. The disc ring 3401 shown in this figure attaches to the input disc 34 via a flange and fastener assembly 3402 consisting of a disc ring flange (not separately identified) that extends from the outer surface of the disc ring 3401, a disc flange (not separately identified) that extends from outer surface of the input disc 34, disc ring fasteners (not separately identified) that connect the disc ring flange to the disc flange and a locating section 3403 that can be used by some embodiments to precisely control the position of the disc ring 3401 with respect to the input disc 34. The locating section 3403 of the illustrated embodiment is made of an outward facing edge formed on the disc ring flange and an inward facing edge formed on the input disc flange, the two of which cooperate to accurately control the radial and axial position of the disc ring 3401 with respect to the input disc 34. The use of the separate contact surface, such as the disc ring 3401 of FIG. 7, reduces cost by allowing for replacement of the contact surface alone while it also allows for the use of less expensive materials for the rest of the input and output discs 34, 101.

Additionally, the balls 1 all contact an idler 18 on their respective radially innermost point. The idler 18 is a generally cylindrical component that rests coaxially about the longitudinal axis 11 and assists in maintaining the radial position of the balls 1. With reference to the longitudinal axis 11 of many embodiments of the transmission, the contact surfaces of the input disc 34 and the output disc 101 can be located generally radially outward from the rotational axes of the balls 1, with the idler 18 located radially inward from the balls 1, so that each ball 1 makes three-point contact with the idler 18, the input disc 34, and the output disc 101. The input disc 34, the output disc 101, and the idler 18 can all rotate about the same longitudinal axis 11 in many embodiments, and are described in fuller detail below. The contact surfaces of the input disc 34, the output disc 101 and the balls 1 can be made of, or treated with, any known compositions or can undergo any known material treatment to promote advantageous material performance characteristics of these components. Such materials and treatments are described more completely below.

FIG. 1 illustrates an embodiment of a continuously variable transmission 100 that is shrouded in a case 40 which protects the transmission 100, contains lubricant, aligns components of the transmission 100, and absorbs forces of the transmission 100. A case cap 67 can, in certain embodiments, cover the open end of the input side of the case 40, which opening allows for assembly of the internal components of the transmission 100. The case cap 67 is generally shaped as a disc with a bore through its center, which allows for passage therethrough of an input shaft 69 as described further below, and that has a set of external threads at its outer diameter that thread into a corresponding set of internal threads on the inner diameter of the case 40. Although in other embodiments, the case cap 67 can be fastened to the case 40 using matching flanges or it can be held in place by a snap ring and a corresponding groove in the case 40, and would therefore not need to be threaded at its outer diameter. In embodiments utilizing fasteners to attach the case cap 67, the case cap 67 extends to the diameter of the case 40 so that case fasteners (not shown) used to bolt the case 40 to the machinery to which the transmission 100 is attached can be passed through corresponding holes in the case cap 67.

The case cap 67 of the embodiment illustrated in FIG. 1 has a cylindrical portion extending from an area near its outer diameter toward the output side of the transmission 100 for additional support of other components of the transmission 100. At the heart of the illustrated transmission 100 embodiment is a plurality of balls 1 that are typically spherical in shape and are radially distributed substantially evenly or symmetrically about the centerline, or longitudinal axis 11 of rotation of the transmission 100. In the illustrated embodiment, eight balls 1 are used. However, it should be noted that more or fewer balls 1 could be used depending on the use of the transmission 100. For example, the transmission may include 3, 4, 5, 6, 7, 8, 9, 10, 11, 12, 13, 14, 15 or more balls 1. The provision for more than 3, 4, or 5 balls 1 can more widely distribute the forces exerted on the individual balls 1 and their points of contact with other components of the transmission 100 and can also reduce the force necessary to prevent the transmission 100 from slipping at the ball 1 contact patches. Certain embodiments in applications with low torque but a high transmission ratio uses few balls 1 of relatively larger diameters, while certain embodiments in applications with high torque and a high transmission ratio can use more balls 1 or relatively larger diameters. Other embodiments, in applications with high torque and a low transmission ratio and where high efficiency is not important, use more balls 1 of relatively smaller diameters. Finally, certain embodiments, in applications with low torque and where high efficiency is not important, use few balls 1 of relatively smaller diameters.

Ball axles 3 are inserted through holes that run through the center of each of the balls 1 to define an axis of rotation for each of the balls 1. The ball axles 3 are generally elongated shafts over which the balls 1 rotate, and have two ends that extend out of either side of the hole through the balls 1. Certain embodiments have cylindrically shaped ball axles 3, although any shape can be used. The balls 1 are mounted to freely rotate about the ball axles 3.

In certain embodiments, bearings (not separately illustrated) are utilized to reduce the friction between the outer surface of the ball axles 3 and the surface of the bore through the corresponding ball 1. These bearings can be any type of bearings situated anywhere along the contacting surfaces of the balls 1 and their corresponding ball axles 3, and many embodiments will maximize the life and utility of such bearings through standard mechanical principles common in the design of dynamic mechanical systems. In some such embodiments, radial bearings are located at each end of the bore through the balls 1. These bearings can incorporate the inner surface of the bore or the outer surface of the ball axles 3 as their races, or the bearings can include separate races that fit in appropriate cavities formed in the bore of each ball 1 and on each ball axle 3. In one embodiment, a cavity (not shown) for a bearing is formed by expanding the bore through each ball 1 at least at both ends an appropriate diameter such that a radial bearing, roller, ball or other type, can be fitted into and held within the cavity thus formed. In another embodiment, the ball axles 3 are coated with a friction reducing material such as babbit, Teflon or other such material. In yet other embodiments, combination bearing races are formed at each exit of the bore through each ball 1 and a corresponding combination bearing race is formed at locations on the ball axles 3 that correspond to the respective races of the ball 1. The combination bearings utilized in such embodiments can be any type of combination bearings and including the types described below.

Many embodiments also minimize the friction between the ball axles 3 and the balls 1 by introducing lubrication in the bore of the ball axles 3. The lubrication can be injected into the bore around the ball axles 3 by a pressure source, or it can be drawn into the bore by forming rifling or helical grooves on the ball axles 3 themselves. Further discussion of the lubrication of the ball axles 3 is provided below.

In FIG. 1, the respective axes of rotation of each of the balls 1 are shown tilted in a direction that puts the transmission in a high ratio, wherein the output speed is greater than the input speed. If the ball axles 3 are horizontal, that is parallel to the longitudinal axis 11 of the transmission 100, the transmission 100 is in a 1:1 input rotation rate to output rotation rate ratio, wherein the input and output rotation speeds are equal.

Figure 3:
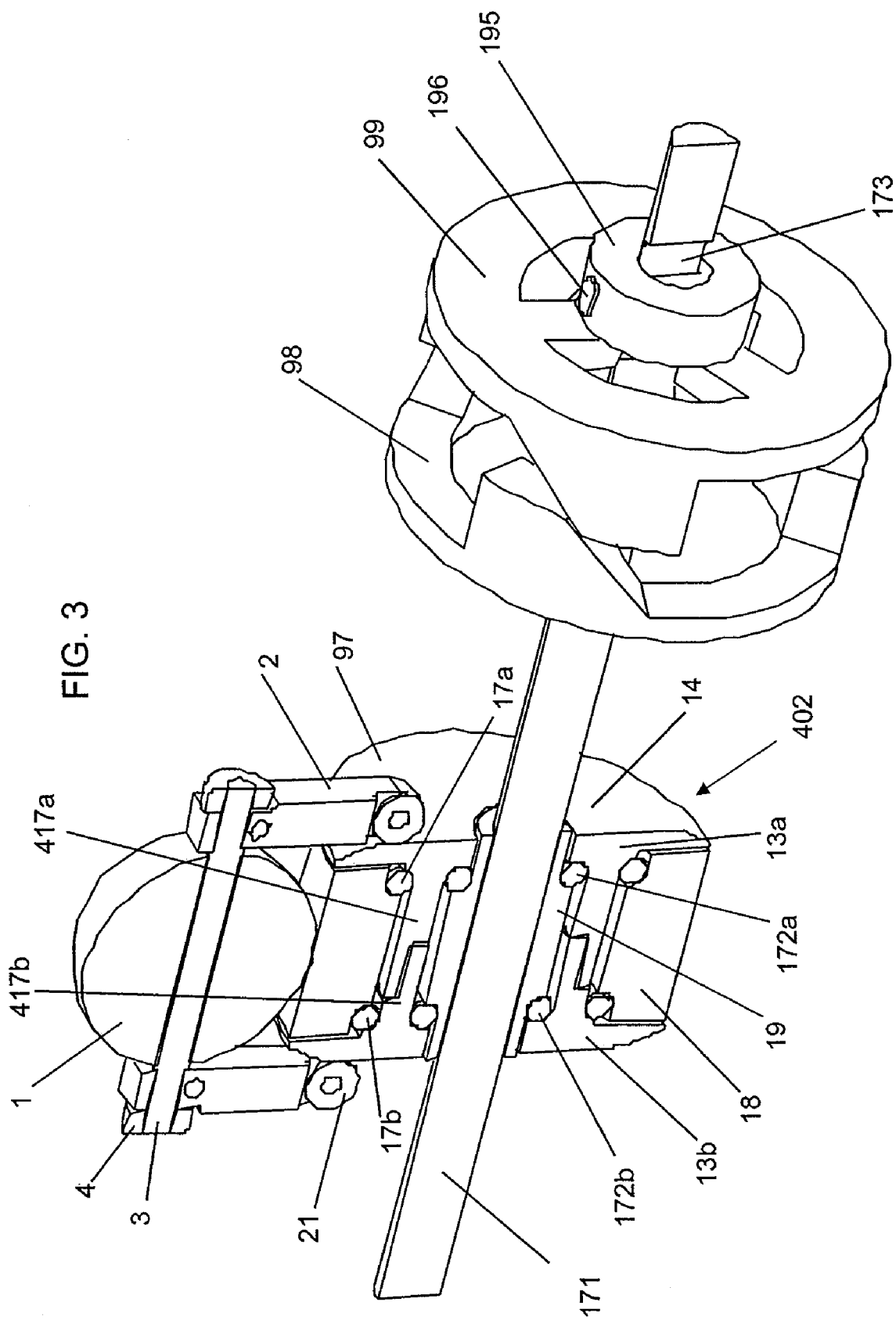
FIG. 3 is a schematic partial cutaway side view of the idler and ramp sub-assembly of the transmission of FIG. 1.
Figure 4:
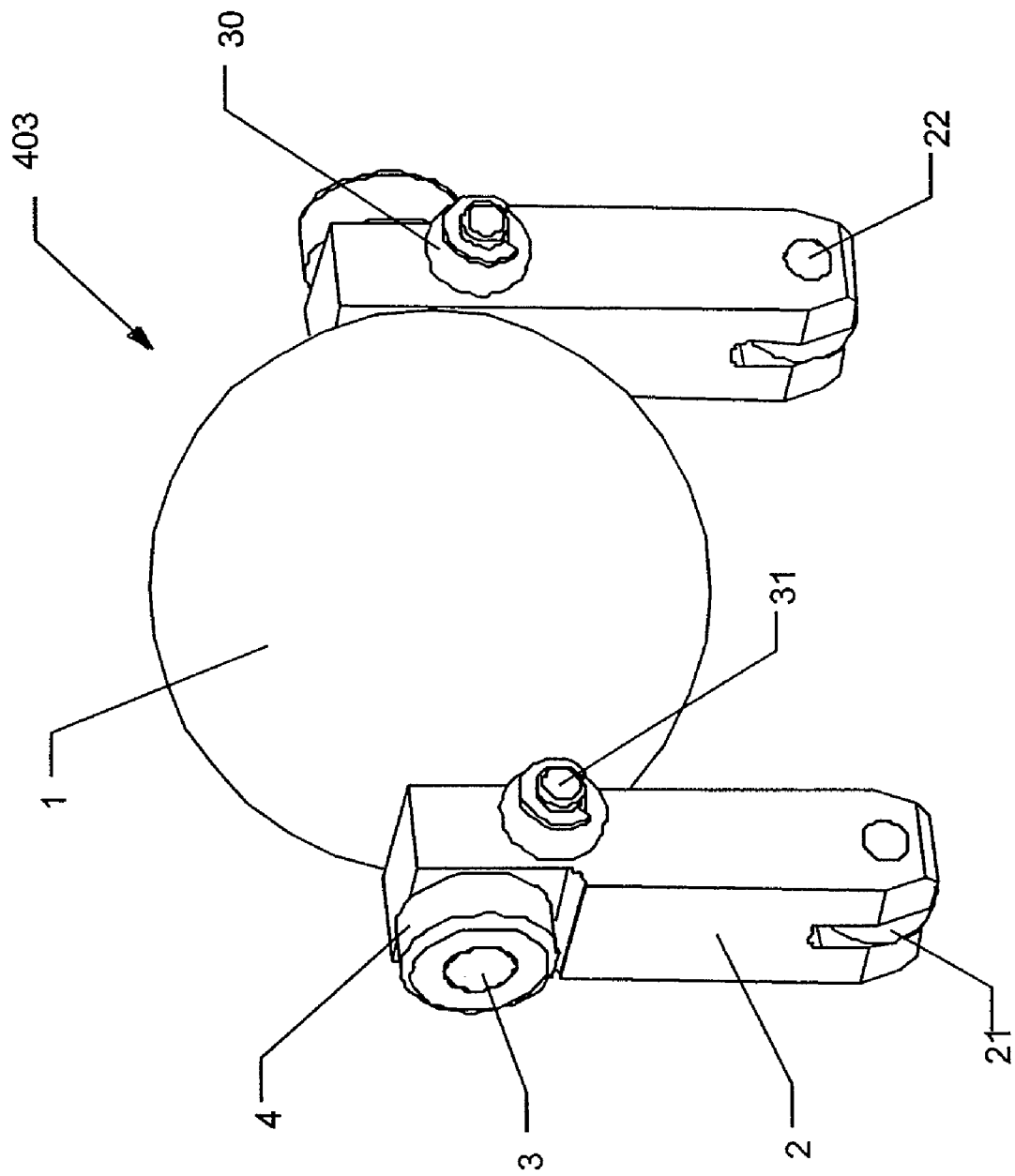
FIG. 4 is a schematic perspective view of the ball sub-assembly of the transmission of FIG. 1.
Figure 5:
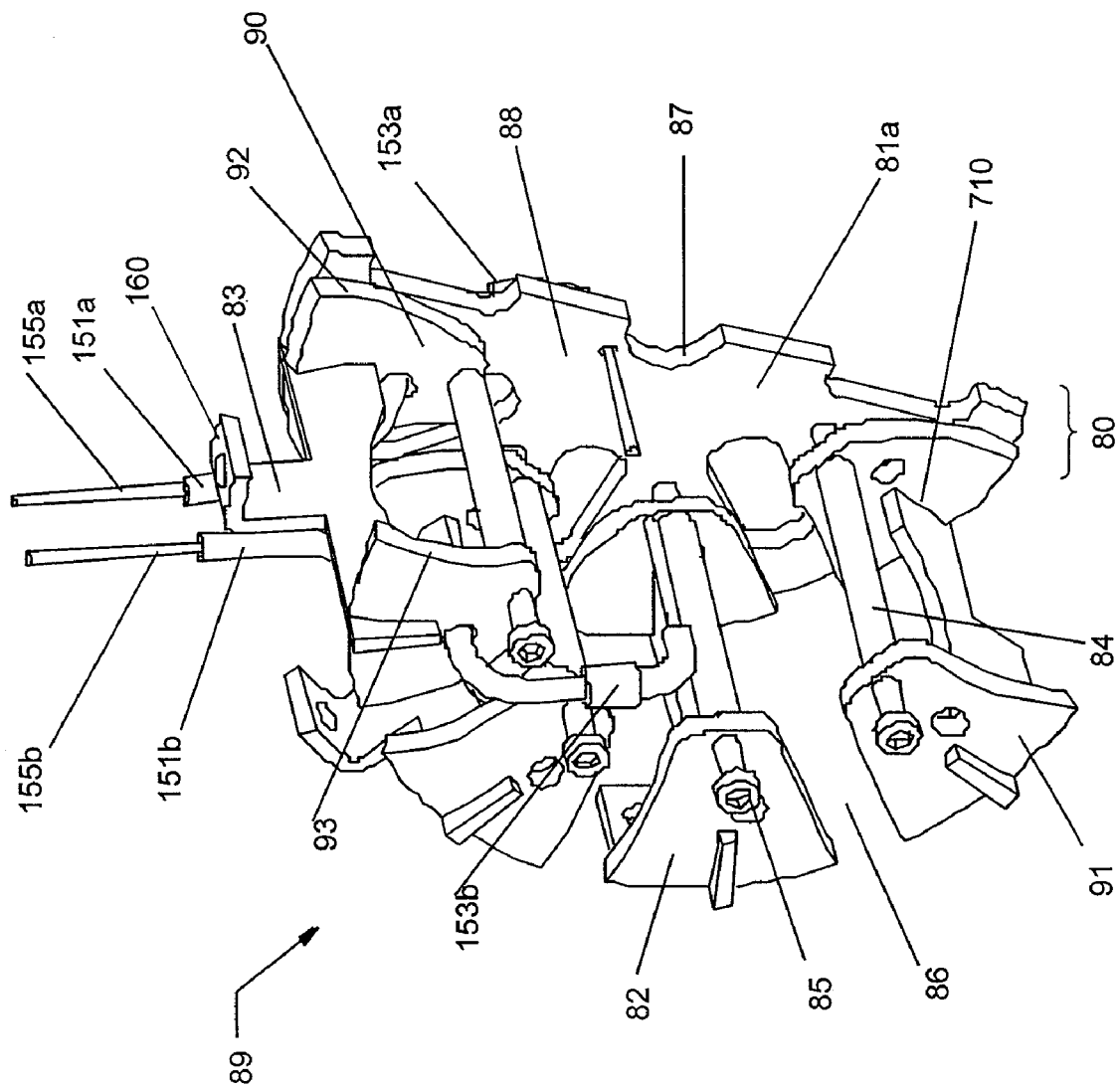
FIG. 5 is a schematic cutaway side view of the cage sub-assembly of the transmission of FIG. 1.
Figure 15:
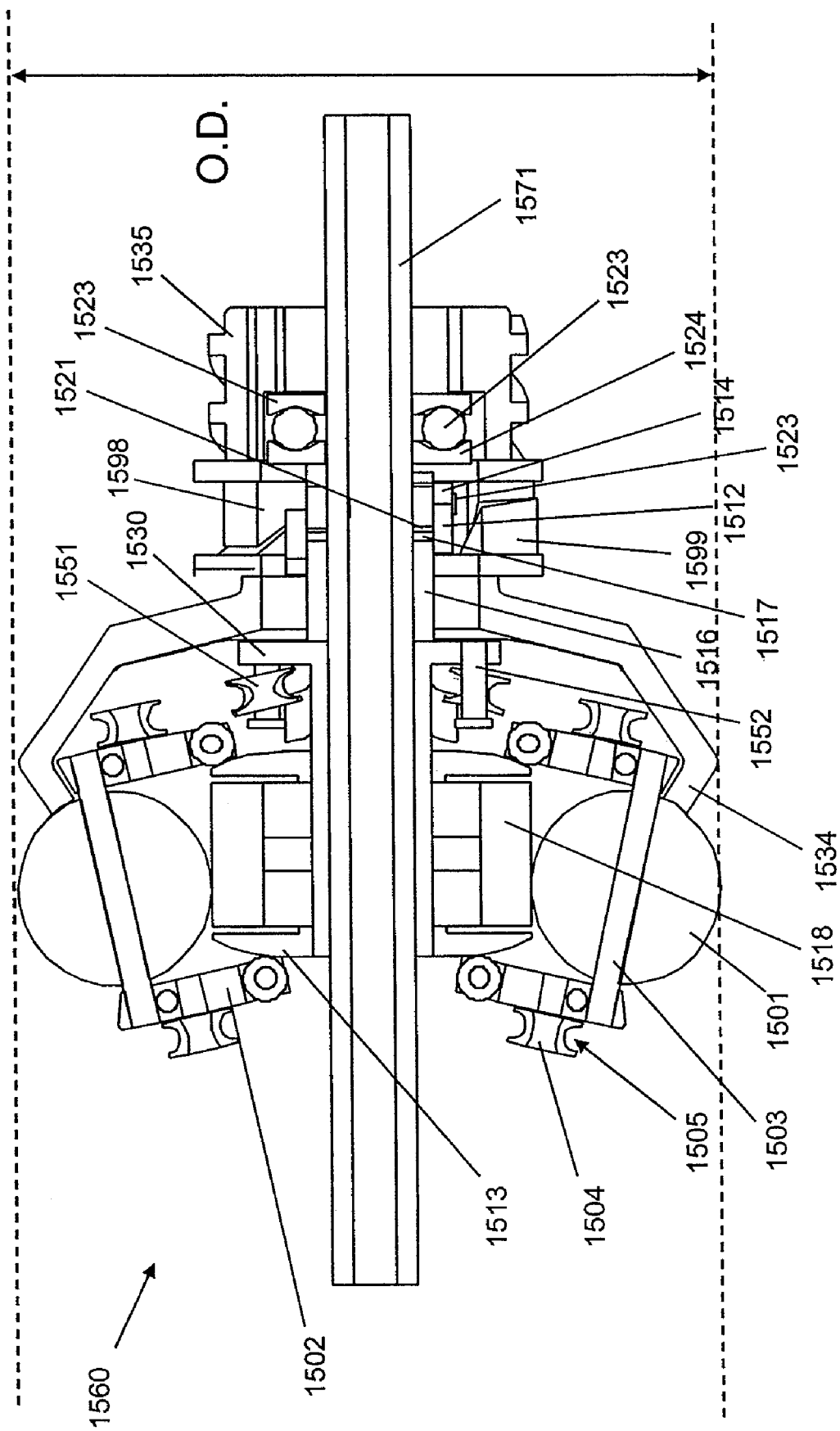
FIG. 15 is a cross-sectional side view of another alternative axial force generator for any of the transmission embodiments described herein.

FIGS. 1, 3, and 4 illustrate how the axes of the balls 1 can be tilted in operation to shift the transmission 100. Referring to FIGS. 3 and 4, a plurality of legs 2, which in many embodiments are generally struts, are attached to the ball axles 3 near each of the ends of the ball axles 3 that extend beyond the ends of the holes bored through the balls 1. Each leg 2 extends from its point of attachment to its respective ball axle 3 radially inward toward the longitudinal axis 11 of the transmission 100. In one embodiment, each of the legs 2 has a through-bore that receives a respective end of one of the ball axles 3. The ball axles 3 preferably extend through the legs 2 such that they have an end exposed beyond each leg 2. In the illustrated embodiments, the ball axles 3 advantageously have rollers 4 coaxially and slidingly positioned over the exposed ends of the ball axles 3. The rollers 4 are generally cylindrical wheels fitted over the ball axles 3 outside of and beyond the legs 2 and rotate freely about the ball axles 3. The rollers 4 can be attached to the ball axles 3 via spring clips or other such mechanism, or they can ride freely over the ball axles 3. The rollers 4 can be radial bearings for instance, where the outer races of the bearings form the wheel or rolling surface. Each of the rollers 4 of some embodiments fit over a roller shaft (not separately shown) that is separate from the ball axles 3 and is attached to the leg 2 at a radially inward position as illustrated in FIG. 15, which allows the input and output discs 34, 101 to have a smaller diameter. As illustrated in FIGS. 1 and 5, the rollers 4 and the ends of the ball axles 3 fit inside grooves 86 formed by or in a pair of stators 80a, 80b.

The input and output stators 80a, 80b of the embodiment illustrated in FIGS. 1 and 5 are generally in the form of parallel discs annularly located about the longitudinal axis 11 of the transmission on either side of the balls 1. The stators 80a, 80b of many embodiments are comprised of stator discs 81 and stator curves 82. The input stator disc 81a and output stator disc 81b, respectively, are generally annular discs of substantially uniform thickness with multiple apertures to be discussed further below. Each input and output stator disc 81a, 81b has a first side 88 that faces the balls 1 and a second side (not separately shown) that faces away from the balls 1. Multiple stator curves 82 are attached to the first side of the stator discs 81a, 81b. The stator curves 82 are curved surfaces attached or affixed to the stator discs 81a, 81b that each has a concave face 90 facing toward the balls 1 and a convex face 91 facing away from the balls 1 and contacting their respective stator discs 81. In some embodiments, the stator curves 82 are integral with or formed on the stator discs 81a, 81b. The stator curves 82 of many embodiments have a substantially uniform thickness and have at least one aperture (not separately shown) used to align and attach the stator curves 82 to each other and to the stator discs 81. The stator curves 82 of many embodiments, or the stator discs 81a, 81b where integral parts are used, include a slot 710 that accepts a flat spacer 83, which allows further positioning and alignment of the stator curves 82 and stator discs 81a, 81b. The flat spacers 83 are generally flat and generally rectangular pieces of rigid material that extend between and interconnect the input stator 80a and the output stator 80b. The flat spacers 83 fit within the slots 710 formed in the stator curves 82. In the illustrated embodiment, the flat spacers 83 are not fastened or otherwise connected to the stator curves 82; however, in some embodiments the flat spacers 83 are attached to the stator curves 82 by welding, adhesive, or fastening.

Also illustrated in FIG. 5, multiple cylindrical spacers 84, of a generally cylindrical shape with bores at least in each end, are radially positioned inside of the flat spacers 83 and also connect and position the stator discs 81 and stator curves 82. The bores of the cylindrical spacers 84 accept one spacer fastener 85 at each end. The spacer fasteners 85 are designed to clamp and hold the stator discs 81a, 81b, the stator curves 82, the flat spacers 83, and the cylindrical spacers 84 together, which collectively form a cage 89. The cage 89 maintains the radial and angular positions of the balls 1 and aligns the balls 1 with respect to one another.

Still referring to FIGS. 1, 4 and 5, the rotational axes of the balls 1 are changed by moving either the input-side or output-side legs 2 radially out from the axis of the transmission 100, which tilts the ball axles 3. As this occurs, each roller 4 fits into and follows a groove 86, which is slightly larger than the diameter of the roller 4, and is formed by the space between each pair of adjacent stator curves 82. The rollers 4 therefore roll along the surface of the sides 92, 93 of the stator curves 82, a first side 92 and a second side 93 for each stator curve 82, in order to maintain the plane of movement of the ball axles 3 in line with the longitudinal axis 11 of the transmission 100. In many embodiments, each roller 4 rolls on a first side 92 of the stator curve 82 on the input side of the transmission 100 and on the corresponding first side 92 of the corresponding output stator curve 82. The rollers 4 are slightly smaller in diameter than the width of the grooves 86 formed between the stator curves 82, forming a small gap between the edges of the grooves 86 and the circumference of each corresponding roller.

Still referring to FIGS. 1, 4 and 5, if the opposing sets of stator curves 82 on the input stator 80a and output stator 80b were in perfect alignment, in some embodiments the small gap between the circumferences of the rollers 4 and the grooves 86 would allow the ball axles to slightly tilt and become misaligned with the longitudinal axis 11 of the transmission 100. This condition produces sideslip, a situation where the balls axles 3 are allowed to slightly move laterally, which lowers overall transmission efficiency. In some embodiments, the stator curves 82 on the input and output sides of the transmission 100 may be slightly offset from each other so that the ball axles 3 remain parallel with the axis of the transmission 100. Any tangential force, mainly a transaxial force, the balls 1 may apply to the ball axles 3 is absorbed by the ball axles 3, the rollers 4 and the first sides 92, 93 of the stator curves 82. As the transmission 100 is shifted to a lower or higher transmission ratio by changing the rotational axes of the balls 1, each one of the pairs of rollers 4, located on the opposite ends of a single ball axle 3, move in opposite directions along their respective corresponding grooves 86 by rolling up or down a respective side of the groove 86.

Referring to FIGS. 1 and 5, the cage 89 can be rigidly attached to the case 40 with one or more case connectors 160. The case connectors 160 extend generally perpendicularly from the radial outermost part of the flat spacers 83. The case connectors 160 can be fastened to the flat spacers 83 or can be formed integrally with the flat spacers 83. The outside diameter formed roughly by the outsides of the case connectors 160 is substantially the same dimension as the inside diameter of the case 40 and holes in both the case 40 and case connectors 160 provide for the use of standard or specialty fasteners, which rigidly attach the case connectors 160 to the case 40, thus bracing and preventing the cage 40 from moving. The case 40 has mounting holes for attaching the case 40 to a frame or other structural body. In other embodiments, the case connectors 160 can be formed as part of the case 40 and provide a location for attachment of the flat spacers 83 or other cage 89 component in order to immobilize the cage 89.

FIGS. 1, 4, and 5 illustrate an embodiment including a pair of stator wheels 30 attached to each of the legs 2 that roll on the concave face 90 of the curved surfaces 82 along a path near the edge of the sides 92, 93. The stator wheels 30 are attached to the legs 2 generally in the area where the ball axles 3 pass through the legs 2. The stator wheels 30 can be attached to the legs 2 with stator wheel pins 31, which pass through a bore through the legs 2 that is generally perpendicular to the ball axles 3, or by any other attachment method. The stator wheels 30 are coaxially and slidingly mounted over the stator wheel pins 31 and secured with any type of standard fasteners, such as snap rings for example. In some embodiments, the stator wheels 30 are radial bearings with the inner race mounted to the stator wheel pins 31 and the outer race forming the rolling surface. In certain embodiments, one stator wheel 30 is positioned on each side of a leg 2 with enough clearance from the leg 2 to allow the stator wheels 30 to roll radially along the concave faces 90, with respect to the longitudinal axis 11 of the transmission 100, when the transmission 100 is shifted. In certain embodiments, the concave faces 90 are shaped such that they are concentric about a radius from the longitudinal axis 11 of the transmission 100 formed by the center of the balls 1.

Still referring to FIGS. 1, 4, and 5, guide wheels 21 are illustrated that can be attached to the end of the legs 2 that are nearest the longitudinal axis 11 of the transmission 100. In the illustrated embodiment, the guide wheels 21 are inserted into a slot formed in the end of the legs 2. The guide wheels 21 are held in place in the slots of the legs 21 with guide wheel pins 22, or by any other attachment method. The guide wheels 21 are coaxially and slidingly mounted over the guide wheel pins 22, which are inserted into bores formed in the legs 2 on each side of the guide wheels 21 and perpendicular to the plane of the slot. In some embodiments, the legs 2 are designed to elastically deflect relatively slightly in order to allow for manufacturing tolerances of the parts of the transmission 100. The ball 1, the legs 2, the ball axle 3, the rollers 4, the stator wheels 30, the stator wheel pins 31, the guide wheels 21, and the guide wheel pins 22 collectively form the ball/leg assembly 403 seen in FIG. 4.

Referring to the embodiment illustrated in FIGS. 1, 3, and 5, shifting is actuated by controlling the tension applied to a flexible input cable 155a and a flexible output cable 155b. Both the input cable 155a and the output cable 155b extend through holes in the case 40 and then through the first end of an input flexible cable housing 151a and an output flexible cable housing 151b. The input flexible cable housing 151a and the output flexible cable housing 151b of the illustrated embodiment are flexible elongated tubes that guide the input cable 155a and output cable 155b radially inward toward the longitudinal axis 11 then longitudinally out through holes in the stator discs 81a, b and then again radially inward where the second end of the input and output flexible cable housings 151a, b are inserted into and attach to the first end of input and output rigid cable housings 153a, b, respectively. The input and output rigid cable housings 153a, b, of the illustrated embodiment are inflexible tubes through which the cables 155a, b, pass and are guided radially inward from the second ends of the flexible cable housings 151a, b and then direct the cables 155a, b longitudinally through holes in the stator discs 81a, b and toward a second end of the rigid cable housings 153a, b near the idler 18. In many embodiments, the cables 155a, b are attached at their second ends to an input shift guide 13a, and an output shift guide 13b (described further below) with conventional cable fasteners, or other suitable attachment means. As will be discussed further below, the shift guides 13a, 13b position the idler 18 axially along the longitudinal axis 11 and position the legs 3 radially, thereby changing the axes of the balls 1 and the ratio of the transmission 100.

When output cable 155b applies a tension force to the output shift guide 13b, input cable 155a gives way and allows the idler 18 to move axially toward the output side of the transmission 100 thereby shifting the transmission 100 toward low. When input cable 155a applies a tension force to the input shift guide 13a, output cable 155b gives way and allows the idler 18 to move axially toward the input side of the transmission 100 thereby shifting the transmission 100 toward high.

Referring now to FIGS. 3, 4 and 5, the illustrated shift guides 13a, b, are each generally of the form of an annular ring with inside and outside diameters, and are shaped so as to have two sides. The first side is a generally straight surface that dynamically contacts and axially supports the idler 18 via two sets of idler bearings 17a, 17b, which are each associated with a respective shift guide 13a, b. The second side of each shift guide 13a, b, the side facing away from the idler 18, is a cam side that can have a straight or flat radial surface 14 towards the inner diameter of the shift guides 13a, b, which transitions to a convex curve 97 towards the outer diameter of the shift guides 13a, b. At the inner diameter of the first side of the shift guides 13a, b a longitudinal tubular sleeve 417a, b extends axially toward the opposing shift guide 13a, b in order to mate with the tubular sleeve 417a, b from that shift guide 13a, b. In some embodiments the shift guides 13a, b, have a convex curve 97 on their respective first sides from their inside diameter to their outside diameter. In some embodiments, as illustrated in FIG. 3, the tubular sleeve of the input side shift guide 13a has part of its inner diameter bored out to accept the tubular sleeve of the output shift guide 13b. Correspondingly, a portion of the outer diameter of the tubular sleeve of the output shift guide 13b has been removed to allow a portion of that tubular sleeve 417a, b to be inserted into the tubular sleeve 417a, b of the input shift guide 13a. This provides additional stability to the shift guides 13a, b of such embodiments.

The cross-section side view of the shift guides 13a, b illustrated in FIG. 3 shows that, in this embodiment, the flat surface 14 profile of the side facing away from the idler 18 is perpendicular to the longitudinal axis 11 up to a radial point where the guide wheels 21 contact the shift guides 13 a, b, if the ball axles 3 are parallel with the longitudinal axis 11 of the transmission 100. From this point moving out toward the perimeter of the shift guides 13a, b, the profile of each of the shift guides 13a, b curves in a convex shape. In some embodiments, the convex curve 97 of a shift guide 13a, b can be a radius or composed of multiple radii, or is shaped hyperbolically, asymptotically or otherwise in any other curved or curvilinear shape. As the transmission 100 is shifted toward low, the input guide wheels 21a roll toward the longitudinal axis 11 on the flat 14 portion of shift guide 13a, and the output guide wheels 21b roll on the convex curved 97 portion of the shift guide 13b away from the longitudinal axis 11. The shift guides 13a, b, can be attached to each other by either threading the tubular sleeve of the input shift guide 13a with male threads and the tubular sleeve of the output sleeve 13b with female threads, or vice versa, and threading the shift guides 13a, b, together. One shift guide 13a, b, either the input or output, can also be pressed into the other shift guide 13a, b. The shift guides 13 a, b can also be attached by other methods such as glue, metal adhesive, welding or any other means.

The convex curves 97 of the two shift guides 13a, b, act as cam surfaces, each contacting and pushing the multiple guide wheels 21. The flat surface 14 and convex curve 97 of each shift guide 13a, b contacts the associated guide wheels 21 so that as the shift guides 13 a, b, move axially along the longitudinal axis 11, the guide wheels 21 ride along the shift guide 13a, b surface 14, 97 in a generally radial direction forcing the leg 2 radially out from, or in toward, the longitudinal axis 11, thereby changing the angle of the ball axle 3 and the rotational axis of the associated ball 1.

Referring to FIGS. 3 and 5, the idler 18 of some embodiments is located in a trough formed between the first sides and the sleeve portions of the shift guides 13 a, b, and thus moves in unison with the shift guides 13a, b. In certain embodiments, the idler 18 is generally tubular and of one outside diameter and has two sides, one near the input stator 80a, and one near the output stator 80b. In other embodiments, the outer diameter and inside diameters of the idler 18 can be non-uniform and can vary or be any shape, such as ramped or curved. The idler 18 has an input and output idler bearing 17a, b, on each end of its inside diameter. The idler bearings 17a, 17b provide rolling contact between the idler 18 and the shift guides 13a, b. The idler bearings 17a, 17b are located coaxially around the sleeve portion of the shift guides 13a, b at or near the junction of the radial extensions and the tubular sleeve of each shift guide 13a, b, allowing the idler 18 to freely rotate about the axis of the transmission 100. The idler bearings 17a, b can be any type of radial or combination radial-thrust bearing and many of the variations described below can be utilized.

A sleeve 19 is fit around the longitudinal axis 11 of the transmission 100 inside the inside diameter of both of the shift guides 13a, b. The sleeve 19 is a generally tubular component that is held in operable contact with an inside bearing race surface of each of the shift guides 13a, b by an input sleeve bearing 172a and an output sleeve bearing 172b. The sleeve bearings 172a, b, provide for rotation of the sleeve 19 by rolling along an outer bearing race complimentary to the races of the shift guides 13a, b and can be any of the types of bearings disclosed herein or known in the art. The idler 18, the idler bearings 17a, 17b, the sleeve 19, the shift guides 13a, 13b, and the sleeve bearings 172a, 172b collectively form the idler assembly 402, seen in FIG. 3.

Referring to FIGS. 1, 2, and 3, the sleeve 19 of some embodiments has its inside diameter threaded to engage an idler rod 171 that is threaded into the sleeve 19. The idler rod 171 of the illustrated embodiment is a generally cylindrical rod that lies along the longitudinal axis 11 of the transmission 100. In some embodiments, the idler rod 171 is threaded at least partially along its length to allow threaded engagement with the sleeve 19. The first end of the idler rod 171, which faces the output side of the transmission 100, is preferably threaded through the sleeve 19 and extends out past the output side of the sleeve 19 where it extends into or beyond the inside diameter of the output disc 101. In such embodiments, the idler rod 171 is axially positioned by the sleeve 19, and therefore the idler 18, through the threaded engagement. In other embodiments, the idler rod 171 can be moved axially by a control mechanism (not shown) to position the sleeve 19 and the idler 18 in order to control the transmission ratio of the transmission 100. Some examples of such control mechanisms are disclosed below, although any axial positioning control mechanism known in the art can be used to position the idler rod 171 and thereby control the transmission ratio.

Referring to FIGS. 3 and 5, the limits of the axial movement of the shift guides 13a, b define the shifting range of the transmission 100. In some embodiments, axial movement of the shift guides 13a, b is limited by inside faces 88a, b, on the stator discs 81a, b, which the shift guides 13a, b contact. In some of these embodiments, at an extreme high transmission ratio, the input-side shift guide 13a contacts the inside face 88a on the input stator disc 81a, and at an extreme low transmission ratio, the output-side shift guide 13b contacts the inside face 88 on the output stator disc 81b. In many embodiments, the curvature of the convex curves 97 of the shift guides 13a, b, is functionally dependent on the distance from the center of a ball 1 to the center of the guide wheel 21, the radius of the guide wheel 21, the angle between lines formed between the two guide wheels 21 and the center of the ball 1, and the angle of tilt of the ball 1 axis.

Referring to FIGS. 1 and 5, a spoked input disc 34 utilized in some embodiments instead of a solid disc, located adjacent to the stator 80a, partially encapsulates but generally does not contact the stator 80a. The input disc 34 may have two or more spokes or may be a solid disc. The spokes in such embodiments reduce weight and aid in assembly of the transmission 100. In other embodiments a solid disc can be used. The input disc 34 has two sides, a first side that contacts with the balls 1, and a second side that faces opposite the first side. The input disc 34 is generally an annular disk that fits coaxially over, and extends radially from, a set of female threads or nut 37 at an inner diameter. As mentioned above, the input disc 34 is in rotating contact with the balls 1 along a circumferential ramped or bearing contact surface on a lip of the first side of the input disc 34, the side facing the balls 1. As also mentioned above, some embodiments of the input disc 34 have a set of female threads 37, or a nut 37, inserted into its inside diameter, and the nut 37 is threaded over a screw 35, thereby engaging the input disc 34 with the screw 35.

Referring to FIGS. 1 and 3, the screw 35 is attached to and rotated by a drive shaft 69. The drive shaft 69 is generally cylindrical and in some embodiments has an inner bore, a first end facing towards the output side, a second end facing toward the input side, and a generally constant outer diameter. At the first end, the drive shaft 69 is rigidly attached to and rotated by the torque-input device, usually a gear, a sprocket, or a crankshaft from a motor. The drive shaft 69 has axial splines 109 extending from its second end to engage and rotate a corresponding set of splines (not separately identified) formed on the inside diameter of the screw 35. A set of central drive shaft ramps 99, which, on a first side facing the output side of the transmission 100, is generally a set of raised inclined surfaces on an annular disc that is positioned coaxially over the drive shaft 69, has mating prongs that mate with the splines 109 on the drive shaft 99, are rotated by the drive shaft 69, and are capable of moving axially along the drive shaft 69.

Still referring to FIGS. 1 and 3, a pin ring 195 contacts a second side of the central drive shaft ramps 99, which faces the input side of the transmission 100. The pin ring 195 is a rigid ring that is coaxially positioned over the idler rod 171, is capable of axial movement and has a transverse bore that holds an idler pin 196 in transverse alignment with the idler rod 171. The idler pin 196 is an elongated rigid rod that is slightly longer than the diameter of the pin ring 195 and which is inserted through an elongated slot 173 in the idler rod 171 and extends slightly beyond the pin ring 195 at both its first and second ends when it is inserted into the bore of the pin ring 195. The elongated slot 173 in the idler rod 171 allows for axial movement of the idler rod 171 to the right, as illustrated in FIG. 1, without contacting the pin 196 when the transmission 100 is shifted from 1:1 toward high. However, when the transmission 100 is shifted from 1:1 toward low, the side on the input end of the elongated slot 173 contacts the pin 196, which then operably contacts the central drive shaft ramps 99 via the pin ring 195. The idler rod 171 is thus operably connected to the central drive shaft ramps 99 when the transmission is between 1:1 and low so that when the idler rod 171 moves axially the central drive shaft ramps 99 also move axially in conjunction with the idler rod 171. The ramp surfaces of the central drive shaft ramps 99 can be helical, curved, linear, or any other shape, and are in operable contact with a set of corresponding central bearing disc ramps 98. The central bearing disc ramps 98 have ramp faces that are complimentary to and oppose the central drive shaft ramps 99. On a first side, facing the output side of the transmission 100, the central bearing disc ramps 98 face the central drive shaft ramps 99 and are contacted and driven by the central drive shaft ramps 99.

The central bearing disc ramps 98 are rigidly attached to a bearing disc 60, a generally annular disc positioned to rotate coaxially about the longitudinal axis 11 of the transmission 100. The bearing disc 60 has a bearing race, positioned near its perimeter on its side that faces away from the balls 1, which contacts a bearing disc bearing 66. The bearing disc bearing 66 is an annular thrust bearing at the perimeter of the bearing disc 60 and is positioned between the bearing disc 60 and the input disc 34. The bearing disc bearing 66 provides axial and radial support for the bearing disc 60 and in turn is supported by a bearing race on a case cap 67, which acts with the case 40 to partially encapsulate the inner parts of the transmission 100. In some embodiments, the bearing disc bearing 66 is a combination radial thrust bearing and can be any type of such bearing, such as those described below.

Referring to FIG. 1, the case cap 67 described above has a tubular portion extending toward the output end from at or near its perimeter and also having a bore through its center. The case cap 67, in addition to the functions described above, absorbs axial and radial forces produced by the transmission 100, and seals the transmission 100, thereby preventing lubricant from escaping and contamination from entering. As was mentioned above, the case cap 67 has a bearing race that contacts the bearing disc bearing 66 near the perimeter of the bearing disc 60 that is located at the inside of the output end of the tubular extension from the case cap 67. The case cap 67 also has a second bearing race facing the output side located near the inside diameter of its annular portion that mates with a drive shaft bearing 104. The drive shaft bearing 104 can be a combination thrust and radial bearing that provides axial and radial support to the drive shaft 69, and can be any type of suitable bearing known in the art or described herein. The drive shaft 67 has a bearing race formed on its outside diameter facing the input side that mates with the drive shaft bearing 104, which transfers the axial force produced by the screw 35 to the case cap 67. An input bearing 105, adds support to the drive shaft 69 and is coaxially positioned over the drive shaft 69 and mates with a third race on the input side of the inside diameter of the case cap 67 opposite the drive shaft bearing 104. A cone nut 106, which is a generally cylindrical threaded nut with a bearing race designed to provide a running surface for the input bearing 105, is threaded over the drive shaft 69 and supports the input bearing 105.

Referring to the embodiment illustrated in FIG. 1, a set of multiple perimeter ramps 61, generally forming a ring about the longitudinal axis 11, is rigidly attached to the bearing disc 60. The perimeter ramps 61 are multiple annular inclined surfaces that are positioned radially about the longitudinal axis 11 and are positioned against or formed on the bearing disc 60 and face the output side of the transmission 100. The inclined surfaces can be curved, helical, linear, or another shape and each one creates a wedge that produces an axial force that is applied to a corresponding one of multiple ramp bearings 62. The ramp bearings 62 are spherical but can be cylindrical, conical, or another geometric shape, and are housed in a bearing cage 63. The bearing cage 63 of the illustrated embodiment is generally ring shaped with multiple apertures that contain the individual ramp bearings 62. A set of input disc ramps 64 is rigidly attached to, or formed as part of, the input disc 34. The input disc ramps 64 in some embodiments are complimentary to and face the perimeter ramps 61. In some embodiments, the input disc ramps 64 are also in the form of a bearing race that aligns and assist in centering the ramp bearings 62 radially relative to the longitudinal axis 11. The ramp bearings 62 respond to variations in torque by rolling up or down the inclined faces of the perimeter ramps 61 and the input disc ramps 64.

Referring now to FIGS. 1 and 3, an axial force generator 160 is made up of various components that create an axial force that is generated and is applied to the input disc 34 to increase the normal contact force between the input disc 34 and the balls 1, which is a component in the friction the input disc 34 utilizes in rotating the balls 1. The transmission 100 produces sufficient axial force so that the input disc 34, the balls 1, and the output disc 101 do not slip, or slip only an acceptable amount, at their contact points. As the magnitude of torque applied to the transmission 100 increases, an appropriate amount of additional axial force is required to prevent slippage. Furthermore, more axial force is required to prevent slippage in low than in high or at a 1:1 speed ratio. However, providing too much force in high or at 1:1 can, in many instances, shorten the lifespan of the transmission 100, reduce efficiency, and/or necessitate larger components to absorb the increased axial forces. In some embodiments, the axial force generator 160 will vary the axial force applied to the balls 1 as the transmission 100 is shifted and also as torque is varied. In some embodiments, the transmission 100 accomplishes both these goals. The screw 35 is designed and configured to provide an axial force that is separate and distinct from that produced by the perimeter ramps 61. In some embodiments, the screw 35 produces less axial force than the perimeter ramps 61, although in other versions of the transmission 100, the screw 35 is configured to produce more force than the perimeter ramps 61. Upon an increase in torque, the screw 35 rotates slightly farther into the nut 37 to increase axial force by an amount proportional to the increase in torque. If the transmission 100 is in a 1:1 ratio and the user or vehicle shifts into a lower speed, the idler rod 171, moves axially toward the input side, along with the sleeve 19, sleeve bearings 172, shift guides 13*a*, *b*, and idler 18. The idler rod 171 contacts the central drive shaft ramps 99 through the pin 196 and pin ring 195, causing the central drive shaft ramps 99 to move axially toward the output side. The ramped surfaces of the central drive shaft ramps 99 contact the opposing ramped surfaces of the central bearing disc ramps 98, causing the central bearing disc ramps 98 to rotate the bearing disc 67 and engage the perimeter ramps 61 with the ramp bearings 62 and the input disc ramps 64. The central drive shaft ramps 99 and the central bearing disc ramps 98 perform a torque splitting function, shifting some of the torque from the screw 35 to the perimeter ramps 61. This increases the percentage of transmitted torque that is directed through the perimeter ramps 61, and due to the fact the perimeter ramps 61 are torque sensitive as described above, the amount of axial force that is generated increases.

Still referring to FIGS. 1 and 3, when shifting into low, the idler 18 moves axially towards the output side, and is pulled toward low by a reaction of forces in the contact patch. The farther the idler 18 moves toward low, the stronger it is pulled. This "idler pull," which increases with an increase in normal force across the contact as well as shift angle, also occurs when shifting into high. The idler pull occurs due to a collection of transverse forces acting in the contact patch, the effect of which is called spin. Spin occurs at the three contact patches, the points of contact where the balls contact the input disc 34, the output disc 101, and the idler 18. The magnitude of the resultant forces from spin at the contact between the idler 18 and the balls 1 is minimal in comparison to that of the balls 1 and input and output discs 34, 101. Due to the minimal spin produced at the contact patch of the idler 18 and ball 1 interface, this contact patch will be ignored for the following explanation. Spin can be considered an efficiency loss in the contact patches at the input disc 34 and ball 1 and also at the output disc 101 and ball 1. Spin produces a transverse force perpendicular to the rolling direction of the balls 1 and discs 34, 101. At a 1:1 ratio the transverse forces produced by spin, or contact spin, at the input and output contact patches are equal and opposite and are essentially cancelled. There is no axial pull on the idler 18 in this condition. However, as the transmission 100 is shifted toward low for example, the contact patch at the input disc 34 and ball 1 moves farther from the axis or pole of the ball 1. This decreases spin as well as the transverse forces that are produced perpendicular to the rolling direction. Simultaneously the output disc 101 and ball 1 contact patch moves closer to the axis or pole of the ball 1, which increases spin and the resultant transverse force. This creates a situation where the transverse forces produced by spin on the input and output sides of the transmission 100 are not equal and because the transverse force on the output contact is greater, the contact patch between the output disc 101 and ball 1 moves closer to the axis of the ball 1. The farther the transmission 100 is shifted into low the stronger the transverse forces in the contacts become that are exerted on the ball 1. The transverse forces caused by spin on the ball 1 exert a force in the opposite direction when shifting into high. The legs 2 attached to the ball axles 3 transfer the pull to the shift guides 13*a*, *b*, and because the shift guides 13*a*, *b*, are operably attached to the idler 18 and sleeve 19, an axial force is transferred to the idler rod 171. As the normal force across the contact increases, the influence of spin increases at all ratios and efficiency decreases.

Still referring to FIGS. 1 and 3, as the transmission 100 is shifted into low, the pull transferred to the idler rod 171 results in an axial force toward the left, as viewed in FIG. 1, which causes the input torque to shift from the screw 35 to the perimeter ramps 61. As the transmission 100 is shifted into extreme low, the idler rod 171 pulls more strongly, causing relative movement between the central drive shaft ramps 99 and the central bearing disc ramps 98 and shifts even more torque to the perimeter ramps 61. This reduces the torque transmitted through the screw 35 and increases the torque transmitted through the perimeter ramps 61, resulting in an increase in axial force.

Figure 6:
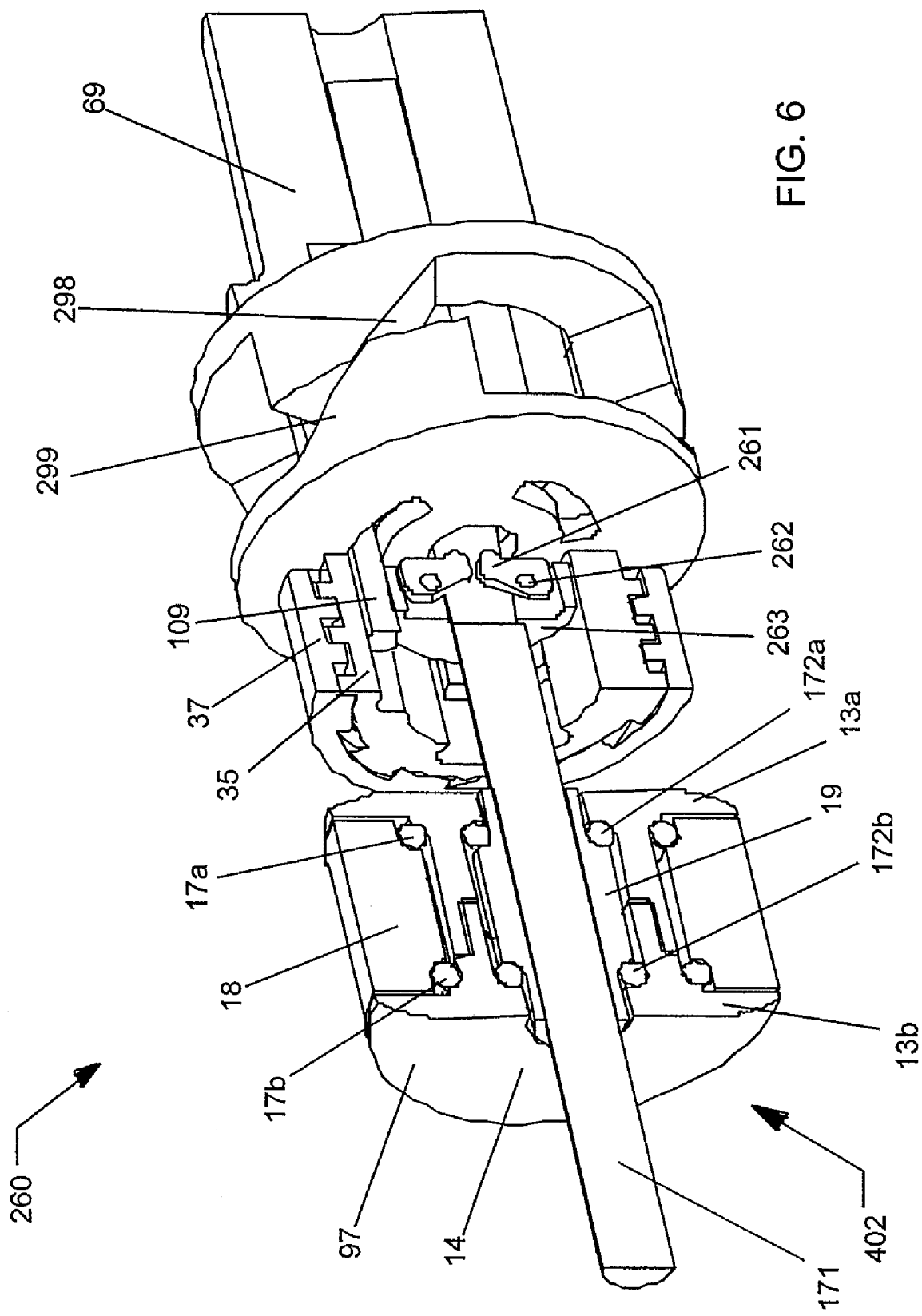
FIG. 6 is a schematic partial cutaway side view of an alternative embodiment of the axial force generator of the transmission of FIG. 1.

Referring to FIG. 6, a cutaway side view of an alternative axial force generator 260 of the transmission 100 is disclosed. For purposes of simplicity, only the differences between the axial force generator 160 previously described and the axial force generator 260 illustrated in FIG. 6 will be presented. The illustrated axial force generator 260 includes one or more reversing levers 261. The reversing levers 261 are generally flat, irregularly shaped cam pieces each having an off-center mounted pivot hole with a first side radially inward of the pivot hole and a second side radially outside of the pivot hole. The first side of the reversing levers 261 each fit into the elongated slot 173 in the idler rod 171. When the transmission 100 is shifted toward low, the end of the elongated slot 173 contacts the first side of the reversing levers 261 and the reversing levers 261 pivot on an axis produced by a reversing pin 262 that is inserted into the pivot holes of the reversing levers 261.

As the first sides are contacted by the end of the elongated slot 173, the first side of each of the reversing levers 261 moves toward the output side of the transmission 100 and the second side of the reversing levers 261 moves toward the input side of the transmission 100 thereby fulfilling the cam function of the reversing levers 261. By increasing and decreasing the length of the first side and second side, the reversing levers 261 can be designed to decrease the distance that they move axially toward the input side and increase the force they produce. The reversing levers 261 can be designed in this manner to create a mechanical advantage to adjust the axial force that they produce. At their second sides, the reversing levers 261 each contact the output side of the central screw ramps 298 when the transmission 100 is shifted toward low. The reversing levers 261 are each attached to a lever ring 263 by the reversing pins 262, which can be pressed or threaded into holes in the lever ring 263 to hold the reversing levers 261 in position. The lever ring 263 is a ring shaped device that fits around, and slides axially along, the idler rod 171 and has one or more rectangular slots cut through it to allow for insertion and positioning of the reversing levers 261.

Still referring to the embodiment illustrated in FIG. 6, a set of central screw ramps 299 is rigidly attached to and can be rotated by the screw 35. The central screw ramps 299 of this embodiment are similar to the central screw ramps 99 illustrated in FIG. 3, in that the central screw ramps 299 are formed as ramps on the second side of a disc having a first side facing the output side and a second side facing the input side. As the transmission 100 is shifted toward low, the second side of the reversing levers 261 pushes against the first side of the central screw ramps 299. The central screw ramps 299, which are splined to the drive shaft 69 via the above-described spline 109, are rotated by the drive shaft 69, are capable of axial movement along the longitudinal axis 11, and are similar to the central drive shaft ramps 99 of the previous embodiment, except that the central screw ramps 299 face the input side of the transmission 100 rather than the output side. The central screw ramps 299 contact an opposing set of central bearing disc ramps 298, which are free to rotate relative to the drive shaft 69 and are similar to the central bearing disc ramps 98 illustrated in FIG. 3, except that the central bearing disc ramps 298 face the output side of the transmission 100 rather than the input side. As the central screw ramps 299 are pushed axially by the reversing levers 261 toward the central bearing disc ramps 298, relative rotation of the ramp faces of the central screw ramps 299 and central bearing disc ramps 298 is developed that causes the bearing disc 60 to rotate to a point such that the perimeter ramps 61 become engaged, thereby shifting torque to the perimeter ramps 61 and increasing the amount of axial force that is generated.

Figure 8:
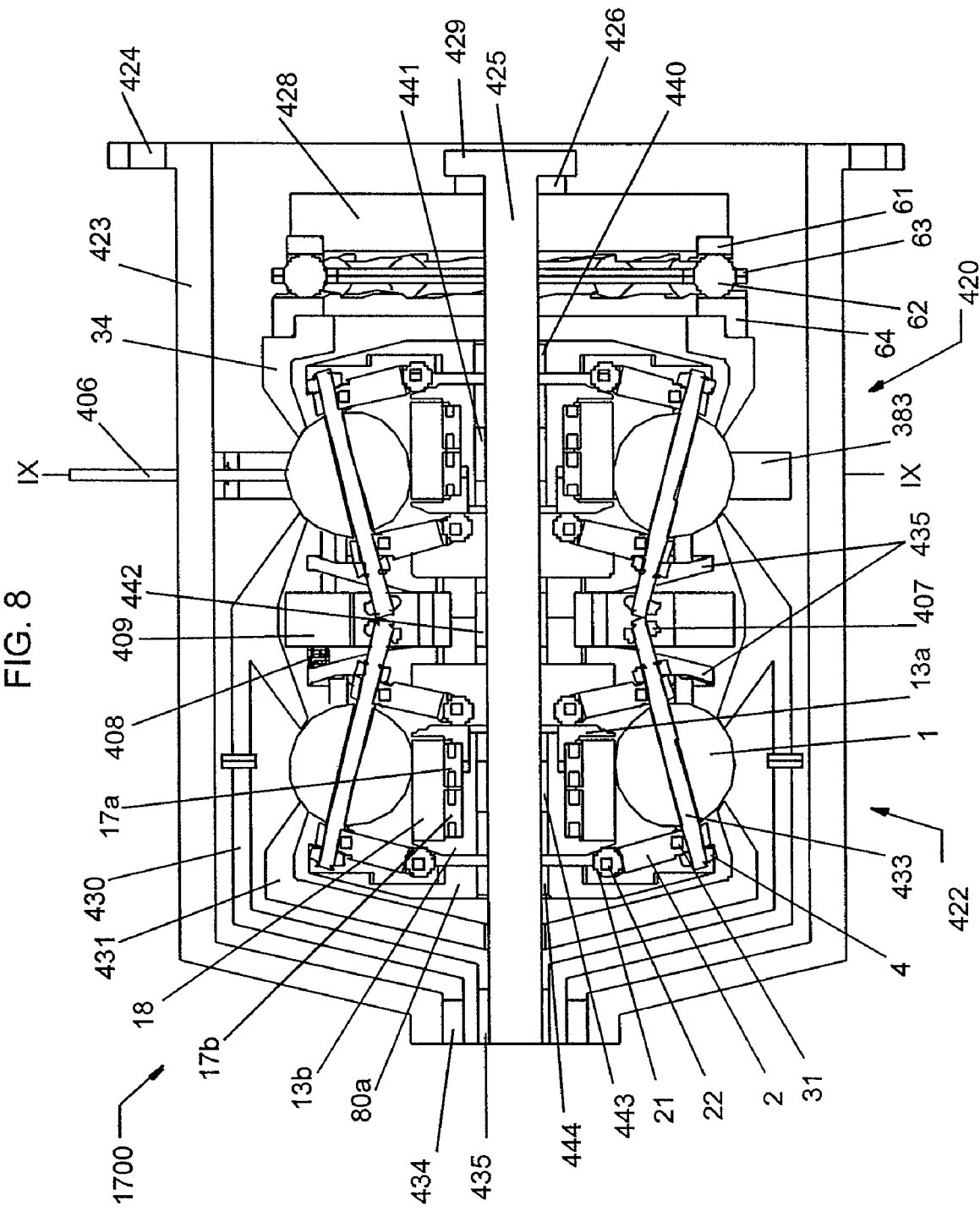
FIG. 8 is a schematic cutaway side view of an alternative embodiment of the transmission of FIG. 1 with two variators.

Referring now to FIGS. 7 and 8, an alternative embodiment of the transmission 100 of FIG. 1 is disclosed. For the purposes of simplicity, only those differences between the transmission 1700 of FIG. 8 and the transmission 100 of FIG. 1 will be explained. The transmission 100 of FIG. 1 includes one variator. The term variator in this sense can, in some embodiments, be used to describe the components of the transmission 100 that vary the input to output speed ratio. The assemblies and components comprising the variator 401 of the present embodiment illustrated in FIG. 7 include the ball/leg assembly 403 of FIG. 4, the input disc 34, the output disc 101, the idler assembly 402 of FIG. 3, and the cage 89 of FIG. 5. It should be noted that all components and assemblies of the variator 401 can change to best fit the specific application of the transmission 1700, and in FIG. 7 generic forms of the assemblies and components comprising the variator 401 are depicted.

The embodiment of the transmission 1700 illustrated in FIG. 8 is similar to the transmission 100 of FIG. 1 but includes two variators 401. This configuration is beneficial for applications where high torque capacity is required in a transmission 1700 with a small diameter or overall size. This configuration also eliminates bearings needed to support the bearing disc 114 and the output disc 101, thereby increasing overall efficiency. Due to the fact that the transmission 1700 has two variators 401, each variator 401 has an output side and the transmission 1700 also has an output side. Thus there are three output sides and in this configuration, the convention or marking of like components with an "a" and a "b" to differentiate between the input and output sides is not used. However, as illustrated in FIG. 8, the input side of the transmission 1700 is to the right and the output is to the left.

Figure 9:
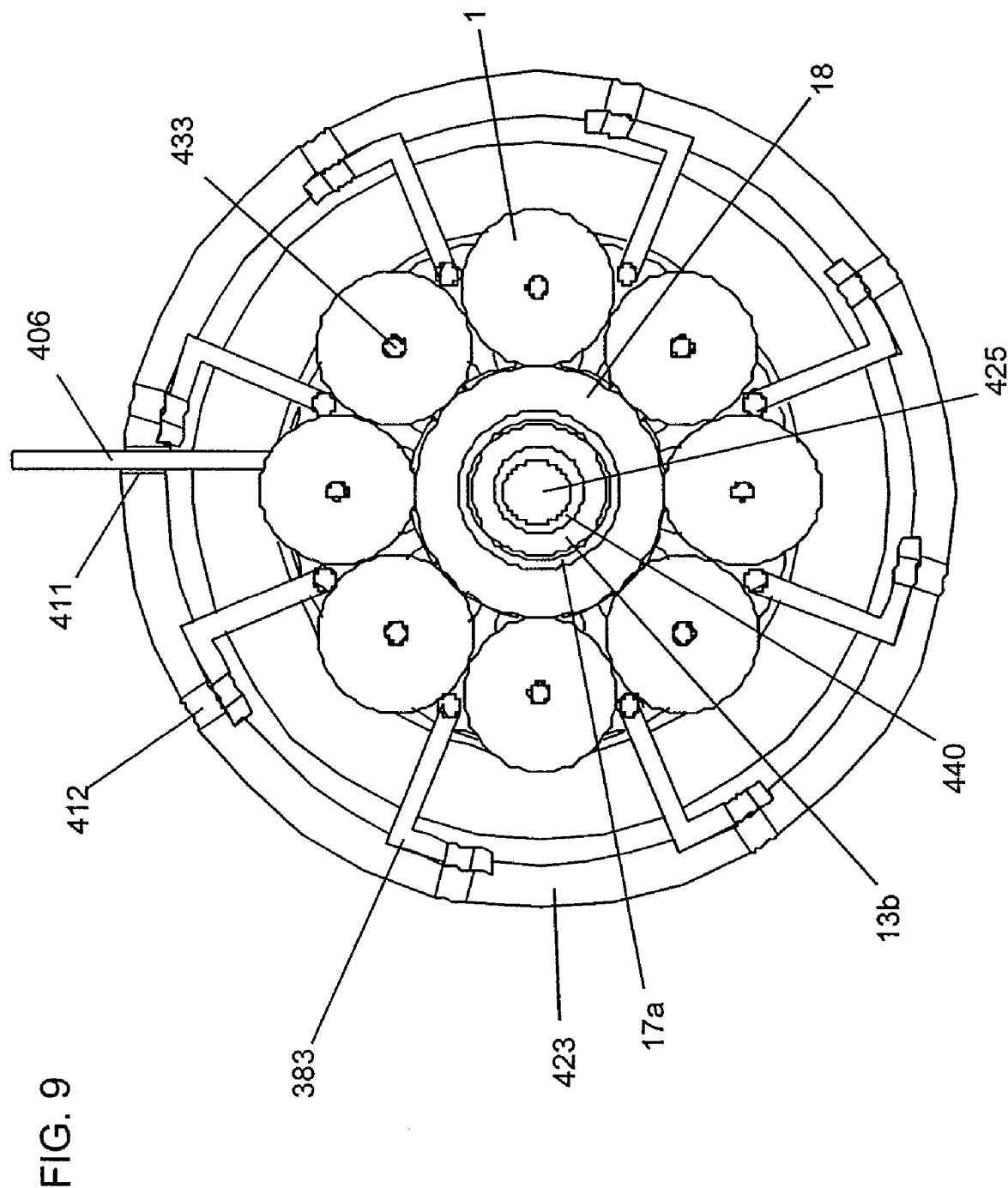
FIG. 9 is a partial cross-sectional view of the transmission taken along line IX-IX of FIG. 8.

Referring to FIGS. 8-9, a case 423 is illustrated that surrounds and encapsulates the transmission 1700. The case 423 is generally cylindrical and protects the transmission 1700 from outside elements and contamination and additionally contains lubrication for proper operation. The case 423 is attached to an engine, frame, or other rigid body (not shown) with standard fasteners (not shown), which fit through case holes 424. The case 423 is open on the input side, the side with the case holes 424 or to the right as illustrated, to accept an input torque. Input torque is transmitted from an outside source to an input shaft 425, which is a long, rigid, rod or shaft capable of transmitting torque. The input shaft 425 transmits torque to a bearing disc 428 via splines, keying, or other such manner. The bearing disc 428 is a disc-shaped rigid component capable of absorbing significant axial forces produced by the transmission 1700 and is similar in design to the bearing disc 60 illustrated in FIG. 1. An input shaft bearing 426 is positioned coaxially over the input shaft 425 between a flange 429 on the input end of the input shaft 425 and the bearing disc 428 to allow a small amount of relative movement between the bearing disc 428 and the input shaft 425. When the bearing disc 429 begins rotating, the perimeter ramps 61, ramp bearings 62, bearing cage 63, input disc ramps 64, and input disc 34 rotate as previously described. This rotates the balls 1 in the first variator 420, the one on the input side.

Simultaneously, as the input shaft 425 rotates, a second input disc 431 is rotated. The second input disc 431 is rigidly attached to the input shaft 425, and can be keyed with a backing nut, pressed over the input shaft 425, welded, pinned, or attached by other methods. The second input disc 431 is located on the output side of the transmission 1700, opposite the bearing disc 428. The second input disc 431 and the bearing disc 428 absorb the considerable axial forces created by the perimeter ramps 61, ramp bearings 62, and input disc ramps 64 that act as normal forces to prevent slippage at the ball/disc contact patches as previously described. Any of the other axial force generating mechanisms described herein or known in the art can also be utilized by this and other embodiments. The second input disc 431 is similar in shape to the input disc 34 previously described and upon rotation of the input shaft 425; it rotates the balls 1 in the second variator 422. The second variator 422 is generally a mirror image of the first variator 420 and is positioned farther from the input side of the transmission 1700 so that the first variator 420 is situated between it and the input side. In alternative embodiments, the second input disc 431 can be splined to the input shaft 425 and driven by a structure similar to or the same as the bearing disc 428 of the first input disc 34. Such splines can be standard splines or ball splines. Such embodiments allow preloading of the transmission with a resilient washer between the second input disc 431 and its respective bearing disc-like structure (not separately illustrated) where the bearings and ramps at the second side are removed. Such a structure is known in the art and is described in the references described and incorporated below.

As previously described, the balls 1 in the first variator 420 rotate the output disc 430 through their rolling contact with that component. The output disc 430, although serving the same function as the output disc 101 previously described, has two opposing contact surfaces and contacts balls 1 on both variators 420, 422. From the cross sectional view illustrated in FIG. 8, the output disc 430 can be shaped in a shallow arch or upside down shallow "V," the ends of which have a contact surface to contact the balls 1 of the two variators 420, 422. The output disc 430 surrounds the second variator 422 and extends toward the output side in a generally cylindrical shape. In the illustrated embodiment, the cylindrical shape of the output disc 430 continues toward the output side of the transmission 1700 surrounding the second input disc 431 after which the diameter of the output disc 430 decreases and then again becomes a generally cylindrical shape of a smaller diameter as it exits the case 423. To hold the output disc 430 concentric and align it with the first and second input discs 34, 431, annular bearings 434, 435, may be used to radially align the output disc 431. A case bearing 434 is positioned in the bore of the case 423 and over the output disc 430 and an output disc bearing 435 is positioned in the bore of the output disc 430 and over the input shaft 425 to provide additional support. The output disc 430 can be made of two pieces that are connected together to form the illustrated output disc 430. This allows for assembly of the second variator 422 inside the cylindrical shell of the output disc 430. As illustrated in FIG. 8, this can be accomplished by use of two annular flanges along the large diameter of the output disc 430. In some embodiments, the annular flanges are located generally midway along the large diameter of the output disc 430.

Figure 10:
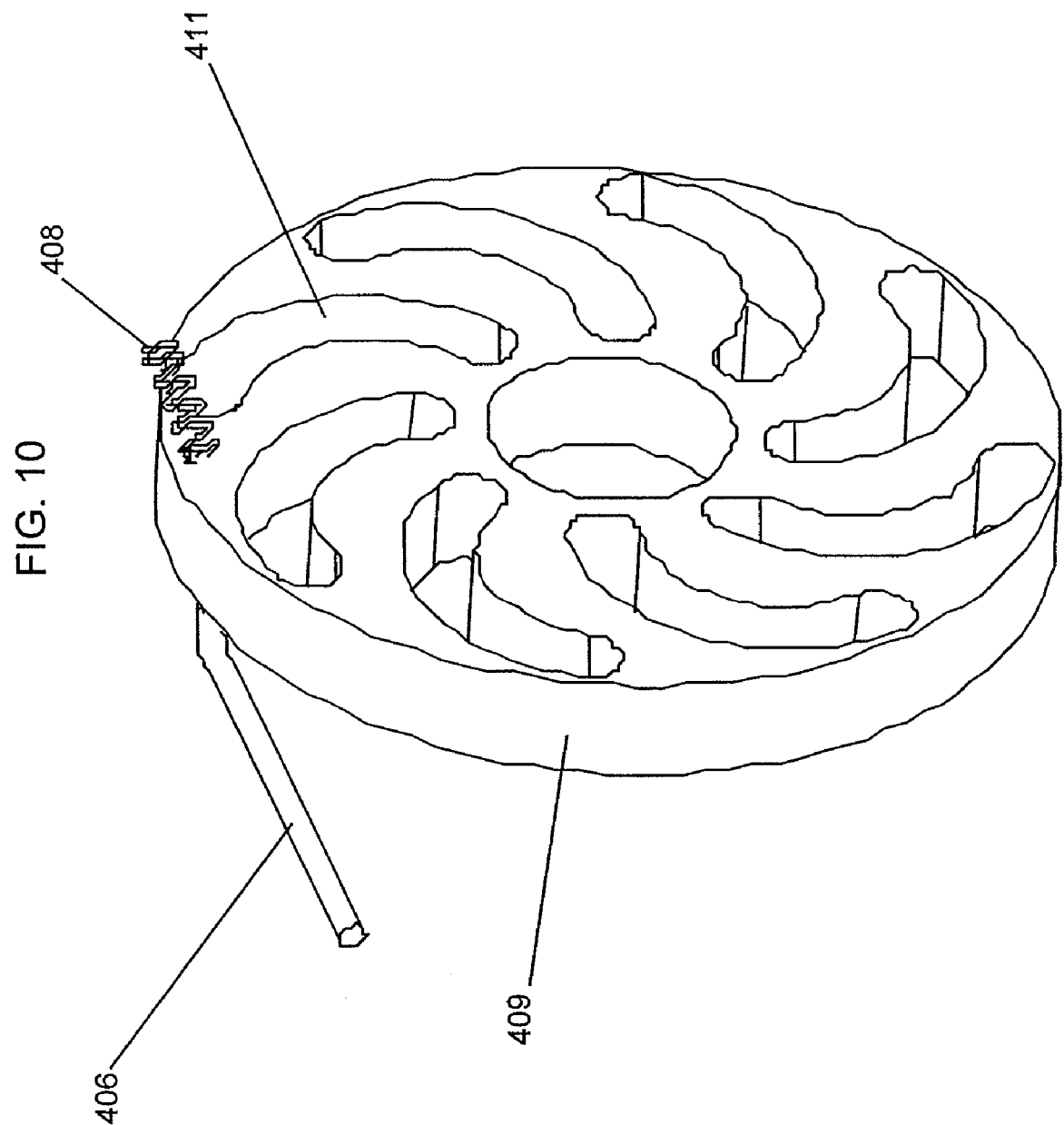
FIG. 10 is a perspective view of the iris plate of the transmission of FIG. 8.

Referring now to FIGS. 8-10, the ball axles 433 of the transmission 1700 are similar to the ball axles 3 previously described and perform the same function. In addition, the ball axles 433 serve as the mechanism by which the balls 1 are tilted to vary the speed ratio of the transmission 1700. The ball axles 433 are elongated on each of their respective output sides and extend through the walls of the output stators 435. The output stators 435 are similar to the output stators 80b previously described, but the multiple radial grooves 436 penetrate all the way through the walls of the output stators 435. The grooves 436 of the output stators 435 continue all the way through the output stator 435 walls so that a series of equally spaced radial grooves 436 extend radially from near the bore at the center of the output stator 435 to the perimeter. The ball axles 433 have iris rollers 407 positioned coaxially over their elongated output ends. The iris rollers 407 are generally cylindrical wheels that are capable of rotating over the ball axles 433 and are designed to fit inside the grooves 411 of an iris plate 409. The iris plate 409 is an annular disc or plate with a bore through its center that fits coaxially about the longitudinal axis 11 of the transmission 1700. The iris plate 409 is of a thickness that is greater than twice the thickness of each iris roller 407 and has a number of iris grooves 411 extending radially outward from near the bore to near the perimeter of the iris plate 409. As the iris grooves 411 extend radially, their angular position changes as well, so that as the iris plate 409 is rotated angularly about the longitudinal axis 11, the iris grooves 411 provide a camming function along their respective lengths. In other words, the grooves 411 spiral out from near the bore in the center of the iris plate 409 to respective points near its perimeter.

The iris rollers 407 are radiused along their outside diameters, or have fillets on their outer corners, so that their diameters remain unchanged inside the grooves 411 of the iris plate 409 when the ball axles 433 are tilted. The iris plate 409 is of a thickness sufficient to allow iris rollers 407 from both variators 420, 422, to remain inside the grooves 411 of the iris plate 433 at all shifting ratios. The iris grooves 411 operate in traditional iris plate fashion and cause the ball axles 433 to move radially inward or outward when the iris plate 409 is rotated. The iris plate 409 has a first side facing the first variator and a second side facing the second variator and is coaxially positioned about the longitudinal axis 11 of the transmission 1700 and over abutting bosses on tubular extensions extending from the two output stators 435. The two output stators 435 can be attached to each other with conventional fasteners through axial holes (not illustrated) in the bosses of the output stators 435. The output stator 435 bosses have a hole through their centers and multiple holes positioned radially outward from the center. In some embodiments, the bosses on the output stators 435 form a space slightly wider than the iris plate 409 to provide freedom of rotation for the iris plate 433 and some embodiments utilize bearings between the bosses and the iris plate 409 to accurately control the position of the iris plate 409 between the output stators 435. An iris cable 406 is attached to the first side of the iris plate 409 near the outside diameter of the iris plate 409 and extends longitudinally from the point of connection.

The iris cable 406 is routed through the output stator 435 of the first variator 420 in an orientation so that when it is pulled, it rotates the iris plate 409. The iris cable 406, after passing through an aperture near the perimeter of the output stator 435 is routed through the case 423 to the outside of the transmission 1700 where it allows for control of the transmission ratio. An iris spring 408 is attached to the second side of the iris plate 409 near its outside diameter. The iris spring 408 is also attached to the output stator 435 of the second variator 422. The iris spring 408 applies a resilient force that resists rotation of the iris plate 409 from tension applied by the iris cable 406. When tension from the iris cable 406 is released, the iris spring 408 returns the iris plate 409 to its at-rest position. Depending upon the application of the transmission 1700, the iris plate 409 can be configured so that when the iris cable 406 is pulled the iris plate 409 shifts the transmission 1700 to a higher transmission ratio, and when tension on the iris cable 406 is released the iris spring 408 shifts the transmission 1700 to a low ratio. Alternatively, the iris plate 409 can be configured so that when the iris cable 406 is pulled the iris plate 409 shifts the transmission 1700 to a lower ratio, and when tension on the iris cable 406 is released the iris spring 408 shifts the transmission 1700 to a high ratio.

Referring to FIGS. 7 and 8, many embodiments of the transmission 1700 having two variators 420, 422 require a high degree of accuracy in the alignment of the additional rolling elements of the transmission 1700. In some such embodiments, all of the rolling elements must be aligned with one another or efficiency will suffer and the lifespan of the transmission 1700 will be reduced. During assembly, the input disc 34, the output disc 430, the second input disc 431, and the idler assemblies 402 are aligned on the same longitudinal axis. Additionally, the cage 410, which in these embodiments consists of two cages 89 joined by the output stators 435 as previously described, must also be aligned on the longitudinal axis to accurately position the ball/leg assemblies 403. To accomplish this simply and accurately, all rolling elements are positioned relative to the input shaft 425. A first input stator bearing 440 and a second input stator bearing 444 are positioned in the bores of the input stators 440, 444 and over the input shaft 425 to help align the cage 410. An output stator bearing 442 positioned in the bore of the output stators 435 and over the input shaft 425 also aligns the cage 410. A first guide bearing 441 is positioned in the bore of the first shift guide 13b and over the input shaft 425 and a second guide bearing 443 is positioned in the bore of the second shift guide 13b and over the input shaft 425 to align the first and second idler assemblies 402.

Referring to FIGS. 8 and 9, the cage 410 is attached to the case 423 with the previously described case connectors 383 that fit into case slots 421. The case slots 421 are longitudinal grooves in the case 423 that extend to the input side of the case 423, the side of the case 423 that is open. In the illustrated embodiment, the case is mostly closed on the output side, which is not shown in FIG. 8, but is open on the input side and has a mounting flange extending radially from the otherwise cylindrical body of the case 423 with case holes 424 for mounting the case 423. During assembly, the transmission 1700 can be inserted into the case 423 where the case connecters 383 are aligned in the case slots 421 in order to resist torque applied to the cage 410 and prevent the cage 410 from rotating. Case connector holes 412 in the case 423 allow fasteners to be inserted into corresponding holes in the case connectors 383 to fasten the cage 410 to the case 423.

EXAMPLES

Figure 11:
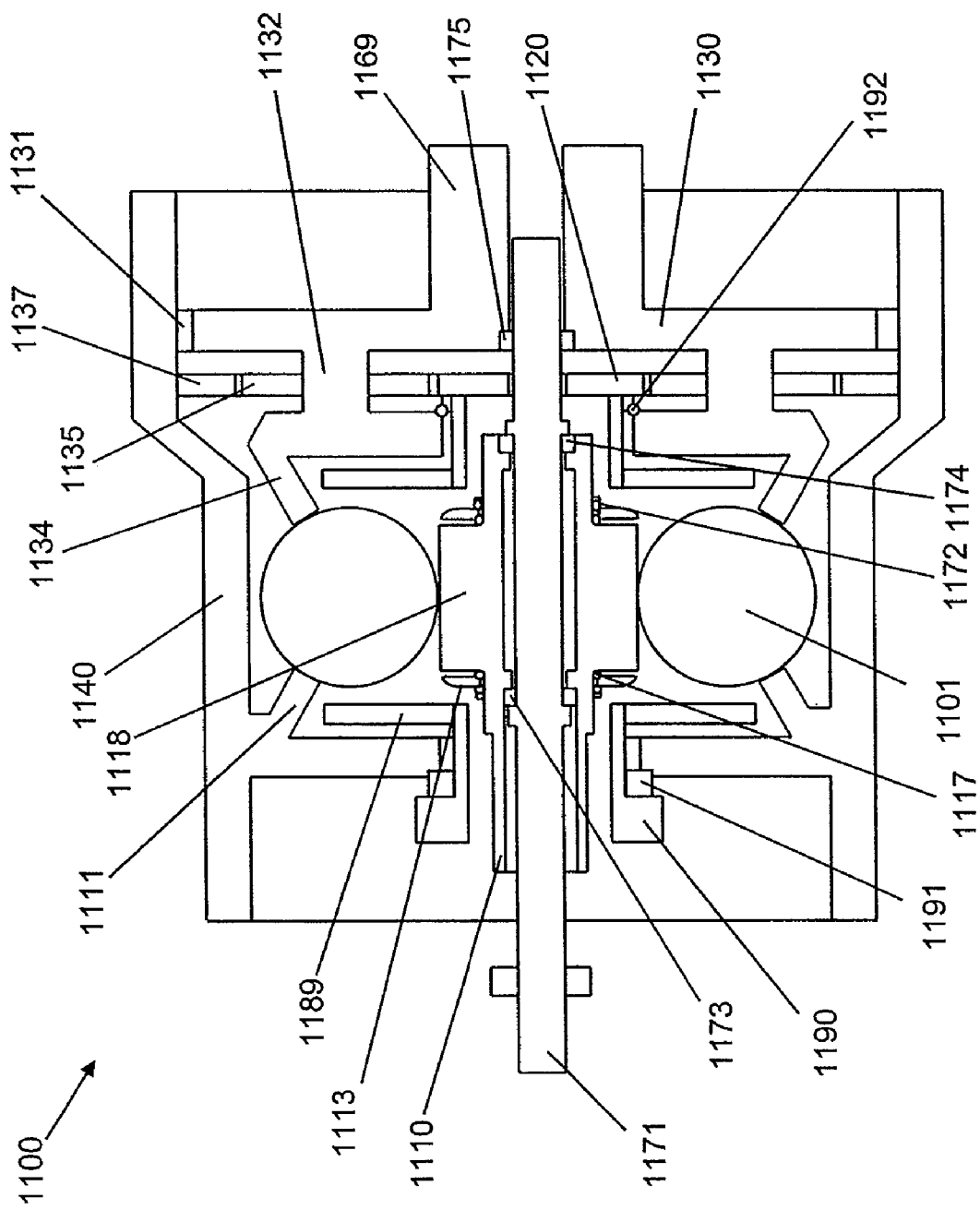
FIG. 11 is a schematic cross-sectional side view of an embodiment of an infinitely variable transmission utilizing one torque input and providing two sources of torque output.
Figure 12:
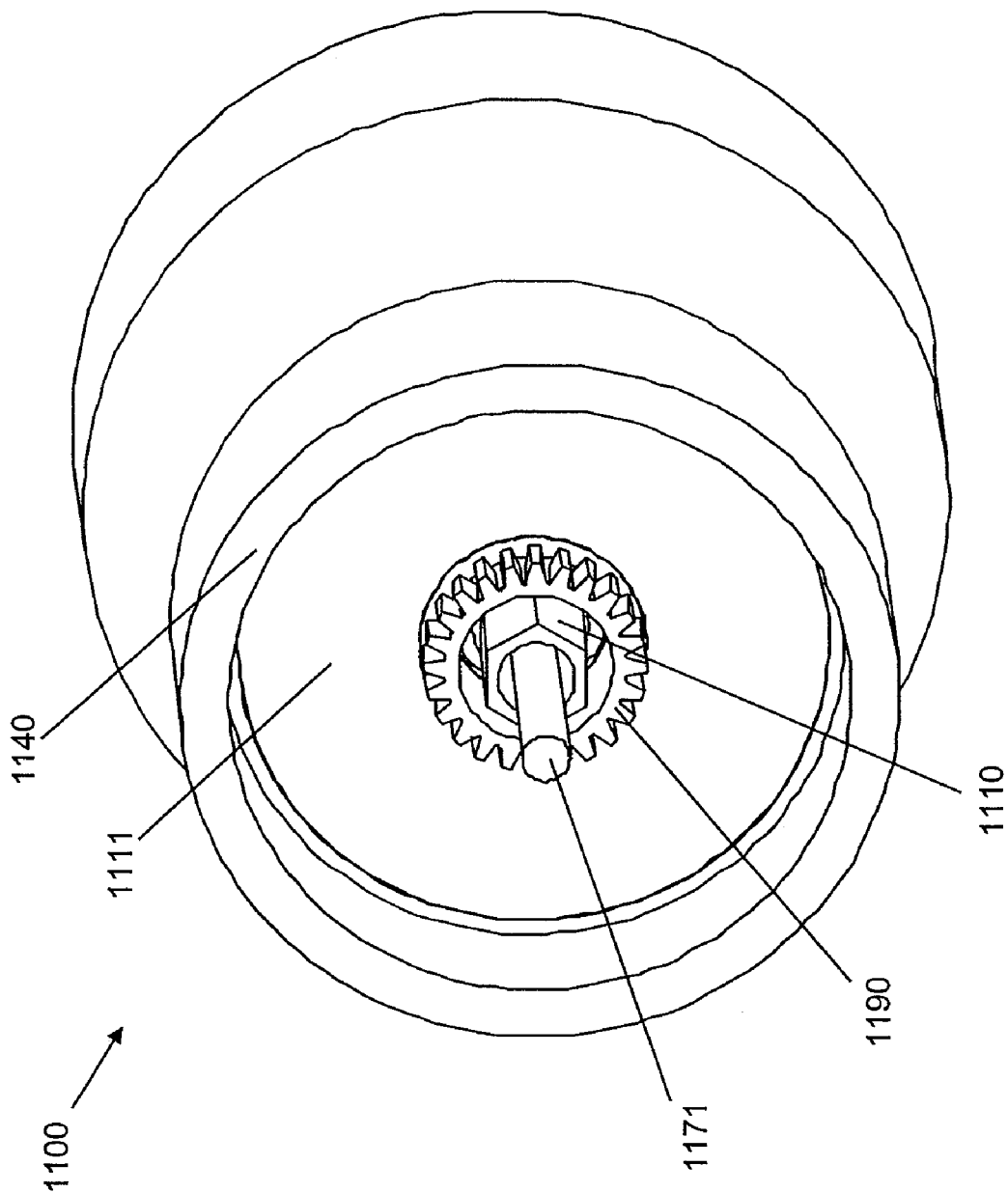
FIG. 12 is a schematic end-view of the embodiment of an infinitely variable transmission of FIG. 11.

Each of the variations that will now be described may have advantageous characteristics for particular applications. The variations can be modified and controlled as necessary to achieve the goals for any particular application. Specific embodiments will now be described and illustrated that employ some of the variations described herein and/or listed in the Tables provided in U.S. patent application Ser. No. 10/788,736, which were incorporated above by reference. FIGS. 11 and 12 illustrate one embodiment of a transmission 1100 that is a variation having one source of torque input and that supplies two sources of torque output. As before, only the significant differences between the embodiment illustrated in FIGS. 11 and 12 and the previously illustrated and described embodiments will be described. Furthermore, the components illustrated are being provided to illustrate to one of skill in the art how to provide power paths and torque output sources that have not been previously illustrated. It is fully understood that many additional components can and will be utilized for operational embodiments, however for simplification of the drawing, many such components have been omitted or are represented schematically as boxes.

Referring to FIG. 11, torque is input through a drive shaft 1169 as in previously described embodiments. The drive shaft 1169 of this embodiment is a hollow shaft having two ends and engaging on a first end whatever prime mover is providing torque to the transmission 1100 and engaging at the second end a planet carrier 1130. The planet carrier 1130 is a disc positioned coaxial with the longitudinal axis of the transmission 1100 that interfaces at its center with the drive shaft 1169 and extends radially to a radius near that of the inner side of the case 1140 of the transmission 1100. In this embodiment, the case 1140 is stationary and is fixed to some supporting structure of the vehicle or equipment upon which it is utilized. A radial carrier bearing 1131 is located between the inner surface of the case 1140 and the outer edge of the planet carrier 1130. The carrier bearing 1131 of some embodiments is a radial bearing that provides radial support to the planet carrier 1130. In other embodiments, the carrier bearing 1131 is a compound bearing providing both radial and axial support to the planet carrier preventing cocking as well as radial or axial movement.

A plurality of planet shafts 1132 extend from the planet carrier 1130 from a radial position between the center and the outer edge of the planet carrier 1130. The planet shafts 1132 extend axially toward the output end of the transmission 1100 and are generally cylindrical shafts that connect the planet carrier 1130 to the input disc 1134 and each form an axis about which a respective planet gear 1135 rotates. The planet shafts 1132 can be formed into the input side of the input disc 1134 or the planet carrier 1130 or can be threaded into either the input disc 1134 or the planet carrier or can be attached by fasteners or otherwise. The planet gears 1135 are simple rotary gears that are supported by and rotate about the planet shafts 1132 and many embodiments utilize bearings between the planet gears 1135 and the planet shafts 1132. They can have straight teeth or helical teeth, however where helical gears are used, thrust bearings are used to absorb the axial thrust developed by the transmission of torque by the planet gears 1135.

Still referring to the embodiment illustrated in FIG. 11, the planet gears 1135 engage at two areas along their respective circumferences at any one time as they rotate about their respective axes. At a first circumferential position located farthest away from the longitudinal axis of the transmission 1100, each planet gear 1135 engages a ring gear 1137. The ring gear 1137 is an internal gear formed on or attached to the inner surface of the case 1140. In some embodiments, the ring gear 1137 is a set of radial teeth formed on the inner surface of the ring gear 1137 and extending radially inward such that the planet gears 1135 can engage with its teeth and ride along the inner surface of the ring gear 1137 as they orbit the longitudinal axis of the transmission 1100. At a circumferential point of the planet gears 1135 generally opposite the radially outward most part, the ring gears 1135 engage a sun gear 1120. The sun gear 1120 is a radial gear that is mounted coaxially about the longitudinal axis of the transmission 1100 at the center of the planet gears 1135 and engages all of the planet gears 1135. As the planet carrier 1130 rotates the planet gears 1135 about the sun gear 1120, the planet gears 1135 are rotated about their respective planet shafts 1132 by their engagement with the ring gear 1137 and therefore both orbit the sun gear 1120 and rotate on their own shafts as they orbit. This results in a rotational energy that is transmitted to the sun gear 1120 that is at a greater speed than the speed input by the drive shaft 1169.

In the embodiment illustrated in FIG. 11, the drive shaft 1169 also drives the input disc 1134 via the planet carrier 1130 and the planet shafts 1132. However, the planet gears 1135 also drive the sun gear 1120 so that the power from the planet carrier is distributed to the input disc 1134 and the sun gear 1120. The sun gear 1120 is rigidly connected to and rotates the cage 1189 of this embodiment. The cage 1189 is similar to the embodiments described above, and therefore not all of the components have been illustrated to simplify the drawing and improve the understanding of this description. The cage 1189, as in other embodiments, positions the balls 1101 about the longitudinal axis of the transmission 1100 and because the cage 1189 of this embodiment rotates about its axis, it causes the balls 1101 to orbit the longitudinal axis of the transmission 1100. The input disc 1134, which is similar to those described above, provides an input torque to the balls 1101 in the same manner as in previous embodiments. However the sun gear 1120 also provides an input torque to the balls 1101 by rotating the cage 1189, which is added to the input from the input disc 1134. In this embodiment, the output disc 1111 is rigidly fixed to the case 1140 and does not rotate about its axis. Therefore, the balls 1101 roll along the surface of the output disc 1111 as they orbit the longitudinal axis of the transmission 1100 and rotate about their respective axes.

The balls 1101 cause the idler 1118 to rotate about its axis as in other embodiments, however in this embodiment, the idler 1118 includes an idler shaft 1110 that extends out beyond the hole formed by the inner diameter of the output disc 1111. The balls 1101 drive the idler 1118, which in turn drives the idler shaft 1110, which provides the first torque output from the transmission 1100. As illustrated in FIG. 12, the idler shaft 1110 can be of a cross-sectional shape that lends itself to easier coupling with devices that would take power from the idler shaft 1110 and in some embodiments, as illustrated, the shape is hexagonal, although any such shape can be used. It is noted that due to axial movement of the idler 1118 during shifting as described below, the idler shaft 1110 moves axially during shifting of the transmission 1100. This means that the couple between the idler shaft 1110 and the output device (not shown) of this design allows for axial motion of the idler shaft 1118. This can be accomplished by allowing a slightly larger output device shaft such that the idler shaft 1110 is free to move within the output device, or by the use of a splined output idler shaft 1110, such as by ball spline. Alternatively the idler 1118 can be splined to the idler shaft 1110 in order to maintain the axial position of the idler shaft 1110.

Still referring to FIGS. 11 and 12, the cage 1189 can provide an output power source as well. As illustrated, the cage 1189 can be connected on its inner diameter on the output side to a cage shaft 1190. In the illustrated embodiment, the cage shaft 1190 is formed at its end into an output gear or spline to engage and supply power as a second output source.

As illustrated in FIG. 11, various bearings can be implemented to maintain the axial and radial position of various components in the transmission 1100. The cage 1189 can be supported in its place by cage output bearings 1191, which are either radial bearings to provide radial support or are preferably combination bearings to maintain both axial and radial position of the cage with respect to the case 1140. The cage output bearings 1191 are assisted by cage input bearings 1192 which are also radial or preferably combination radial-thrust bearings and position the cage 1189 relative to the input disc 1134. In embodiments utilizing an axial force generator where the input disc 1134 is subject to slight axial movement or deformation, the cage input bearings 1192 are designed to allow for such movement by any mechanism known in the industry. One embodiment utilizes an outer bearing race that is splined to the inner diameter of the input disc 1134, by a ball spline for example, in order that the input disc 1134 can move axially slightly relative to the outer race of the cage input bearing 1192.

The shifting mechanism of the embodiment illustrated in FIG. 11 is slightly varied from the embodiments illustrated previously in order to allow for the transmission of output torque supplied by the idler 1118. In this embodiment, the idler 1118 initiates the shifting by being moved axially upon actuation by the shift rod 1171 and in turn moves the shift guides 1113 axially causing the shifting mechanism to change the axes of the balls 1101 as described above. The shift rod 1171 does not thread into the idler 1118 in the illustrated embodiment, however and only contacts the idler 1118 via idler input bearings 1174 and idler output bearings 1173. The idler input and output bearings 1174, 1173, respectively, are combination thrust and radial bearings that position the idler 1118 both radially and axially along the longitudinal axis of the transmission 1100.

When the shift rod 1171 is moved axially toward the output end, the input idler bearing 1174 applies axial force to the idler, thereby moving the idler axially to the output end and initiating a change in the transmission ratio. The shift rod 1171 of the illustrated embodiment extends beyond the idler 1118 through an inner diameter formed in the center of the sun gear 1120 and into the second end of the drive shaft 1169 where it is held in radial alignment within the drive shaft 1169 by an idler end bearing 1175. The shift rod 1171 moves axially within the drive shaft 1169 however and therefore the idler end bearing 1175 of many embodiments allows for this motion. As described before, many such embodiments utilize a splined outer race that engages a mating spline formed on the inner surface of the drive shaft 1169. This splined race allows the race to slide along the inner surface of the drive shaft 1169 as the shift rod 1171 is moved axially back and forth and still provides the radial support used to assist in radially aligning the shift rod 1171. The inner bore of the sun gear 1120 can also be supported radially with respect to the shift rod 1171 by a bearing (not illustrated) located between the shift rod 1171 and the sun gear 1120. Again either the inner or outer race could be splined to allow for the axial motion of the shift rod 1171.

When the idler 1118 of the embodiment illustrated in FIG. 11 is moved axially to shift the transmission 1100, the idler 1118 moves the shift guides 1113. In the illustrated embodiment, the shift guides 1113 are annular rings coaxially mounted about each end of the idler 1118. The illustrated shift guides 1113 are each held in radial and axial position by an inner shift guide bearing 1117 and an outer shift guide bearing 1172. The inner and outer shift guide bearings of this embodiment are combination bearings providing both axial and radial support to the shift guides 1113 in order to maintain the axial and radial alignment of the shift guides 1113 in relation to the idler 1118. Each of the shift guides 1113 can have a tubular sleeve (not shown) that extends away from the idler 1118 so that the shift guide bearings 1117 and 1172 can be further apart to provide additional support to the shift guides 1113, as needed. The shift rod 1171 can be moved axially by any known mechanism for causing axial motion such as an acme threaded end acting as a lead screw or a hydraulically actuated piston or other know mechanisms.

Referring to FIGS. 11 and 12, the paths of power through the transmission 1100 follow to parallel and coaxial paths. Initially, power enters the transmission 1100 via the drive shaft 1169. The power is then split and transmitted through the planet carrier 1130 both to the input disc 1134 and to the sun gear 1120 via the planet gears 1135. The latter power path is then transmitted from the sun gear 1120 to the cage 1189 and out of the transmission 1100 via the cage shaft 1189. This power path provides a fixed transmission ratio from the drive shaft based upon the dimensions of the sun gear 1120 and the planet gears 1135. The second power path is from the planet carrier 1130 through the planet shafts 1132 and to the input disc 1134. This power path continues from the input disc 1134 to the balls 1101 and from the balls 1101 to the idler shaft 1118 and out of the transmission 1100 through the idler shaft 1110. This unique arrangement allows the two power paths to be transmitted through the transmission 1100 not only in parallel paths but through coaxial paths. This type of power transmission allows for a smaller cross-sectional size for the same torque transmission and leads to significant size and weight reductions and to a much simpler design compared to other IVTs.

The embodiment illustrated in FIGS. 11 and 12, illustrates to one of skill in the art how the idler 1118 can be used as a power output as listed above and how to combine the planetary gear set with the CVT as described above. It is expected that variations of this design can be utilized while achieving the various combinations described, and such alternate designs cannot all be illustrated herein due to the overwhelming number of combinations listed that are available. It is also understood that the axial force generators provided herein can also be utilized with this embodiment, but for simplification these devices are not illustrated. For embodiments utilizing one of the axial force generators described herein, or another, it is expected that the components of the axial force generator can be implemented between where the planet shafts 1132 connect to the input disc 1134, although other arrangements can be employed as well. In such embodiments, the parallel path is coaxial with the axis of the transmission 1100 allowing for a much smaller transmission 1100 for the same torque transmission and thereby leading to reduced weight and space of such embodiments. FIGS. 11 and 12 illustrate one combination in order to show how rotational power might be taken from the various components of the transmission in various embodiments. Obviously, those of skill in the art will easily understand how other configurations provided herein can be achieved by varying the connections, and it would be unnecessarily burdensome and voluminous to illustrate all or even more combinations for the simple purpose of illustrating the combinations described. The embodiments shown in FIGS. 11 and 12 can therefore be modified as necessary to produce any of the variations listed above or below without the need for a separate non-coaxial parallel power path.

Figure 13:
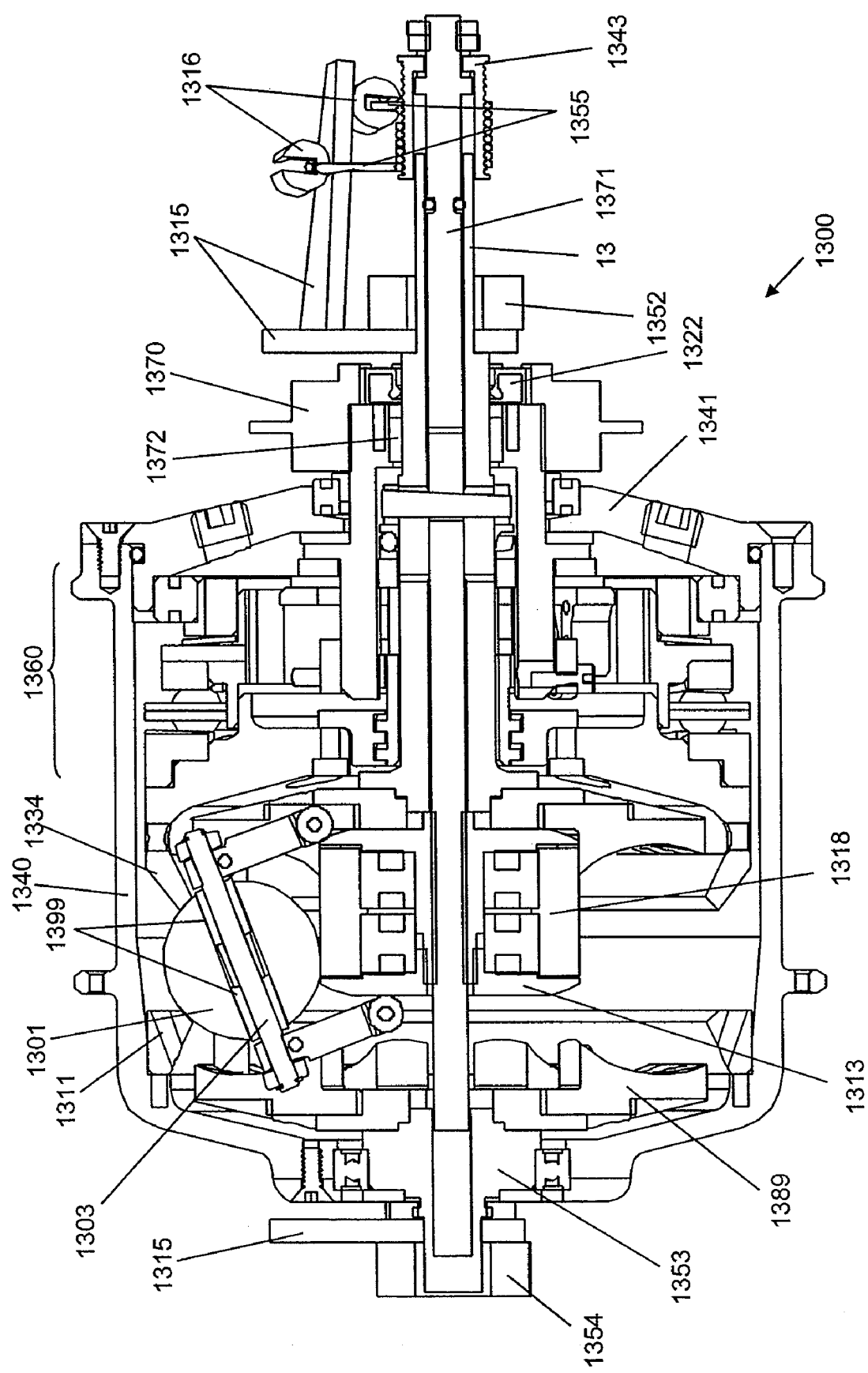
FIG. 13 is a cross-sectional side view of an alternative embodiment of a continuously variable transmission where the output disc is part of a rotating hub.

Referring now to FIG. 13, an alternative embodiment of a transmission 1300 is illustrated. In this embodiment, the output disc 1311 is formed as part of the case of previous embodiments to form a rotating hub shell 1340. Such an embodiment is suited well for applications such as motorized two wheel vehicles or a bicycle. As mentioned before, only the substantial differences between this embodiment and the previously described embodiments will be described in order to reduce the size of this description. In this embodiment, the input torque is supplied to an input wheel 1370, which can be a pulley for a belt or a sprocket for a chain or some similar device. The input wheel 1370 is then attached to the outside of a hollow drive shaft 1369 by press fitting or splining or some other suitable method of maintaining angular alignment of the two rotary components. The drive shaft 1369 passes through a removable end of the hub shell 1340 called the end cap 1341. The end cap 1341 is generally an annularly shaped disc having a bore through its center to allow passage of the drive shaft 1369 into the inside of the transmission 1300 and having an outer diameter that mates with the inner diameter of the hub shell 1340. The end cap 1341 can be fastened to the hub shell 1340 or it can be threaded into the hub shell 1340 to encapsulate the inner components of the transmission 1300. The end cap 1341 of the illustrated embodiment has a bearing surface and corresponding bearing on the inside of its outer diameter for positioning and supporting the axial force generator 1360 and has a bearing surface and corresponding bearing at its inner diameter that provides support between the end cap 1341 and the drive shaft 1369.

The drive shaft 1369 fits over and rotates about an input axle 1351, which is a hollow tube that is anchored to the vehicle frame 1315 by a frame nut 1352 and that provides support for the transmission 1300. The input axle 1351 contains the shift rod 1371, which is similar to the shift rods described in previous embodiments, such as that illustrated in FIG. 1. The shift rod 1371 of this embodiment is actuated by a shift cap 1343 threaded over the end of the input axle 1351 that extends beyond the vehicle frame 1315. The shift cap 1343 is a tubular cap with a set of internal threads formed on its inner surface that mate with a complimentary set of external threads formed on the outer surface of the input axle 1351. The end of the shift rod 1371 extends through a hole formed in the input end of the shift cap 1343 and is itself threaded allowing the shift cap 1343 to be fastened to the shift rod 1371. By rotating the shift rod 1371 its threads, which may be acme threads or any other threads, cause it to move axially and because the shift rod 1371 is fastened to the shift cap 1343, the shift rod 1371 is moved axially as well, actuating the movement of the shift guides 1313 and the idler 1318, thereby shifting the transmission 1300. In other embodiments, the shift rod 1371 does not rotate but contacts the shift cap 1343 via bearings so that when the shift 1343 cap rotates, the shift rod 1371 can remain in its same angular position while it is positioned axially by the shift cap 1343.

Still referring to the embodiment illustrated in FIG. 13, the drive shaft 1369 rides on and is supported by the input axle 1351 and one or more shaft support bearings 1372, which can be needle bearings or other radial support bearings. The drive shaft 1369 provides torque to an axial force generator 1360 as in previous embodiments. Any of the axial force generators described herein can be used with this transmission 1300, and this embodiment utilizes a screw 1335 that is driven by the drive shaft 1369 by splining or other suitable mechanism that distributes torque to the drive disc 1334 and to a bearing disc 1360, as in any of the previous embodiments. In this embodiment, a drive seal 1322 is provided between the inner diameter of the input wheel 1370 and the outer diameter of the input axle 1351 beyond the end of the drive shaft 1369 in order to limit the amount of foreign material that is admitted to the inside of the transmission 1300. Another seal (not shown) can be used between the case cap 1342 and the input wheel to limit foreign particle infiltration from between the end cap 1341 and the drive shaft 1369. The drive seal 1322 can be an o-ring seal, a lip seal or any other suitable seal. The illustrated embodiment also utilizes a similar cage 1389 as previously described embodiments however, the illustrated transmission 1300 utilizes axle bearings 1399 to support the balls 1301 on their axles 1303. The axle bearings 1399 can be needle bearings or other suitable bearings and reduce the friction between the balls and their axles 1303. Any of the various embodiments of balls and ball axles described herein or known to those of skill in the art can be used to reduce the friction that is developed.

Still referring to the embodiment illustrated in FIG. 13, the cage 1389 and the shift rod 1371 are supported on the output side by an output axle 1353. The output axle 1353 is a somewhat tubular support member located in a bore formed in the output end of the hub shell 1340 and between the cage 1389 and the output side vehicle frame 1315. The output axle 1353 has a bearing race and bearing formed between its outer diameter and the inner diameter of the hub shell 1340 to allow for relative rotation of the two components as the output axle 1353 provides support to the output side of the transmission 1300. The output shaft is clamped to the vehicle frame 1315 by an output support nut 1354.

As is illustrated in FIG. 13, this transmission 1300 is shifted by applying tension to the shifting cord 1355 that is wrapped around and which applies rotational force to the shift cap 1343. The shift cord 1355 is a tether capable of applying a tension force and is actuated by a shifter (not shown) used by the operator to shift the transmission 1300. In some embodiments the shift cord 1355 is a guide wire capable of both pulling and pushing so that only one coaxial guide line (not shown) needs to be run to the shifter from the transmission 1300. The shifting cord 1355 is conducted by housing stops 1316 to and from the shift cap from the shifter used by the operator. The housing stops 1316 are extensions from the vehicle frame 1315 that guide the shifting cord 1355 to the shift cap 1343. In the illustrated embodiment, the stop guides 1316 are somewhat cylindrically shaped extensions having a slot formed along their length through which the shifting cord 1355 passes and is guided. In other respects, the transmission 1300 illustrated in FIG. 13 is similar to other embodiments illustrated herein.

Figure 14:
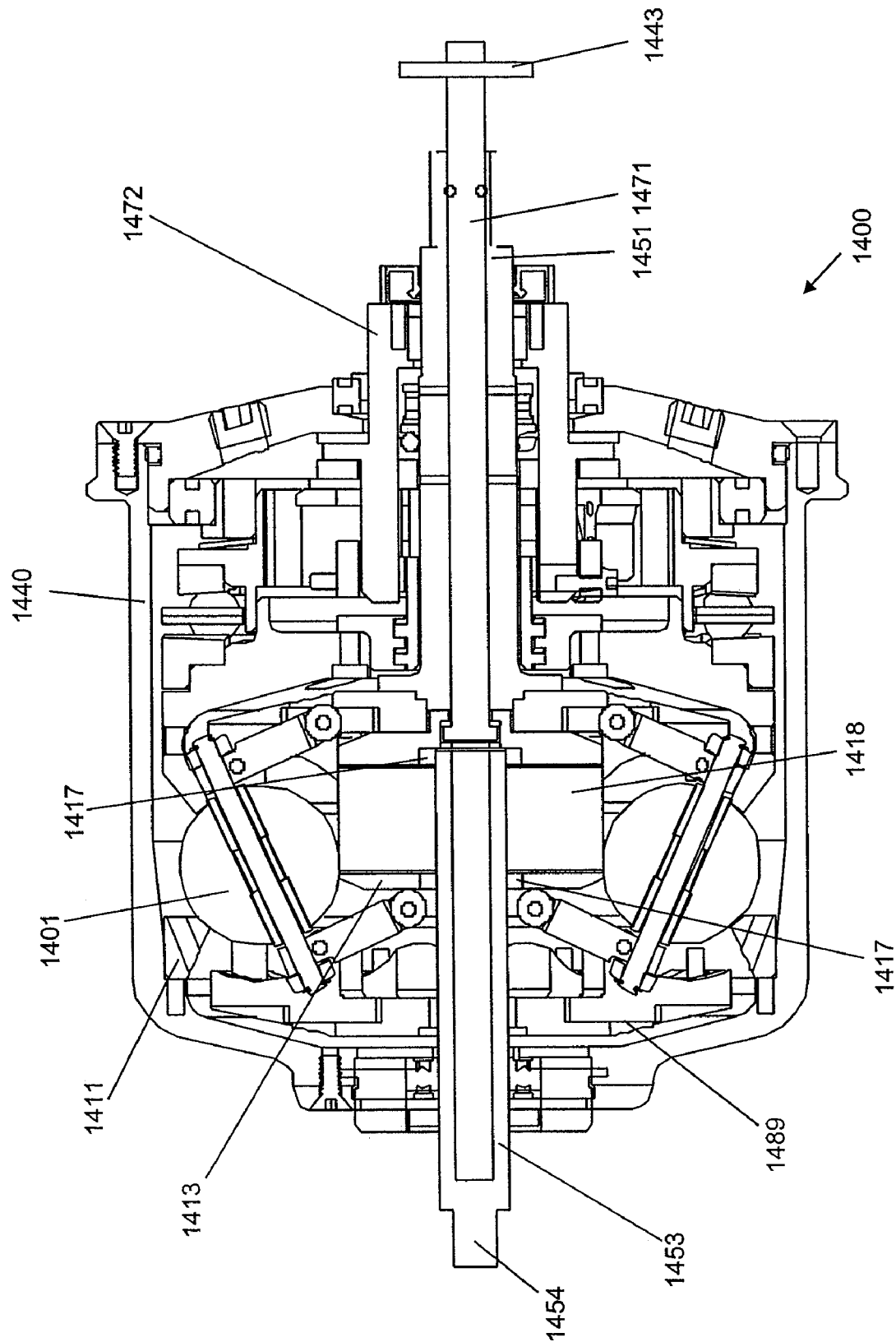
FIG. 14 is a cross-sectional side view of an alternative embodiment of a continuously variable transmission where the output disc is part of a stationary hub.

Another transmission 1400 that is similar to the one illustrated in FIG. 13 is illustrated in FIG. 14. In this embodiment, the output disc 1411 is also fixed to the case 1440, however, the case 1440 is fixed and does not rotate. In this embodiment, however, similar to the embodiment illustrated in FIG. 11, the cage 1489 is free to rotate relative to the output disc 1411 and the case 1440. This means that the output is again through the idler 1418. In this embodiment the idler 1418 is attached to a moveable output shaft 1453 similar to that described in the embodiment of FIG. 11. The output shaft 1453 terminates at the far end on the output side in an output spline 1454, which allows coupling of the moveable output shaft 1453 to whatever device is being supplied with torque by the transmission 1400. In this embodiment, torque is supplied to the transmission 1400 via the input shaft 1472 by a chain and sprocket (not shown), by an input gear (not shown) or by other known coupling means. The torque then passes through to the input disc 1434 as described in the preceding embodiment. However, as described, with reference to FIG. 13, the balls 1401 ride along the surface of the output disc 1411 and transfer torque to the idler 1418.

As with the embodiment illustrated in FIG. 11, by supplying the torque output via the idler 1418, the shift guides 1413 of this embodiment are supported by bearings 1417 on the outer surface of the output shaft 1453. This transmission 1400 is shifted by moving the shift rod 1471 axially and is actuated by an actuator 1443. The actuator can be the shift cap of FIG. 13, or a wheel or gear controlled by an actuating motor or manually, or the actuator 1443 can be any other mechanism for axially positioning the shift rod 1471, such as one or more hydraulic pistons. In some embodiments, the axial force generator 1460 and the shifting mechanism illustrated below in FIG. 15 is utilized. Through this embodiment, a very high transmission ratio can be achieved at a very high efficiency and with very little frictional losses when compared with other transmission types.

Referring now to FIG. 15, another alternative axial force generator 1560 is illustrated. In this embodiment the screw 1535 is located in the inner bore of the bearing disc (not shown) instead of the input disc 1534. In this embodiment, the screw 1535 is driven directly by the drive shaft (not shown) via splines 1575, which mate with matching splines from the drive shaft. The screw 1535 then distributes torque to the input disc 1534 via central screw ramps 1598 and central disc ramps 1599 and to the bearing disc via its threads 1576 and a corresponding set of internal threads (not shown) formed on the inner surface of the bore of the bearing disc. As the screw 1535 is rotated by the drive shaft, a set of central screw ramps 1598 that are formed on the output end of the screw 1535 is rotated and engages and rotates a complimentary set of central disc ramps 1599. The central disc ramps 1599 are formed on a thrust washer surface formed on the input side of the input disc 1534 near its inner diameter, and as they are rotated by the central screw ramps 1598, the central disc ramps 1599 begin to apply torque and axial force to the input disc 1534 from the reaction of the angled surfaces of the central ramps 1598, 1599. Additionally, the rotation of the screw 1535 causes its threads 1576 to engage with the threads of the bearing disc to begin to rotate the bearing disc.

Referring now to FIG. 15 in the illustrated embodiment, the axial force generator 1560 is directly affected by the position of the idler 1518. In this embodiment, the idler assembly has a tubular extension called a pulley stand 1530 that extends from the input side thrust guide 1513 and that ends near the input disc 1534 in an annular extension spreading radially outward. A linkage assembly made up of a fixed link 1516, a first link pin 1517, a short link 1512, a cam link 1514, a cam link pin 1515 and a stationary cam pin 1523 extends axially toward the screw 1535 from the pulley stand 1530 and positions the screw 1535 axially depending on the transmission ratio. The links 1516, 1512 and 1514 are generally elongated struts. The fixed link 1516 extends from the input end of the pulley stand 1530 toward the screw 1535 and is connected to the intermediate short link 1512 by the first link pin 1517. The first link pin 1517 forms a floating pin joint between the fixed link 1516 and the short link 1512 such that the short link 1512 can rotate about the first link pin 1517 as the two links 1516, 1512 move axially during shifting. The short link 1512 is then connected at its other end to the cam link 1514 by a cam link pin 1515 and thereby forms a floating pin joint. The cam link 1514 is fixed axially by a stationary cam pin 1523 that is fixed to the axle 1571 or another stationary component and forms a pin joint about which the cam link 1514 rotates as the idler 1518 moves axially.

In the following description, for simplification of the drawing, the bearing disc 60, ramp bearings 62, perimeter ramps 61 and input disc ramps 64 of FIG. 1 are not separately illustrated, but similar components can be utilized to fulfill similar functions in the present embodiment. When the axial force generator 1560 illustrated in FIG. 15 is in a high transmission ratio, the idler 1518 is located at an axial position at its far input side and therefore the fixed link 1516 is also located at its farthest axial point toward the input side. The first link pin 1517, the short link 1512 and the second link pin 1521 are all located towards the input side and therefore the cam link 1514 is oriented about the stationary cam pin 1523 such that its cam surface (not separately illustrated) is rotated away from the screw 1535. The cam link 1514 applies cam force to the screw 1535 when it is rotated about its fixed stationary cam pin 1523 axis to force the screw toward the output side when in low transmission ratios. However in low transmission ratios, as illustrated, the cam surface of the cam link 1514 is rotated away from the screw 1535. This allows the screw 1535 to settle at its farthest point towards the output side and results in the bearing disc rotating counter-clockwise, looking from the input side towards the output side, about the screw 1535 in order to maintain engagement with the screw threads 1576. As this occurs the bearing ramps are rotated counter-clockwise allowing the disc bearings (not illustrated here but similar to those previously described with respect to FIG. 1) to roll to a point between the bearing disc ramps and the ramps of the input disc 1534 where the bearings provide little or no axial force.

Meanwhile, due to the extreme position of the screw 1535 to the left as viewed in FIG. 15, the central screw ramps 1598 are engaged with the central disc ramps 1599 fully such that the input disc 1534 is rotated clockwise slightly to allow the axial position of the screw 1535 in its farthest output side position. The rotation of the input disc 1534 in this manner means that the input disc ramps have rotated in an opposite direction of the bearing disc ramps thereby amplifying the effect of unloading the perimeter ramps and bearings. In such a situation, the majority or all of the axial force is being applied by the central ramps 1598, 1599 and little if any axial force is generated by the perimeter ramps.

As the idler 1518 moves toward the output side to shift to a lower transmission ratio, the linkage assembly becomes extended as the fixed link 1516 moves axially away from the screw 1535, and the cam link 1514 is rotated about the stationary cam pin 1523. As the cam link 1514 is rotated about the cam link pin 1523, the axial motion of the fixed link 1516 acts upon one end of the cam link 1514, while the other end moves toward the screw 1535, thereby reversing the direction of the axial force applied by the fixed link 1516. By adjusting the lengths of where the various connections are made to the cam link 1514, the axial force applied by the fixed link 1516 can be diminished or magnified by lever action. The cam end of the cam link 1514 applies an axial force to a thrust washer 1524 on the output side of the screw 1535. The thrust washer 1524 engages a screw thrust bearing 1525 and a bearing race 1526 to supply the resultant axial force to the screw 1535. In response, the screw 1535 moves axially toward the input side and its threads 1576 rotate the bearing disc clockwise, looking from input side to output side, causing the perimeter ramps to rotate so that the ramp bearings are moved along the perimeter ramps to a position where they begin to develop axial force. At the same time, due to the axial movement of the screw 1535 toward the input side, the central screw ramps 1598 are disengaged from the central disc ramps 1599 and the input disc 1534 rotates, relative to the screw 1535, counter-clockwise, again aiding the movement of the perimeter ramp bearings to a position to generate axial force. Through this lever action of the linkage assembly, the axial force generator 1560 of this embodiment efficiently distributes the axial force and torque between the central ramps 1598, 1599 and the perimeter ramps.

Also illustrated in FIG. 15 is an alternative leg assembly to that of FIG. 3 that allows for a reduced overall size of the transmission. In the illustrated embodiment, the rollers 1504 are positioned radially inward on the legs 1502 as compared to the legs 2 of FIG. 3. Additionally, the input disc 34 and output disc (not shown) contact the balls 1 at a point closer to their axes which reduces the load on the idler 18 and enables the transmission to carry more torque. With these two modifications, the input disc 34 and output disc (not shown) of this embodiment can be reduced in total diameter to a diameter substantially the same as the farthest opposing points on two diametrically opposing balls 1501 of this embodiment as illustrated by the line "O.D."

Another feature of the embodiment illustrated in FIG. 15 is a modified shifting assembly. The rollers 1504 of this embodiment are formed as pulleys each with a concave radius 1505 at its outer edge instead of a convex radius. This allows the rollers 1504 to fulfill their function of aligning the ball axles 1503 but also allows them to act as pulleys to change the axes of the ball axles 1503 and the balls 1501 in order to shift the transmission. The flexible cables 155 described with respect to FIGS. 1 and 5, or similar shifting cables can be wrapped around the rollers 1504 of one side so that when a tension is applied, those rollers 1504 come closer together, thereby shifting the transmission. The shifting cables (not illustrated in FIG. 15) can be guided through the cage (item 89 of FIG. 1) to the rollers 1504 by guide rollers 1551, which in the illustrated embodiment are also pulleys mounted on guide shafts 1552 to the output end of the pulley stand 1530.

In some embodiments, the guide rollers 1551 and the guide shafts 1552 are designed to allow the axis of the guide rollers 1551 to pivot in order to maintain a pulley-type alignment with the rollers 1504 as the ball axles 1503 change their angles with respect to the axis of the transmission. In some embodiments, this can be accomplished by mounting the guide shafts 1552 to the pulley stand 1530 with pivot joints or trunnions, or any other known method. In this embodiment, one shift cable can act on one set of rollers 1504 on either the input side or the output side of the balls 1501 and a spring (not shown) biases the ball axles 1503 to shift in the other direction. In other embodiments, two shifting cables are used with one on one side that draws the rollers 1504 on its side radially inward and another cable on the opposite end of the balls 1501 that draws the rollers 1504 on its respective side radially inward shifting the transmission thusly. In such an embodiment a second pulley stand 1530 or other suitable structure is formed on the output end of the shift guides 1513 and a corresponding set of guide shafts 1525 and guide rollers 1551 is mounted on that second pulley stand 1530. The cables (not shown) of such embodiments pass through holes or slots (not shown) formed in the axle 1571 and out of the transmission via the axle 1571. The cables can pass out of either or both of the ends of the axle 1571 or they can pass out of additional holes formed through the axle 1571 axially beyond either or both the input disc (not shown) and the output disc (also not shown), or the hub (not shown) it the output disc is a rotating hub. The holes and or slots through which the cables pass are designed to maximize the life of the cable material through the use of radiused edges and pulleys, and such design elements are used in various locations of the axle and transmission for conveyance of the cable.

Servo Control Systems

The embodiments described herein can be used in a servo control system, such as, for example, in a power-assisted steering system. The variator and transmission can be utilized at or near its zero output transmission ratio to correct angular misalignments of a control shaft and the transmission's output shaft. In some steering embodiments, the continuously variable transmission is arranged coaxially with a steering wheel or other rotary actuating member and a steering mechanism such that the continuously variable transmission reacts and corrects an angular misalignment between the output shaft of the transmission and the steering shaft connected to the steering wheel.

Figure 16A:
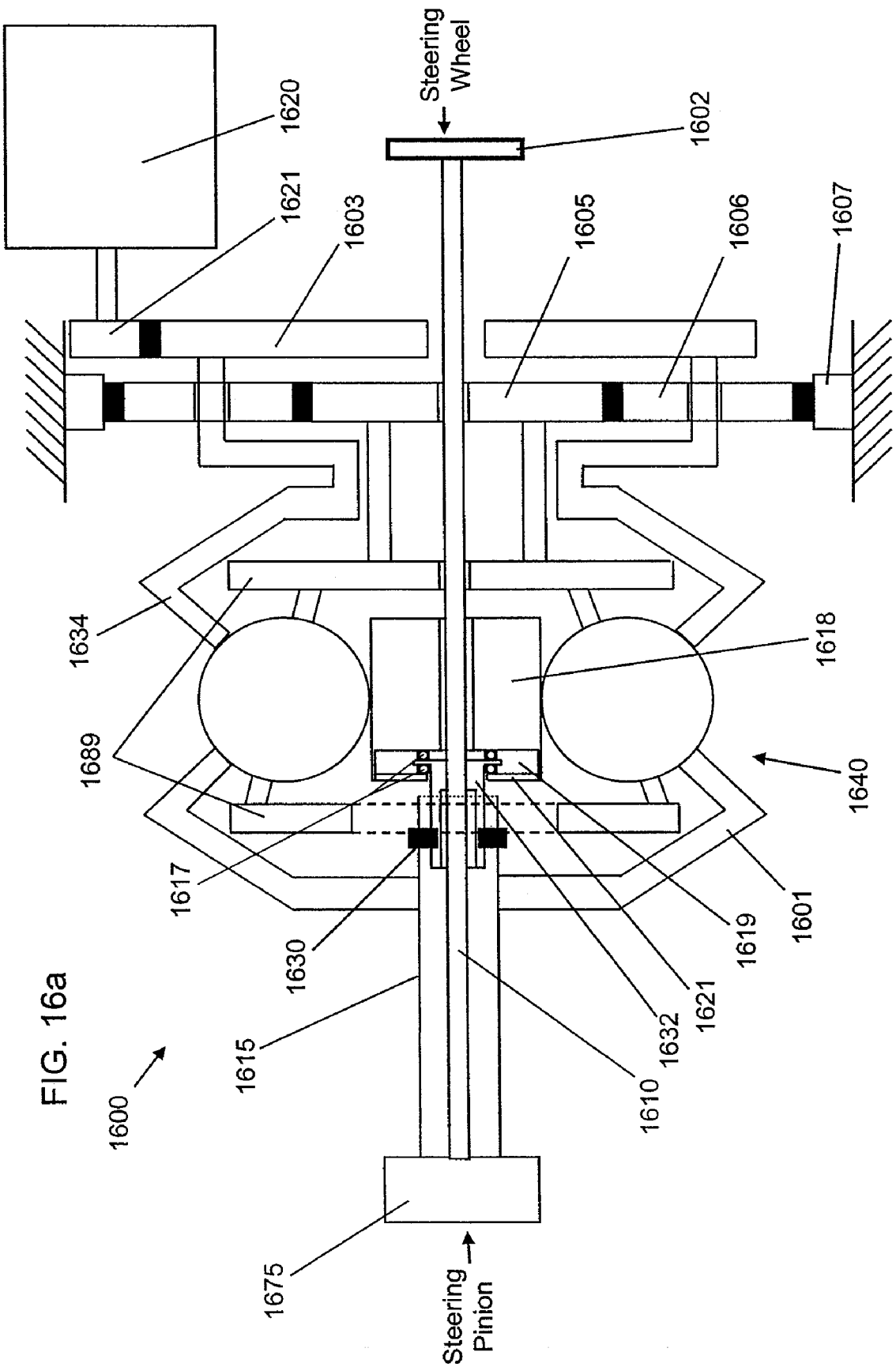
FIG. 16*a* is a schematic side view of a power-assisted steering system utilizing an infinitely variable transmission.

FIG. 16a illustrates one embodiment of a servo control system used as a power assisted steering system 1600. A steering wheel 1602 provides a direct input to a steering pinion 1675 of a rack and pinion steering mechanism through a steering shaft 1610. The steering shaft provides torsional flexing as will be described later to provide shifting control signals for the power assisted steering system 1600. The steering system 1600 includes the output of a constant speed electric motor 1620 that is connected to the planet carrier 1603 via motor output gear 1621. While the motor output gear 1621 engages in this embodiment by meshing with external teeth formed on the outer edge of the planet carrier 1603, the motor 1620 can provide input torque to the planet carrier 1603 by any mechanism known in the art such as, for example, pulley and sprocket. The planet carrier 1603 in this embodiment is connected to each of a set of planet gears 1606, which rotate about a plurality of shafts that extend from the planet carrier 1603, and also to the input disc 1634. The planet gears 1606 engage at their radially outward side with the ring gear 1607, which is fixed and does not rotate, and at their radially inward side with the sun gear 1605. Therefore, the planet gears 1606 rotate the sun gear 1605 at a fixed rotation rate determined by the speed of the electric motor 1620, the radii of the planet gears 1606 and the radius of the sun gear 1605.

The variator 1640 of this embodiment acts as a variable planetary gear set in series with the fixed planetary gear set made up of the ring gear 1607, the planet gears 1606 and the sun gear 1605. The sun gear 1605 drives the cage 1689 of the variator 1640 and the planet carrier 1603 drives the input disc 1634. The torque provided to the cage 1689 and the torque provided to the input disc 1634 are summed by the variator 1640 and transmitted to the output disc 1601. The output disc 1601 drives a power assist shaft 1615 in this embodiment, which adds the additional torque to assist the manual steering applied to the steering wheel 1601 in this embodiment.

In other embodiments, the motor 1620 provides input torque to the sun gear 1605 directly, which drives the planet gears 1606 and the planet carrier 1603, thereby driving the input disc 1634. In such embodiments, the rotational speed transmitted to the input gear 1634, and therefore the balls (not separately referenced in this figure) and the idler 1618 is significantly reduced.

In still other embodiments of the steering system 1600, the planetary gear set is removed. The motor 1620 of this embodiment provides input directly to the cage 1689 and the input disc 1634 is fixed to the case (not separately identified). In such embodiments, the construction and design of the steering system 1600 is simplified.

Still referring to FIG. 16a, the amount and rotational direction of the output assisting torque applied by the power assist shaft 1615 is determined by the transmission ratio of the variator 1640. The system 1600 accomplishes the control of the transmission ratio through a mechanical connection of the variator 1640 and the steering wheel 1602. As a driver turns the steering wheel 1601 to turn the steering wheels of a vehicle, the steering shaft 1610 is rotated and thereby begins to rotate the steering pinion 1675. In a typical steering system, the steering pinion 1675 engages a steering rack (not shown) that is typical of a rack and pinion steering system. The rack is connected at each end via steering tie rods (not shown) to steering arms on the hubs of the steering wheels of the vehicle (all not shown). Such components are standard items in steering systems.

As the driver begins to apply torque to the steering shaft 1610 by turning the steering wheel, the steering shaft 1610 transmits that torque to the steering pinion 1675, which engages the rack to convert the rotational torque of the steering wheel 1601 into linear motion of the ends of the rack, which is then transferred to the wheels via the tie rods and steering arms. This applies a moment to the wheel that tends to rotate each wheel about its turning axis of rotation, which is resisted by the frictional contact of the tire and the road. As the road resists the turning of the tire, the torque applied to the steering shaft 1610 must be increased to cause the wheels to turn. The steering shaft is designed with a flexural modulus that allows the steering shaft to begin to torsionally flex at a desired torque level in response to the torque applied to the steering wheel 1602. Because the power assist shaft 1615 is attached to the steering pinion 1675 coaxially with the steering shaft 1610, as the steering shaft 1610 begins to torsionally flex, as just described, it becomes angularly misaligned with the power assist shaft 1615. This angular misalignment is used in this embodiment to shift the variator 1640.

In the embodiment illustrated in FIG. 16*a*, a generally tubular shifter 1632 is angularly aligned with and axially moveable along the steering shaft 1610. The shifter 1632 is a relatively short tube that is splined to, or otherwise angularly aligned with, a portion of the steering shaft 1610. The shifter 1632 has a first end near the idler 1618 and a second end facing away from the idler 1618. The first end of the shifter 1632 is designed to dynamically connect to the idler 1618 so that as the idler 1618 rotates during operation of the variator 1640, the shifter 1632 can move the idler 1618 axially in order to shift the transmission ratio of the variator 1640. In the illustrated embodiment, the first end of the shifter 1632 has a flange extending radially outward from the rest of the tubular body of the shifter. The first end of this shifter 1632 fits within a recess 1619 of the idler 1618 and is held within the idler 1618 by a retention ring 1621. The retention ring 1621 can be a snap ring 1621 or can have a threaded outer diameter to screw into the recess 1619. Thrust bearings 1617 allow the idler 1618 to rotate relative to the shifter 1632 while allowing the shifter 1632 to apply an axial force to move the idler 1618 axially, in order to shift the idler 1618.

Still referring to FIG. 16*a*, a steering pin 1630 extends in a transverse manner through the shifter 1632 and fits into a spiraling slot formed in the power assist shaft 1615. The steering pin 1630 slides along the spiral slot in the power assist shaft 1615. As the steering shaft 1610 begins to torsionally flex, the shifter 1632 and the steering pin 1630 begin to become angularly misaligned with the power assist shaft 1615. The spiral shape of the slot in the power assist shaft 1615 causes a camming effect that moves the shifter 1632 axially, depending on the direction of the angular misalignment. The axial movement of the shifter 1632 drives the idler 1618 to move axially and shift the power steering system 1600 to a transmission ratio that produces an output in the output disc 1601, which output acts to correct the angular misalignment. As the angular misalignment is corrected, as the vehicle attains the appropriate turning attitude, the steering pin 1630, the shifter 1632 and the idler 1618 begin to ease back to their respective zero-output positions and the output disc 1601 provides less or no output torque.

When the power assist shaft is applying no torque, such as when a vehicle is traveling straight, the variator 1640 is at a ratio providing zero output. When the power assist shaft is applying some power assist in the clockwise direction as viewed in FIG. 16*a* along the steering shaft 1615 from right to left, the variator 1640 is in a ratio providing a slight output torque in that direction. When the power assist shaft 1615 is applying some power assist in the counter-clockwise direction as viewed in FIG. 16*a* along the steering shaft 1610 from right to left, the variator 1640 is in a ratio providing a slight output torque in that direction. Therefore, the entire range of the ratios available in several embodiments of FIG. 16*a* will be around the zero output range as high ratios are not typically required in such applications. However, in other applications, higher ratios ranges may be necessary and the mechanical attachments should be designed to optimize the ratio range for each application.

Still referring to FIG. 16*a*, this system 1600 provides a way of adjusting the output of the variator 1640 to respond directly and mechanically to the action of the driver in turning the steering wheel. This system 1600 is merely one example of a directly responsive shifting mechanism and many other such control mechanisms can be used. The key characteristics of many embodiments of such a control circuit for a steering system is that as the steering wheel 1602 begins to turn, the variator 1640 should begin to apply an output rotation in the appropriate direction until an equilibrium is reached between the torque applied to the steering wheel 1602, the power assist provided by the power assist shaft 1615 and the feedback force provide by the wheels of the vehicle, or rudder if in a water borne vessel, through the rack and steering pinion 1675.

Figure 16B:
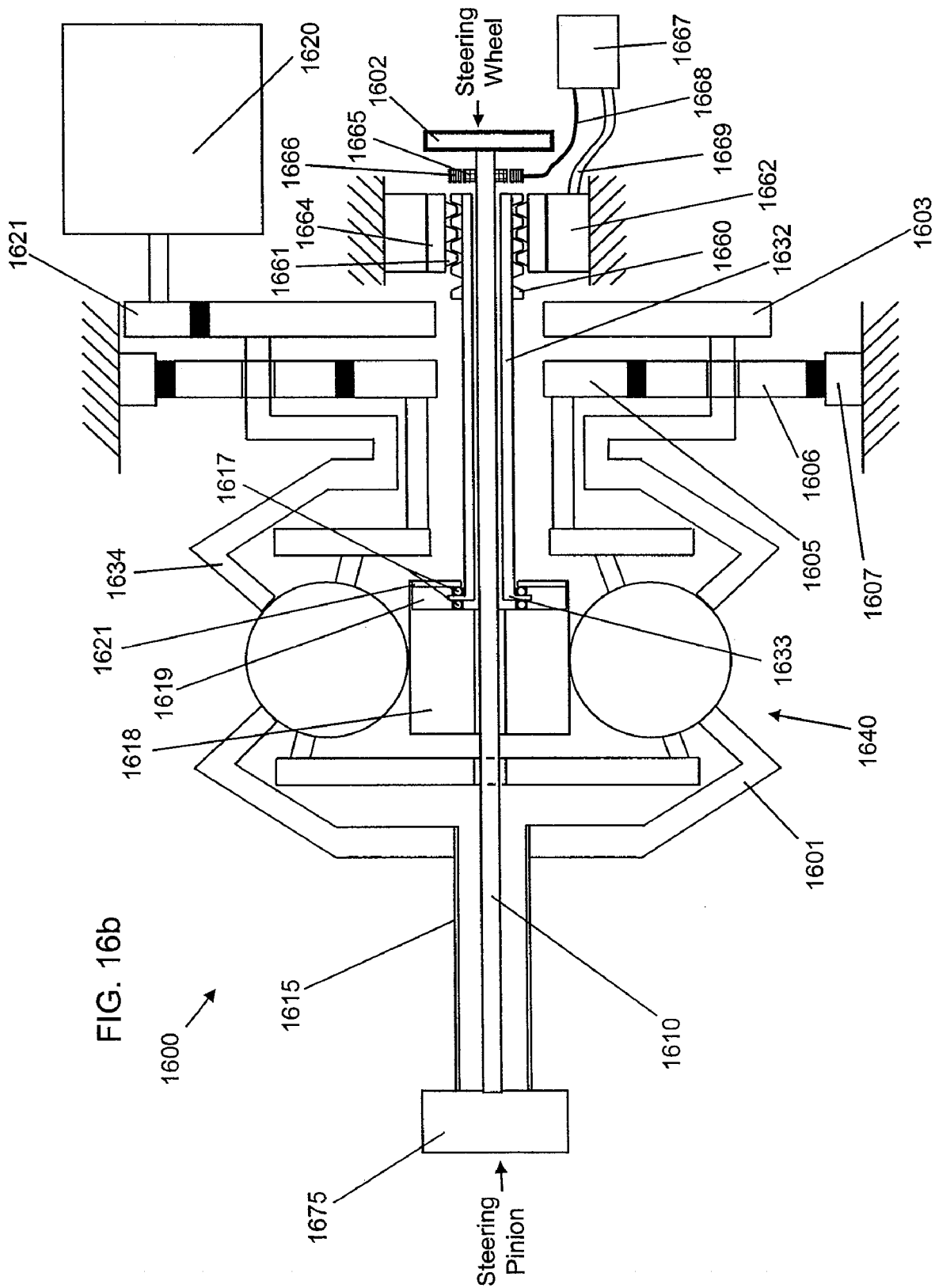
FIG. 16*b* is an alternative embodiment of the steering system of FIG. 16*a* implementing an alternative ratio control mechanism.

The steering system 1600 illustrated in FIG. 16*a* accomplishes its control function mechanically, but this can easily be programmed into a hydraulic or electric control system, as described herein, to achieve similar or different results as desired. FIG. 16*b* illustrates an additional embodiment utilizing an alternative shifting mechanism. In this embodiment, the axial position of the idler 1618 is controlled in a manner similar to that described above for FIG. 16*a*, in that the idler 1618 has a recess 1619 in one of its ends, the input end in this case, and the shifter 1632 now extends from within the recess 1619 in the idler 1688 towards the steering wheel 1602. The shifter 1632 has a flange 1633 in this embodiment that is retained within the recess 1619 by thrust bearings 1617 and a retention ring 1621 similar to the analogous or same components of the previously described embodiments. The shifter 1632 extends toward the steering wheel 1602 and extends beyond the planet carrier 1603 where it terminates having a lead screw 1660 formed on this end.

Still referring to FIG. 16*b*, the lead screw 1660 can be any set of threads formed on the outer surface of the shifter 1632, but some embodiments utilize acme threads. The lead screw 1660 is engaged by a set of internal threads 1661, which is a set of complimentary threads facing inward and engaging with the lead screw 1660 and which are mounted on the inside of a shift ring 1664. The shift ring 1664 is a tubular ring having the internal threads 1661 formed upon its internal surface and which is rotated about the steering shaft angularly by a shifting motor 1662. The shifting motor 1662 is mounted to a fixed surface and is capable of rotating the shift ring 1664 about the steering shaft in either direction in order to engage the internal threads 1661 with the lead screw 1660 and thereby move the shifter 1632 axially depending on the direction of rotation of the shift ring 1664. The shifting motor 1662 is an electric motor in the illustrated embodiment, but could also be hydraulic or pneumatic. In alternative embodiments, the lead screw 1660 is replaced by a piston (not shown) and the shift ring 1664 and internal threads 1661 are replaced with a pneumatic or hydraulic cylinder (not shown), wherein the piston is positioned within the cylinder by a hydraulic or pneumatic control circuit, which are common in the art.

Still referring to FIG. 16*b*, the activation of the shifting motor 1660 is determined by an indicator 1665 and a sensor 1666. The indicator 1665 is mounted on the steering shaft 1610 and indicates any angular motion by the steering shaft 1610 to the detector 1666. The detector 1666 is arranged radially around the indicator 1665 and detects the magnitude and direction of the angular rotation of the steering shaft 1610. The indicator 1665 and detector 1666 can be any type of component capable of fulfilling their described functions such as, but not limited to, rotary encoders or any other such devices. The indicator 1665 and detector 1666 can also comprise multiple components such as where the indicator 1665 is an annulus extending from the steering shaft 1610 and the detector 1666 is capable of reading the position or motion of the annulus. In one embodiment, the indicator 1665 comprises an annular gear that moves a rack, which creates linear displacement and the detector 1666 is a linear encoder capable of very fine motion detection.

Still referring to FIG. 16*b*, the detector 1666 provides a motion signal to a controller 1667 via one or more signal lines 1668 and the controller 1667 sends motor control signals to the motor via one or more control lines 1669. The controller 1666 can sample the position or motion of the steering shaft 1610 by controlling the detector 1666, or the detector 1666 can provide a set of position signals to the controller 1667 at a specific rate. The faster the motion signals are sampled, the more sensitive the response of the power assistance. For example, in one embodiment the controller can receive signals from the detector at a rate of between 5 and 20 million signals per second although higher or lower frequencies can be used as are common in the industry. In other embodiments, the indicator 1665, the detector 1666, the controller 1667, the signal lines 1668 and the control lines 1669 are replaced by the power steering pump and rotary valve system of current power steering systems in conjunction with the cylinder and piston described above. Such a system is common in current steering systems and can be implemented as described herein.

Figure 16C:
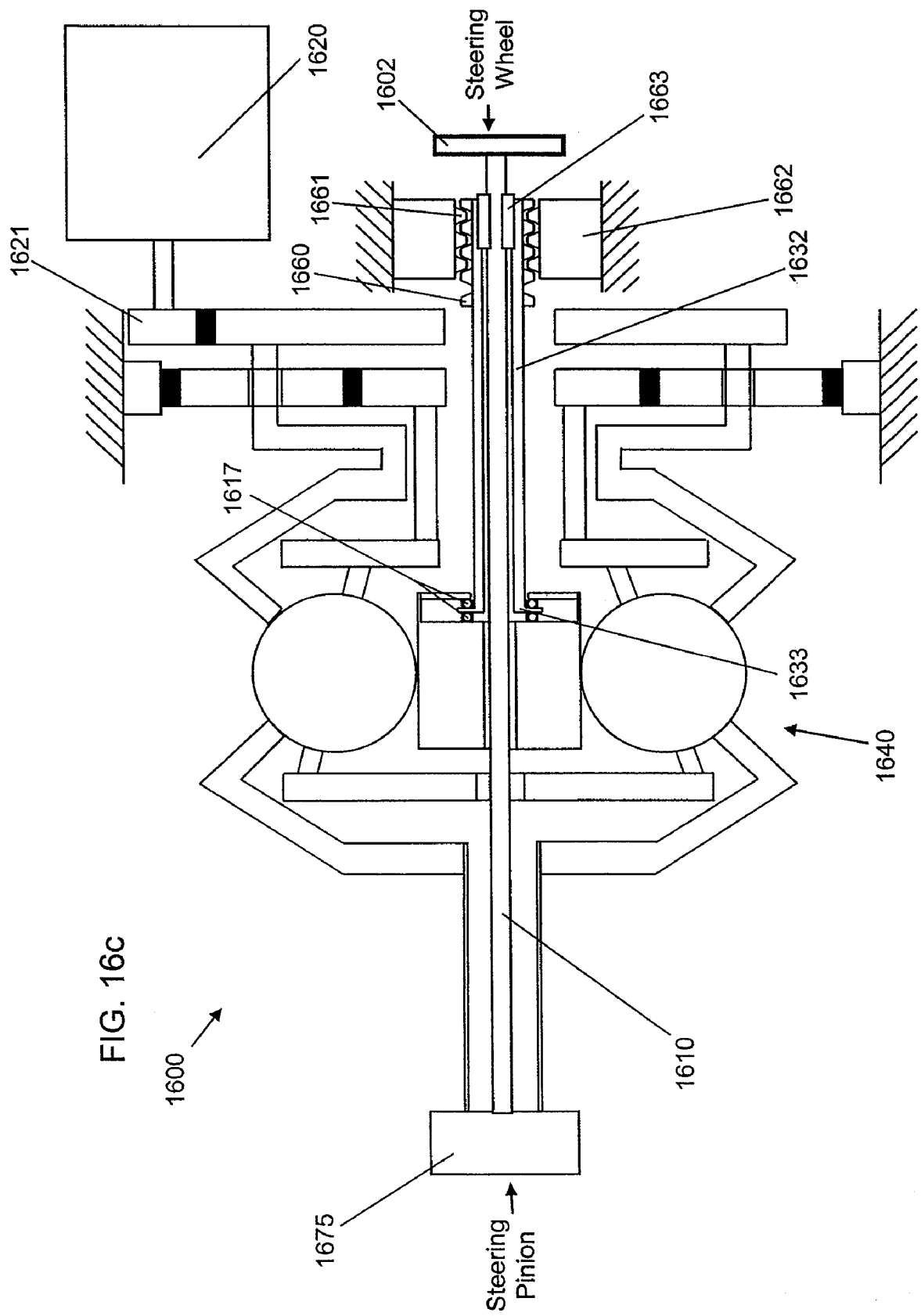
FIG. 16*c* is another alternative embodiment of the steering system of FIG. 16*a* implementing another alternative ratio control mechanism.

FIG. 16*c* illustrates yet another alternative embodiment for a power assisted steering system 1600. Only the differences between the embodiments illustrated in FIGS. 16*b* and *c* will be discussed. In the illustrated embodiment, the shifter 1632 is angularly aligned with the steering shaft 1610 by splines 1663 or keyways and keys or other such structure and thereby rotates with the steering shaft 1610. In some embodiments, ball splines or other low friction structures are used as the splines 1663 in order to ease the turning force required by the operator. As with the previous embodiment, the lead screw 1660 and the internal threads 1661 engage one another to create axial movement of the shifter 1632 in reaction to rotation of the steering wheel 1602. However, in this embodiment, the internal screws 1661 are fixed by a retaining ring 1662 to a support structure rather than to a rotating motor. Therefore, the internal threads 1661 do not rotate about the steering shaft 1610.

In the illustrated embodiment, as the steering wheel 1602 is rotated by an operator, the splines 1663 rotate the shifter 1632, which rotates the lead screw 1660, which engages with the internal threads 1661 to develop an axial force that changes the axial position of the shifter 1632 in order to change the position of the idler 1618 and develop an output torque to respond to the steering of the operator. The gain or reaction rate of the steering system 1600 response of the illustrated embodiment to the input steering by the operator can be adjusted by controlling the pitch of the internal threads 1661 and the corresponding lead screw 1660. The shifting mechanisms described for the various embodiments illustrated in FIGS. 16*b-c* can be used for any of the transmission embodiments described or incorporated herein in order to achieve advantageous shifting control and manipulation.

Gearing Systems

Due to the extremely configurable nature of the embodiments of the IVTs and CVTs described and incorporated herein, and the high degree with which the components can be easily scaled in size to accommodate the amount of torque and rotational power to be transmitted, the IVTs and CVTs make extraordinarily advantageous gear sets. Either reduction gears or step-up gears can be configured by the various embodiments herein as the input disc, output disc, and variator of each embodiment create a continuously variable planetary gear set as described herein. The addition of an additional fixed ratio planetary gear set or additional CVTs lined up in successive arrangement allows designers to achieve infinite gearing ratios and flexibility. For instance, the variator 401 of FIG. 7 can be combined with a planetary gear set as illustrated in FIGS. 11, 16*a-c* to create the speed reduction system illustrated in FIG. 17. FIG. 17 is a schematic view of a transmission system 1700 that can suffice as such a continuously or infinitely variable gear set. The illustrated transmission system 1700 includes a planetary gear set 1730, a variator 1740, and an output shaft 1710 that receive and transmit rotational energy from an input torque source 1720. The torque source 1720 can be an engine, a motor, a piece of industrial equipment, a differential, a shaft, or any other source of rotational energy. Additionally, although this schematic illustration shows the output shaft 1710 connected to the output disc 1711 of the variator 1740, it should be understood that the output disc 1711 can easily be connected to the cage 1789 or the idler 1718 of the variator 1740 as well, as described and illustrated herein and in copending U.S. patent application Ser. No. 10/788,736 incorporated above (hereinafter "the '736 application"), and this description applies to those embodiments as well. Furthermore, although the illustrated embodiment shows the ring gear 1737 as being fixed and the planet carrier 1733 and the sun gear 1735 of the planetary gear set 1730 as being attached to the input disc 1734 and the cage 1789 of the variator 1740, respectively, any of the connective combinations identified in the tables of the '736 application can be used and the following discussion applies to those as well.

Such variable gear sets can be used effectively in any system that utilizes or transmits rotational energy or converts linear motion into rotational motion or vice versa. In systems where a variable input speed is provided and a fixed or relatively constant output speed is desired, the embodiments of the CVTs or IVTs described herein are exceedingly advantageous and useful. For instance, superchargers and turbochargers for combustion engines have efficiencies and performance characteristics that vary as a function of rotational speed either independently of one another or even dependent upon one another. However, the prime movers for these components, direct connection to the crankshaft for the supercharger and a turbine driven by exhaust gases for the turbocharger, also vary in supply speed or force depending on the rotation speed of the engine, which varies with throttle position. Therefore, in such applications, a variable speed gear set such as those described herein can be used to reduce the adverse effects of the changing input speed when a desired output speed of the pump of these components is desired.

For instance, a supercharger is typically utilized on diesel-powered vehicles such as semi-tractor trailers used in long-haul transportation of goods. The boost in intake pressure supplied from the supercharger to the engine is affected by the rate of rotation of the prime mover of the supercharger such as the crankshaft of the engine. It is desired to maintain the speed of rotation of the supercharger near a target speed at various conditions. Existing superchargers use a fixed ratio speed changing gear set to change the engine speed to the rough speed range used by the supercharger. Through the use of a continuously variable gear set as described herein, the speed of the supercharger could stay in a smaller range of operational speeds over the entire range of engine speeds thereby allowing increased efficiency of the supercharger over the entire range of engine speeds. This is also true for any pump or turbine application. Most, if not all, centrifugal pumps and turbines have performance characteristics that vary with the speed of their respective prime movers. In all such applications, the use of the continuously variable gear sets described herein can be used to maintain the performance of these items in their preferred operational windows even as the speed of their respective prime movers varies within or out of the resultant desired speed range.

The planetary gear set 1730 can be any ordinary planetary gear set or it can be any advancement in such structures. For example, U.S. Patent Application Publication No. 2003/0232692 (hereinafter "the '692 application"), the entire disclosure of which is hereby incorporated by reference, discloses an example of an advance in planetary gear systems that can be implemented with the embodiments of IVTs disclosed herein. The variability created by the advancement disclosed in the '692 application can be utilized to further increase the variability of the IVTs described herein, allowing such embodiments to fulfill even more functions. Similarly, U.S. Patent Application Publication No. 2003/0153427, the entire disclosure of which is hereby incorporated for all that it discloses, discloses an advancement in planetary gear systems in which the planetary gear set varies the input to output speed ratios as a function of the load transmitted through the system. Again, such a system can be used in the IVTs described herein to create a greater range of effective ratios, or to vary the torque transferring capabilities of the transmission system.

Control Mechanisms and Systems and Protocols

Many advances have been made for controlling the transmission ratio of past CVT designs such as toroidal and adjustable pulley CVTs. Many of these control systems can be adjusted and revised to take advantage of the advanced design and increased efficiency of the IVTs and CVTs described herein. For instance, U.S. Patent Application Publication No. 2003/0228953 A1 (hereinafter the '953 application) describes a control system and shifting protocol for a CVT that is utilized on a variable pulley-type CVT that can be adjusted as described herein to take advantage of many of the embodiments described above to provide a shifting control protocol and system, and the entire disclosure of that application is incorporated herein by reference. In the CVT described as being controlled in that published application, clutches and brakes are required that allow the transmission of that application to shift from forward transmission ratios to reverse transmission ratios. Many of the embodiments described herein allow a transmission to shift from its highest forward transmission ratio to its highest reverse transmission ratio through its continuous shifting range without changing the engagement of any of the components of the transmission.

The '736 application incorporated above describes numerous combinations of input, throughput and output of the embodiments of the IVTs described therein. Many of those can be successfully utilized as the transmission for a vehicle such as a car. In one embodiment, such as that illustrated in FIG. 17, where the planetary gear set 1730 is positioned on the input side of the variator 1740, the crank shaft 1720 from the engine of a car is provided as input to the planet carrier 1753 of the planetary gear set 1730 of the transmission 1700, the cage 1789 is free to rotate, the ring gear 1737 is fixed to the case (not separately identified) of the transmission 1700 or to some fixed support structure of the vehicle, the idler 1718 is free to rotate and the output shaft 1710 is connected to the output disc 1711. In such an embodiment, the range of possible transmission ratios is affected by the ratio of the circumference of the ring gear 1737 to that of the planet gears 1736, or the PG ratio for this configuration. Some embodiments utilize a PG ratio between 1.5 and 10. In other embodiments, the PG ratio is between 2 and 5, while in still other embodiments a PG ratio of between 3 and 4 is utilized. Some embodiments use a PG ratio of 3.

Some embodiments of the IVTs described herein conforming to these PG ratios provide transmission ratios adequate for many applications and provide high efficiency, suitable transmission ratio range and operational simplicity for nearly any vehicle using such a transmission. For instance, with a PG ratio of 3, some IVTs of the embodiments described herein that are configured as just described can provide engine input to transmission output ratios ranging from about 2.5 forward to 0 forward all the way to 2.5 in reverse without ever disengaging any of their components. This setup also allows the coaxial alignment of the input shaft and the output shaft, thereby leading to decreased overall size, reduced and simplified resultant torsional stresses and various other advantages known to those of skill in the art.

To incorporate the control functions of the embodiments described in the above-mentioned '953 application with many of the IVTs described and incorporated herein, the clutches and brakes are removed and the ECU described in that control system is operably connected to the servo controls or the pneumatic or hydraulic controls utilized to control the IVTs so that the control system can be implemented and its advantages can be exploited and amplified. The fully continuous, manually shifted and staged protocols described in the '953 are all employed with many of the IVTs herein to provide performance that is significantly improved over the embodiments described in the '953 application.

Another example of the use of embodiments of the IVTs described herein as an advantageous improvement of existing technology can be illustrated with reference to U.S. Patent Application Publication No. 2003/0109347 A1 (hereinafter "the '347 application"), the disclosure of which is incorporated herein in its entirety. In the '347 application, a hydromechanical IVT is utilized on a tractor to maximize the functionality of the tractor where multiple speeds are desirable for various functions. Again, the IVT of that embodiment utilizes clutches and brakes to vary its speed over its range of transmission ratios. The IVT described in the '347 application, as with others like it, utilizes a parallel power path, that is two paths through which rotational power is transmitted from the input to the output that are not collinear with one another. This configuration requires a synchronization of components of the transmission in order to shift the various stages and realize the full transmission ratio range. This adds unnecessary parts and complexity, and therefore cost, to the transmission. In contrast, many of the IVTs described and incorporated herein utilize a collinear pair of power paths that do not require synchronization or clutching and braking in order to vary the transmission ratio over its entire range. Additionally, because power can be output via any one or many possible combinations of the output disc, the cage and the idler, the IVTs described herein, provide for both power output to the drive train as well as a power takeoff unit so that the same transmission can perform both functions simultaneously.

Referring also to U.S. Patent Application Publication No. 2001/0044358 (hereinafter "the '358 application) the entire disclosure of which is incorporated herein, another system for controlling a CVT is described that responds to requests by vehicle operators for changes in vehicle performance. In this embodiment, only belt-and-pulley and toroidal CVTs are contemplated, which require parallel power paths as well as synchronizing of components and the use of brakes and/or clutches to shift modes throughout the range of transmission ratios including reverse transmission ratios. Many embodiments of IVTs and CVTs described and incorporated herein can be advantageously implemented along with the CVT control system of the '358 application, as well as other publications incorporated above and below, by removing the control system and functions that require manipulation or adjustment of the forward/backward switching mechanism. Specifically, the manipulation of these components adds an additional calculation in the response to a demand for a change in driving conditions made by the driver. Through the use of the certain embodiments of the IVTs described and incorporated herein, such as for example the embodiment illustrated in FIG. 17, the response is simpler for the electronic control unit to employ and there is less chance of failure and a smoother resulting speed variation over the entire range of driving conditions.

Furthermore, because many of the IVTs and CVTs described and incorporated herein are analogous if not similar to existing planetary gear set-based automatic transmissions, many of the existing advances for controlling existing automatic transmissions can be advantageously employed on those IVTs, while employing the CVT and IVT control protocols described in the incorporated patents and published applications. For example, U.S. Patent Application Publication No. 2003/0027687, the entire disclosure of which is hereby incorporated by reference, discloses a control system that operates the engine in conjunction with a transmission controller. Any of the transmission control systems described herein can be used with such a control system in order to maximize vehicle efficiency regardless of engine displacement. Other such improvements can advantageously be employed as well.

As a further example, many of the embodiments of IVTs and CVTs disclosed and incorporated herein can also be advantageously employed in conjunction with the control systems disclosed in U.S. Patent Application Publication Nos. 2003/0162633 (hereinafter "the '633 application"), 2003/0158646 (hereinafter "the '646 application"), and 2001/0046924 (hereinafter "the '924 application"), the disclosures of all of which are hereby incorporated in their entireties. While the '633 application and the '646 application both operate a CVT that appears to lack reversing functions on its own, and the '924 application operates a CVT that includes the reversing mechanisms of other past advances, which include a planetary gear set and clutches and brakes, all of these applications control a belt-and-pulley CVT that is hydraulically or pneumatically controlled. Therefore, each of these applications require the manipulation and control of brakes and clutches in order to achieve the complete transmission ratio range spanning from high forward to high reverse. This means that the power train throughout the transmission undergoes connections and disconnections as the transmission ratio is varied over the entire range of ratios, and this may lead to decreased performance, safety or component life. The present embodiments of the IVTs and CVTs that utilize these control systems achieve their functions throughout their transmission ratio ranges without the switching and braking previously required.

U.S. Pat. No. 6,390,946 (hereinafter "the '946 patent"), the entire disclosure of which is hereby incorporated by reference, discloses a system designed to assist in the sensing of rotational speeds of various components. The '946 patent discloses the construction of a sensing system that can be applied to any of the rotating components of the IVTs and CVTs described and incorporated herein in order to provide speed signals to the transmission control system. Additionally, U.S. Patent Application Publication Nos. 2002/0095992 and 2003/0216216, the entire disclosures of both of which are hereby incorporated by reference, both describe additional sensing points and systems of a rolling traction CVT that can be utilized by the control units of embodiments described and incorporated herein to optimize the performance of the engine and transmission of those embodiments.

The signals provided by such sensing systems can be utilized by the systems described above or by U.S. Patent Application Publication Nos. 2002/0173895, 2003/0135316, 2003/0135315, 2003/0045395, 2003/0149520 and 2003/0045394, the entire disclosures of all of which are hereby incorporated by reference. These are additional control systems that can be implemented for use with the IVTs and CVTs described and incorporated herein. As mentioned previously, only the belt-and-pulley and toroidal CVTs were contemplated for use with these control systems and therefore the functional components and commands controlling the forward/reverse switching brakes and clutches can be removed to allow control of the present embodiments. Furthermore, whether the method of shifting any particular embodiment is electric motor, pneumatic or hydraulic piston or any other method, the systems incorporated herein can be adapted to such shifting mechanisms by any method known to those of skill in the art in order to achieve the advantages of the present IVTs and CVTs as controlled by the control systems described and incorporated above and below.

Furthermore, many advances have been made in the specific area of hydraulic control systems for controlling toroidal and belt-and-pulley type CVTs. Many of these systems and advances can be implemented for use in the hydraulically controlled embodiments of the IVTs and CVTs described and incorporated herein. For example, U.S. Pat. Nos. 5,052,236, 5,090,951, 5,099,710, 5,242,337, 5,308,298, 6,030,310, 6,077,185, 6,626,793 and 6,409,625 as well as U.S. Patent Application Publication Nos. 2003/0158009, 2003/0114259, 2003/0228952, 2002/0155918, 2002/0086759, 2002/0132698 and 2003/0158011, the entire disclosures of all of which are hereby incorporated by reference, disclose hydraulic control systems and control fluid systems as well as pressure system for use in either a toroidal or a belt-and-pulley transmission system. These control systems and circuits can be implemented on the IVTs and CVTs described and incorporated herein by adapting these systems to operate the piston of the hydraulically shifted transmission systems described herein. Furthermore, U.S. Pat. No. 6,464,614 discloses a hydraulic system that provides hydraulic supply circuitry or passages in the casing containing the remainder of the transmission system. Any or all of these systems or advances, or even combinations of them, are beneficial in various applications of the IVT and CVT embodiments described and incorporated herein.

Such hydraulic control systems can include feedback control information as well. U.S. Patent Application Publication Nos. 2003/0050149, 2002/0169051, 2002/0155910, the entire disclosures of all of which are hereby incorporated by reference, each discloses a hydraulic control system for an existing CVT or IVT. These publications also disclose the monitoring of certain system parameters to be fed directly back into the control circuit, either mechanically or electronically, to adapt the controls to the response of the transmission system to the existing control signal. Such feedback signals can provide very advantageous effects when utilized along with the control systems described above for use with the IVTs and CVTs described and incorporated herein, such as preventing hunting for the proper output speed, reducing overall time to achieve the desired speed change, and increased overall vehicle efficiency.

However, these applications describe control units that are utilized on toroidal or belt-and-pulley CVTs but that can be advantageously employed with many of the IVTs and CVTs described herein. Again, by removing the switching of clutches and brakes that must be accomplished in the past transmissions, all of the advantages disclosed in these published applications can be enhanced. The hydraulic controls that operate the sheaves or pulleys of these transmissions can be simplified to operate the hydraulic piston and cylinder control system used to control certain embodiments of the IVTs and CVTs as described above. Furthermore, the circuitry, controls and the functional signals that manipulate the clutches and brakes of these three published applications can be removed and replaced with a control regime that simply adjusts the ratio of the IVT or CVT throughout its entire range. Many of the IVTs and CVTs described herein also allow removal of the torque converter of the '924 application and any clutches that may be utilized with that advance. However, these components can still be utilized in certain embodiments as conditions may dictate.

For example, some embodiments utilize a clutch prior to the transmission that controls an amount of torque applied to the transmission, independent of the variability of the torque supplied by the engine. In many of such embodiments, control systems are utilized that adjust the clutch in order to prevent slippage of the rolling contact surface. U.S. Patent Application Publication No. 2003/0069682, the entire disclosure of which is hereby incorporated by reference, discloses a control system and protocol that is used by such embodiments to control and prevent slippage of the clutch and the transmission.

Control Protocols

In addition to these and other systems that can control a CVT or an IVT, there are many control protocols that can be utilized to maximize the advantages of such a transmission in a vehicle. Because of the inherent differences, and indeed advantages, of a CVT or an IVT as compared to a standard geared transmission, operational paradigms can be abandoned in order to achieve the increased efficiency and performance available from these advanced designs. Several advances have been made in the area of control protocols for CVTs or IVTs that can be implemented for use with many of the embodiments of the IVTs and CVTs described and incorporated herein. U.S. Pat. No. 5,820,513 (hereinafter "the '513 patent"), U.S. Patent Application Publication Nos. 2003/0229437 (hereinafter "the '437 application") and 2003/0022752 (hereinafter "the '752 application") relating to establishing operational protocols for controlling a CVT as engine speed varies, and U.S. Patent Application Publication No. 2002/0028722 (hereinafter "the '722 application") relating to a control system and protocol for an existing IVT, each disclose ways of controlling CVTs or IVTs, and the entire disclosures of all these publications are hereby incorporated by reference. These publications each describe systems and methods for operating a variator of a CVT that is used in a vehicle to optimize the performance of the vehicle; however, these publications only contemplate the use of existing toroidal or belt-and-pulley transmissions and therefore would benefit greatly from the implementation of many embodiments of the IVTs and CVTs described and incorporated herein.

There are other examples of control protocols and performance mapping methods that have been developed for existing CVTs and IVTs as well. For Example U.S. Patent Application Publication Nos. 2003/0119630 relating to mapping of CVT performance and function to develop shifting strategies, 2002/0165063 relating to controlling the emissions and treating the intake of the engine in conjunction with transmission controls for increased efficiency and/or performance, 2002/0062186 relating to operating a CVT while traveling uphill or downhill, 2002/0082758 relating to calculating a target speed ratio and controlling the CVT according to the target, the entire disclosures of all of which are hereby incorporated by reference, each disclose controlling methods and techniques that are employed for use with certain embodiments of the IVTs and CVTS described and incorporated herein.

Other examples of such control protocols that can be employed along with some of the IVT and CVT embodiments described herein are provided in U.S. Patent Application Publication Nos. 2002/0132697 relating to controlling a CVT having a multi-stage torque sensor, 2003/0022753 relating to simultaneous controlling of a CVT and an engine in response to a requirement for power output, 2003/0060681 relating to specific control equations for operating a toroidal CVT, 2003/0119627 relating to determining the transmission ratio of a CVT, 2003/0004030 relating to specific methods for operating a CVT for increasing efficiency and performance, 2002/0128115 and 2002/0115529 relating to establishing a target speed ratio and generating a creep torque based upon the difference between the target speed ratio and the actual speed ratio, and 2002/0072441 relating to compulsory down-shifting of the transmission based upon various conditions, the entire disclosures of all of which are hereby incorporated by reference. The embodiments utilizing one or more of these advances achieve various functionality and performance advantages that make these embodiments desirable for various applications. However, again, because these publications only contemplate either the toroidal or belt-and-pulley transmissions, they include control componentry and functionality to control the forward/reverse mechanisms and can be optimized for use with the embodiments described herein by removal of such components and functionality.

Again, these publications describe inventions that are improved through the benefits of the simpler and more versatile design of many of the present embodiments including the variator 1740 and transmission system 1700 described above and illustrated in FIG. 17. The collinear multiple power paths of the IVTs described herein provide not only smaller designs, with simpler torsional reactive forces, but as noted before, also allow shifting of the transmission throughout its entire range of ratios without the need for mode shifting brakes and clutches. In certain embodiments, this results in the input being connected to the output in the same manner over the entire range of transmission ratios, thereby leading to increased component life and performance as well as simpler bearing wear and other advantages. As a contrast, the IVT system of the '722 application requires the actuation of a recirculation clutch or a direct clutch depending on the particular driving conditions demanded by the driver. Furthermore, the enclosing case of many of the present embodiments described herein can be made in a much simpler manner as fewer bearing and support surfaces need to be incorporated into the case. In some embodiments of the present IVTs and CVTs that implement the control systems and protocols disclosed in the '513 patent, the '437 application, the '752 application and the '722 application, the control mechanisms and functions that actuate these clutches or brakes are removed from the control routines in order to simplify the control system and protocols. By doing so, these embodiments allow a simpler system and protocol for operating and controlling the IVTs or CVTs while still realizing all of the advantages of such transmissions.

Alternative Architecture

Certain embodiments also take advantage of other mechanical advances in transmission systems. For example, as stated above, multiple planetary gear sets can be combined to form compound systems of gearing to operate in unison with the CVT of certain embodiments of the IVT in order to add additional range or functionality to the resulting transmission system. U.S. Patent Application Publication No. 2002/0169048, the entire disclosure of which is hereby incorporated by reference, discloses compound planetary gear sets in order to facilitate the use of a toroidal CVT in an IVT, however, this publication also suggests how multiple planetary gear sets may be aligned or combined in order to functionally combine them. Through reference to the illustrations and accompanying descriptions of that publication, present IVT or gearing embodiments can be created that utilize such compound gearing.

Furthermore, U.S. Patent Application Publication No. 2003/0125153, the entire disclosure of which is hereby incorporated by reference, discloses a vehicle having power transmitted from the engine via a CVT to all four of its wheels. Embodiments of the IVTs or CVTs described herein are easily incorporated advantageously for use on such a vehicle power train for improved performance and to reduce maintenance associated with the transmission. Certain embodiments of IVTs and CVTs described and incorporated herein incorporate advances disclosed in U.S. Patent Application Publication No. 2003/0186769 relating to two planetary gear sets coupled to each other and to two variators in a compound arrangement, and the entire disclosure of that publication is hereby incorporated by reference. This compounding and the various modes available are good examples of how such combinations can be effectively incorporated in certain embodiments of the IVTs and CVTs described herein. U.S. Patent Application Publication No. 2003/0220167, the entire disclosure of which is also incorporated herein by reference, discloses a CVT that employs multiple sets of planet gears in its planetary gear set. Embodiments of the IVTs and CVTs described and incorporated herein utilizing multiple sets of planetary gears for additional transmission range and additional advantages benefit from the disclosure of this publication in carrying out such compounding.

Also, advances in planetary gears themselves are exploited by certain embodiments. For instance, certain embodiments utilize advances such as that described in U.S. Patent Application Publication No. 2003/0171183, the entire disclosure of which is hereby incorporated by reference. This publication discloses a speed ratio amplifier for use with advanced CVT and CVT control systems to amplify the speed changing effect of a planetary gear set. Embodiments of the IVTs and CVTs described and incorporated herein can achieve even greater ratio ranges for the transmission as a whole.

Related Technology

Additional technological advances can be implemented for use in the embodiments of the CVTs and/or IVTs 1700, 1800, 1900 or any other configuration of the variators 401, 1840, 1940 described herein or incorporated herein by reference (hereinafter, and in some cases above, referred to as "the CVTs/IVTs described and incorporated herein") as well. For instance, because the embodiments described herein are rolling traction forms of transmissions, lubrication is required for many embodiments and advances in the field of lubrication can be advantageously implemented to promote the proper and efficient operation of those embodiments. For example, the methods and systems of lubrication described in U.S. Patent Application Publication No. 2002/0183210 and U.S. Pat. No. 6,500,088 are employed in many embodiments to advantageously lubricate the transmissions of those embodiments, and the entire disclosure of both of those publications are hereby incorporated by reference. Additionally, the lube oils disclosed in U.S. Patent Application Publication No. 2003/0013619 are used in many embodiments as traction and lubricating oils, and the entire disclosure of that application is hereby incorporated by reference.

The lubricating systems of many embodiments, as well as the transmission components themselves can require additional heat dissipation. U.S. Pat. No. 5,230,258, which is hereby incorporated by reference in its entirety, discloses a method of providing cooling to the transmission. Certain embodiments utilize a casing that utilizes the cooling channels described therein in order to provide the proper amount of cooling to the lube oil and transmission components.

Furthermore, improvements that have been made for toroidal CVTs that relate to generation and control of axial traction force are employed in some embodiments. For example, the biasing mechanism described in U.S. Pat. No. 4,893,517, the entire disclosure of which is hereby incorporated by reference, is utilized in some embodiments of the CVTs where it replaces the more complex axial force generators ("AFGs") described herein and in some embodiments of the IVTs where it can easily be positioned on the output side of the variator or between the planet carrier and the input disc. The planet carrier of such embodiments can drive the cam flange of the AFG and the input disc is modified accordingly to accept the thrust and the torque from the cam flange. The improvements to such AFGs that are described in U.S. Pat. Nos. 6,287,235 and 6,514,171, the entire disclosures of both of which are hereby incorporated by reference, are utilized by some embodiments utilizing such AFGs.

Additionally, the double-sided preloading described in U.S. Pat. No. 4,968,289 (hereinafter "the '289 patent"), the entire disclosure of which is hereby incorporated by reference, is utilized in some embodiments where the preloading spring of that publication is positioned on the output side of the implementing IVT or CVT embodiment or is positioned on the same side as the cam flange. For instance, in some embodiments the preloading springs are located between the planet carrier and the case and apply force to the planet carrier that is transmitted to the input disc, while in other embodiments, the springs are located between the case and the second input disc in the dual cavity design, which applies a force against the input shaft as illustrated in the '289 patent. Many embodiments utilize the integral torque sensor disclosed in U.S. Patent Application Publication No. 2002/0111248, the entire disclosure of which is hereby incorporated by reference, as an input to control systems to adjust the axial force, for hydraulic and pneumatic AFG embodiments, or as an input for slip detection functions or for any other function.

A hydraulic AFG is utilized in some embodiments to carefully control the axial force applied according to the torque to be transmitted. U.S. Patent Application No. 2003/0100400 (hereinafter "the '400 application"), the entire disclosure of which is hereby incorporated by reference, discloses a hydraulic AFG. Some embodiments implement this design by creating a two part output disc having a piston part facing the ball and a cylinder part that houses the piston part and thereby creates a chamber between the two parts that is sealed dynamically, as illustrated in the '400 application. As pressure is applied to the chamber, the two parts tend to separate and the piston part is pressed against the balls. Other embodiments implement this by attaching the planet carrier to the cylinder part and forming the input disc as the piston part. In such embodiments, the axial force can be carefully planned over the range of torques to be applied, and more importantly, can be adjusted or corrected without changing the components of the AFG. U.S. Patent Application No. 2003/0109340, the entire disclosure of which is hereby incorporated by reference, discloses a dynamic seal that many embodiments implementing hydraulic AFGs utilize to improve their respective performances.

As another example of the implementation of advances made for toroidal CVTs, certain embodiments herein utilize the taper bearings described in U.S. Pat. No. 5,984,827 to act as combination bearings. Several combination thrust-radial bearings are described for use in the embodiments of the CVTs/IVTs described and incorporated herein, and many if not all such bearings can benefit through the implementation of advances in such bearing technology. Furthermore, some embodiments utilize one or more of the improvements to these AFGs disclosed in U.S. Pat. No. 5,027,669 related to implementation of an axially moveable shaft, U.S. Pat. No. 5,899,827 related to a loading cam design, U.S. Patent Application Publication No. 2003/0017907 related to lubrication of ball splines, U.S. Pat. No. 5,984,826 relating to retaining the biasing mechanism, U.S. Patent Application Publication No. 2002/0111244 disclosing a hydraulic AFG, U.S. Patent Application Publication No. 2003/0078133 related to a preloader accompanied by a hydraulic AFG and U.S. Pat. No. 5,027,668 related to creating a centrifugal lubrication reservoir at the AFG, all of which are hereby incorporated by reference in their respective entireties. U.S. Pat. No. 6,248,039, the entire disclosure of which is hereby incorporated by reference, discloses an improvement to the use of ball splines for the mounting of a disc to a shaft where the disc and the shaft can move axially with respect to one another. Some embodiments utilize this improvement for at least one of their splines, regardless of the AFG in use.

U.S. Pat. No. 6,312,356, the entire disclosure of which is hereby incorporated by reference, discloses a way to accommodate a certain amount of flexing of the input or output disc. Some embodiments of CVTs/IVTs described and incorporated herein utilize such an improvement on at least one of the input or output discs to accommodate a certain amount of elastic deformation of that traction disc, or those discs. U.S. Pat. No. 5,267,920 (hereinafter "the '920 patent") discloses the use of pilot holes to angularly align components during manufacture, and its entire disclosure is incorporated herein by reference. Certain embodiments described herein utilize pilot aligning holes as described in the '920 patent in order to correctly align the components of any or all of the variator, the AFG or any other components.

Several advances have been made in the treatment and preparation of materials for use in rolling traction CVTs and IVTs that are utilized by certain embodiments described herein as well. For instance, some of the bearings of some embodiments experience high load and/or high cycling and therefore benefit from bearing advances made for other mechanical applications. Some of the bearings that can experience high load and/or high cycling are the ball axle bearings (not separately identified in figures), the idler support bearings (items 17a, b and analogous bearings from other embodiments), and other similar bearings. For instance, some embodiments described herein utilize for one or more of their bearings, bearings made according to U.S. Patent Application Publication No. 2003/0219178, which is incorporated herein by reference in its entirety. Additionally, the rolling elements of some or all bearings of some embodiments are contained in bearing races formed according to U.S. Patent Application No. 2002/0068659 the entire disclosure of which is hereby incorporated by reference. Such bearing races can improve performance of the bearing over the life of the component.

In some embodiments, bearings that are expected to experience high levels of stress are treated as disclosed in U.S. Patent Application Publication No. 2002/0082133, the entire disclosure of which is hereby incorporated by reference. In some embodiments, at least a part of one or more of the input disc, output disc, balls, idler, or any of the high-stress bearings of the IVT or CVT is, or are, manufactured as described in any or all of U.S. Patent Application Publication Nos. 2002/0086767, 2003/0087723, 2003/0040401, 2002/0119858 and 2003/0013574, the entire disclosures of all of which are hereby incorporated by reference. In embodiments where the rolling contact surfaces of the input and output discs are detachable, the rolling surfaces are treated for hardness as disclosed by these publications while the input discs of some such embodiments are manufactured for strength and durability as disclosed. Furthermore, the bearing cages that retain many of the bearings of some embodiments are manufactured according to U.S. Patent Application Publication No. 2002/0151407, the entire disclosure of which is hereby incorporated by reference.

In addition to these material composition and treatment advances, some embodiments utilize technology that is specific to the field of rolling traction transmissions. For instance, the traction surface of either or both of the input and output discs disclosed in U.S. Pat. No. 6,527,667, the entire disclosure of which is hereby incorporated by reference, vary in roughness. Some embodiments herein apply such variation to at least one of the input disc, the output disc and the balls so that at certain ratios the active surface will have a different surface roughness than that for at least one different ratio. Similarly, at least one of the traction surfaces of some embodiments conforms to the disclosure of U.S. Pat. No. 6,524,212, which is hereby incorporated by reference in its entirety, to control and improve the traction oil film thickness.

In another manufacturing advancement, U.S. Patent Application Publication No. 2003/0096672, which is hereby incorporated by reference in its entirety, discloses the use of a datum on the output disc by which the rest of the disc is manufactured. In some embodiments, this concept has been incorporated and a radially flat surface is provided on the input and/or output disc that acts as an indexing origin for the manufacture and fitting of the rest of the disc(s). In some embodiments, this flat surface occurs near the inside bore.

U.S. Pat. No. 6,159,126, which is hereby incorporated by reference in its entirety, discloses a method of preventing a shock of a CVT where a vehicle's engine may start while the transmission has drifted away from the lowest ratio. Some embodiments utilize a biasing mechanism in order to mechanically return the transmission to a zero output or other desired orientation, according to the incorporated patent to prevent such a shock from occurring. In some embodiments utilizing hydraulic control systems, this is accomplished by a spring of appropriate biasing direction and force for the particular application.

Additional Applications

Many embodiments of the CVTs/IVTs described and incorporated herein are advantageously implemented in various applications such as agricultural, aerospace, aircraft, watercraft, industrial machinery and auto racing among others. Certain advances have been made that utilize existing CVT technology that would see increased performance that could not have been contemplated by the original inventors when those existing CVTs were replaced by the IVTs and CVTs of many embodiments, described herein. For example, U.S. Pat. No. 4,922,788 (hereinafter "the '788 patent"), the entire disclosure of which is hereby incorporated by reference, discloses the use of two IVTs for use on a twin track-driven vehicle, one IVT for each track. By changing the output rotation speed of each IVT independently, the operator can steer the vehicle without need for turning wheels or other steering system. The IVTs operate independently of one another to provide either forward or reverse rotation to their respective tracks to drive the vehicle. The existing IVTs utilized in the 788 patent suffer all of the same defects as described above, namely the toroidal CVT is inherently unstable and the ratio control system is also inherently unstable, and requires in any practical embodiment a parallel power path and clutches and brakes to perform its IVT function. Due to the inherently unstable design, the toroidal CVT requires significant structural strength for its support and to house its control system.

Therefore, the embodiments described herein provide smaller and simpler components that reduce cost, size maintenance and increase reliability. The embodiments herein allow use of CVTs and IVTs not only on heavy two track vehicles, but also on all of the wheels of tractors and light tractor equipment. A vehicle can be provided with a relatively small and lightweight transmission at every wheel to have all-wheel steering where the steering is provided by the transmission ratio of each particular transmission.

In another application, some embodiments of the CVTs/IVTs described and incorporated herein are used in place of the existing CVTs disclosed for use in U.S. Patent Application No. 2002/0165060 (hereinafter "the '060 application"), the disclosure of which is hereby incorporated by reference in its entirety. The torque distribution system described in the '060 application is greatly enhanced by the comparatively smaller CVTs and IVTs described herein and because the resulting input and output axes of such embodiments are collinear. Such an orientation makes embodiments of the present application an ideal candidate for use in the torque distribution system of the '060 application and indeed makes such a system even more practically feasible.

Figure 18:
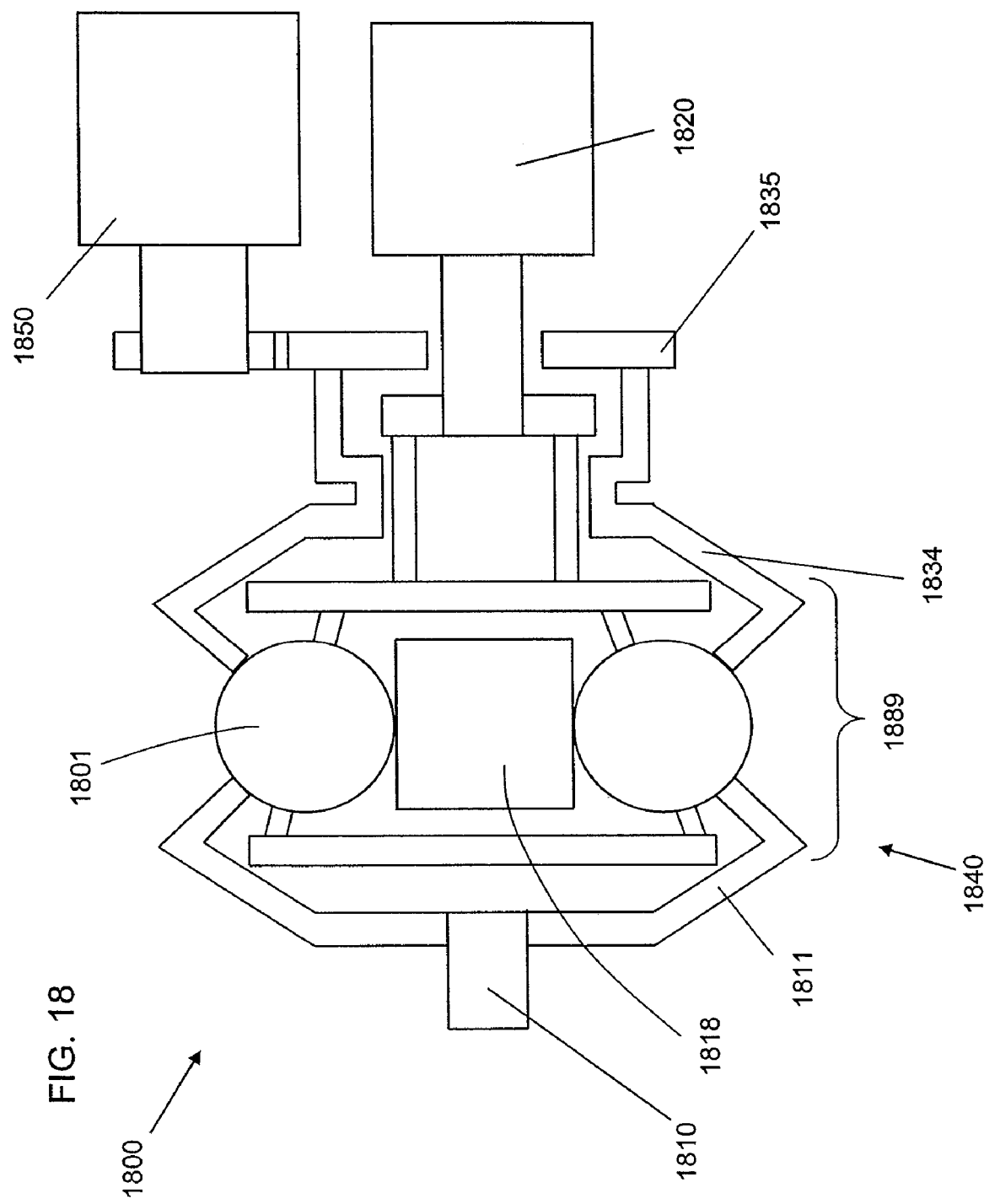
FIG. 18 is a schematic diagram of an embodiment of a transmission for use in a hybrid vehicle.

Another advantageous application of embodiments described herein is a hybrid vehicle, which is a vehicle with two power sources, as illustrated in FIG. 18. FIG. 18 is a schematic diagram of an embodiment that could be used for a hybrid vehicle without using a planetary gear set. For example, the combustion engine 1820 of a gas-electric hybrid can provide the input into the cage 1889 while the electric motor 1820 provides torque input to the input disc 1834. The variator 1840 sums the torque of the two inputs and provides a resulting output to the output shaft 1810. In an alternative embodiment, inputs are switched so that the combustion engine 1820 of the gas-electric hybrid provides the input into the input disc 1834 while the electric motor 1820 provides torque input to the cage 1889. In other alternative embodiments, a planetary gear set is adapted to the input side in a similar manner as that of FIG. 17 and torque is provided by the internal combustion engine 1820 directly to the cage 1889 through a bore (not shown) in the sun gear and the electric motor provides torque to the planet carrier, or vice versa. Such embodiments allow greater flexibility in designing a system that optimizes the efficiency of both torque sources, but add complication and cost to the transmission 1800. However, this arrangement is only one example of how the variator 1840 can be implemented in an IVT or CVT for use with a hybrid vehicle and it is understood that any of the possible combinations described in U.S. patent application Ser. No. 10/788,736 filed Feb. 26, 2004 or any other combinations that are evident to those of skill in the art can be used as well. For instance, one variator 1840 can be connected in series with another variator 1840 to increase the variation range of a transmission. Additionally, other planetary gear sets 505 can be added, which can be alternatively coupled to components of the variators 401, 1940 described herein and are manipulated with clutches or brakes as in many prior advancements to switch between configurations. This provides multiple operating modes or configurations in one transmission and is know in the art.

Figure 19:
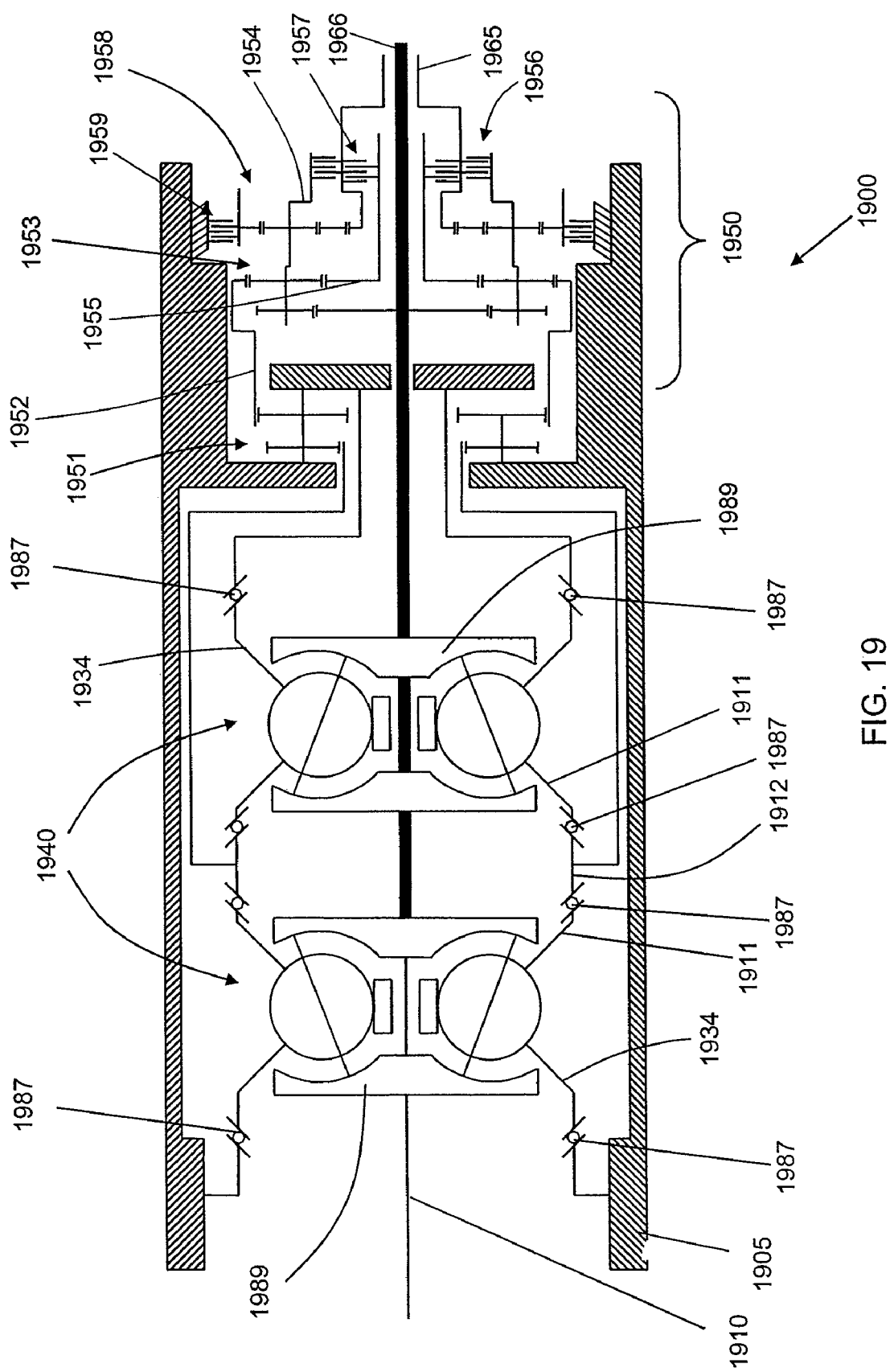
FIG. 19 is a schematic diagram of another embodiment of a transmission illustrating one possible kinematic configuration.

FIG. 19 illustrates another configuration of a transmission 1900; this one combining two variators 1940 with a standard planetary and reversing gear set 1950. This embodiment splits the torque transferred through two variators 1940 thereby reducing the amount of torque each variator 1940 transfers and thereby reducing the axial force each one requires to transfer its component of the overall torque. This reduced amount of axial force reduces many variator-based losses thereby increasing overall efficiency and allows for increased torque capacity. In this embodiment, torque is input into the transmission 1900 via an input shaft 1910 that connects to the cages 1989 of both variators 1940 and can also be configured to transfer power out of the transmission 1900 at some fixed ratio as well. The input discs 1934 of both variators 1940 are configured so that they are fixed and do not rotate, which is illustrated in FIG. 19 by connections to the case 1905. The torque is transferred out of the variators 1940 through the output discs 1911 and then to the planetary and reversing gear set 1950. In the illustrated embodiment, the transmission 1900 includes axial force generators (AFG) 1987 on both the input discs 1934 and the output discs 1911. The AFGs 1987 can be standard cam loading devices common in the automotive industry or any of those disclosed or incorporated herein.

The planetary and reversing gear set 1950 illustrated in the embodiment of FIG. 19 is comprised of a transfer gear 1951, which in this embodiment is a step-down gear but could also be a step-up gear. The transfer gear 1951 in this embodiment is connected to a planetary gear set 1953 of the planetary and reversing gear set 1950 via a ring gear 1952, but for different output speed requirements could be connected to the planet carrier 1954 or the sun gear 1955. A standard reversing gear set 1958 is adapted to the output of the planetary gear set 1953 and is activated to reverse the output direction by engaging a reversing clutch 1959. In this embodiment of the transmission 1900, the input torque is not only supplied to the cages 1989, but is also provided to the planetary and reversing gear set 1950 as well so that the planetary gear set 1953 sums or differentiates the torque components from the input shaft 1910 and the output discs 1911. Additionally, the planetary and reversing gear set 1950 is configured to provide output from the planet carrier 1954 or the sun gear 1955 by operation of the carrier clutch 1956 and the sun clutch 1957. Therefore, variable speed output torque is provided out of the transmission 1900 via a variable output shaft 1965 while output torque at the input speed is provided out of a fixed output shaft 1966. Such fixed ratio output is useful in several applications such as power takeoff units for tractors, or street sweepers, or lawn mowers, or any other application using a rotational speed that is the same as, or a fixed ratio difference from, the input torque.

U.S. Patent Application Publication No. 2003/0032515 (hereinafter "the '515 application") discloses a system for use in a gas-electric hybrid vehicle, and its entire disclosure is hereby incorporated by reference. However, the '515 application requires two electrical machines to operate, at any one time one acting as a motor and the other acting as a generator. Embodiments of the CVTs/IVTs described and incorporated herein are utilized in a vehicle as described in the '515 application, allowing removal of the variable gear ratio by the engine and the second machine. Therefore, this leads to a much simpler design.

For example, U.S. Pat. No. 5,489,001 (hereinafter "the '001 patent"), which is hereby incorporated by reference in its entirety, discloses a hybrid system wherein input energy is provided by more than one input, such as an internal combustion engine and an electrical motor/generator. In the systems described in the '001 patent, a differential gear system is utilized to accept power from the internal combustion engine and the electric motor and to distribute that power to the rest of the drive train and to the electric motor when it is not motoring but rather generating. This power distribution system can be improved through the use of many embodiments of the CVTs/IVTs described and incorporated herein. The embodiments described and incorporated herein are capable of accepting torque inputs from two sources such as in a hybrid vehicle and summing or otherwise distributing those components of torque to one or more outputs. For example, one or more of either input disc 1934, cages 1989 or output disc 1911 of the embodiment of FIG. 19 can be a rotor of an electric machine such that input can be via the cage 1989 and the input disc 1934 of that embodiment or any other suitable connection can be achieved as well.

The CVTs and IVTs described herein can be implemented in several existing hybrid vehicle drive systems. Various transmission systems are utilized in hybrid drive systems today. Some systems merely distribute torque from an electric motor and an internal combustion motor to the drive train. Other systems distribute torque from the motor and engine to the drive train and redistribute torque from the drive train to a generator, which in some cases is the same machine as the electric motor, to regenerate power as the vehicle brakes or slows. The CVTs/IVTs described and incorporated herein can be utilized in these systems in order to replace existing planetary gear sets that distribute or sum the torques in the systems or can be used to vary the speed of rotation of any of the outputs of the motor or engine or both, or the speed input to the generator in order to optimize the electrical power generation.

U.S. Pat. Nos. 5,513,719, 5,577,973, 5,585,595, 5,643,119, 5,895,333, 5,899,286, 6,146,302, 6,155,364 and 6,340,339 disclose a hybrid drive systems for a motor vehicle wherein rotational power is generated by an internal combustion engine (ICE) and an electric motor (EM). Each of these references is incorporated herein by reference in its respective entirety. In these systems, planetary gear sets are utilized to take torque from the EM and the ICE and sum that torque or otherwise distribute it. The planetary gear set or additional ones can be used to distribute torque into an electrical generator as well to regenerate power. The planetary variators 401, 1940 described herein operate as compound variable planetary gear sets and can be used to replace the planetary gear sets in the incorporated references by substituting the variators 401, 1940 for the planetary gear sets of these systems. Alternatively, any of the configurations of the variators 401, 1940 can be implemented as a designer may choose to achieve the optimal speed ratios of the components connected to the variators 401, 1940. The systems described in these incorporated references manage torque distribution from the prime movers and can easily be modified to include the CVTs/IVTs described in this specification and the accompanying figures to operate as the transmission downstream of the power distribution portion of these systems. Additionally, the highly configurable and variable nature of the variators 401, 1940 described and incorporated herein allows them to be utilized in the systems as both the power distribution mechanism and the speed varying mechanism.

Other types of hybrid systems are disclosed in U.S. Pat. Nos. 5,571,058 and 5,856,709, the entire disclosures of which are hereby incorporated by reference, where the output of an ICE and an EM are provided to a system of multiple planetary gear sets in order to provide variable configuration and variable speeds. The arrangements of multiple planetary gear sets are replaced in some embodiments by the CVTs/IVTs described or incorporated herein. The variators 401, 1940 at the heart of these embodiments can be connected to various components of these systems in any of the configurations described herein or incorporated herein. As described above, multiple configurations can be employed with the same variators 401, 1940 and one or more planetary gear sets where one or more clutches are utilized to selectively connect the components of the variators 401, 1940 to the components of the planetary gear sets. This allows the overall system to achieve a wider range of performance characteristics.

Another type of system in which the CVTs/IVTs described and incorporated herein can be effective are systems in which other types of CVTs are used. For instance, in U.S. Pat. No. 5,803,859, which is hereby incorporated herein by reference in its entirety, a power train is described including a continuously variable unit and a planetary gear set between the engine and the final drive. The variators 401, 1940 described herein can be implemented in such a system to replace both the continuously variable unit and the planetary gear set to get the functionality of both in a more compact package.

In another type of system described in U.S. Pat. No. 6,053,841, which is hereby incorporated by reference for all that it discloses, an electrical machine is incorporated into a distribution system using two toroidal CVTs to provide a range of speed outputs to two output shafts. The variators 401, 1940 described herein can easily replace the toroidal CVTs utilized in the system to increase torque capacity, decrease size and increase the simplicity of controls of this system.

Other systems for hybrid vehicles have been disclosed in which the present variators 401, 1940 can be advantageously implemented. For instance, U.S. Pat. No. 5,722,502, which is hereby incorporated by reference in its entirety, discloses a hybrid vehicle operating under parallel series hybrid vehicle (PSHV) and series hybrid vehicle (SHV) modes of operating an ICE an EM and a generator. The system described utilizes a torque distributing mechanism and a clutch and a brake in the drive line between the torque distributing mechanism and the motor, which then provides output torque to the drive train and the tires. The variators 401, 1940 disclosed herein can be advantageously implemented in this system as an alternate means of operating in PSHV mode wherein the variator(s) 401, 1940 sum the torque of the ICE and the EM rather than have the ICE drive the rotor of the EM, which can have adverse effects. Additionally, the CVTs/IVTs described and incorporated herein can be utilized downstream of the EM in order to provide for changing speed of the output torque as a multi-speed driveline not present in the system disclosed, which relies on the output speed of the EM to create the variable speeds. This reference also discloses a method of operating between the various operating modes and the configurable nature of the CVTs/IVTs disclosed and incorporated herein make them ideal for implementation in such a system.

Figure 20:
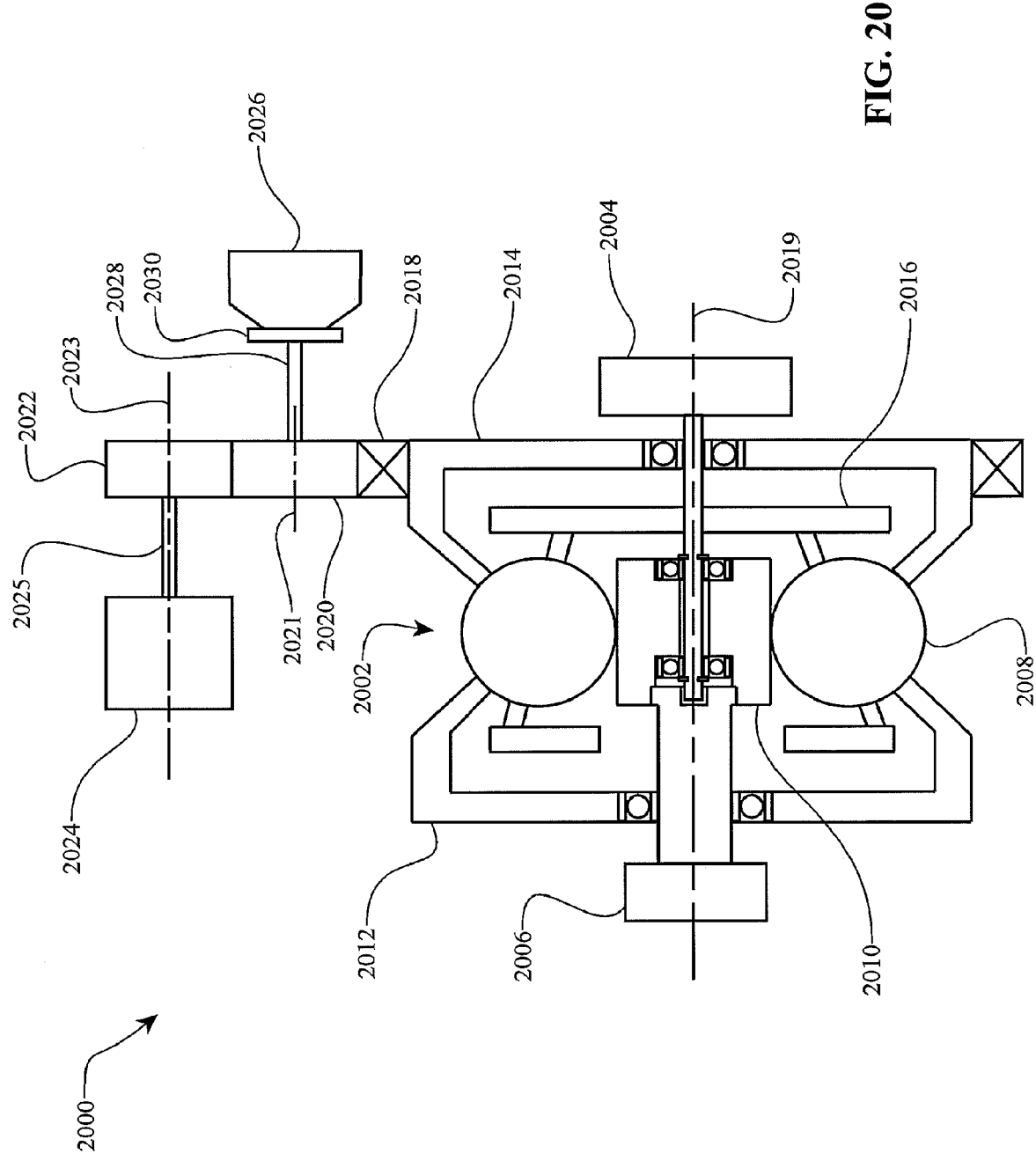
FIG. 20 is a schematic illustration of a transmission as embodied in a hybrid power train.

Referring now to FIG. 20, in one embodiment a hybrid powertrain 2000 can include a CVT 2002 coupled to a first source of rotational power, such as an internal combustion engine 2004. The CVT 2002 can also be coupled to an electric generator 2006. The CVT 2002 can be provided with a number of balls 2008. Each ball 2008 can have an internal, tiltable axis of rotation. In one embodiment, the CVT 2002 can include an idler 2010 located radially inward of, and coupled to, each of the balls 2008. The CVT 2002 can also be provided with a first disc 2012 and a second disc 2014, where each of the discs 2012 and 2014 are in contact with the balls 2008. In one embodiment, the CVT 2002 includes a cage 2016 that is configured to support each of the balls 2008. The cage 2016 can be adapted to rotate about a longitudinal axis 2019 of the CVT 2002. In one embodiment, the idler 2010 can couple to the electric generator 2006. In some embodiments, the cage 2016 can be selectively coupled to the internal combustion engine 2004. The hybrid powertrain 2000 can include a first gear 2018 coupled to the second disc 2014. The first gear 2018 can be arranged to have an axis of rotation that is coaxial with the second disc 2014, which is the longitudinal axis 2019. The first gear 2018 can couple to a second gear 2020 that has an axis of rotation 2021, which is parallel to the longitudinal axis 2019. In one embodiment, the hybrid powertrain 2000 can include a third gear 2022 coupled to the second gear 2020. The third gear 2022 can have an axis of rotation 2023 that is parallel to the axis 2021. In one embodiment, the third gear 2022 can be coupled to an electric motor 2024 via a motor shaft 2025. In some embodiments, the hybrid powertrain 2000 can include a differential 2026 coupled to the second gear 2020 via a counter shaft 2028, or any common torque transfer device. A fourth gear 2030 can couple to the counter shaft 2028 and to the differential 2026. In some embodiments, the fourth gear 2030 is a reduction gear that couples the counter shaft 2028 to the differential 2026.

Many systems for controlling the various modes of operation of hybrid vehicle drive systems are described in U.S. Pat. Nos. 5,935,040, 5,934,395, 6,003,626, 6,081,042, 6,098,733, 6,334,498, 6,476,571 and 6,520,879, which are incorporated herein by reference in their respective entireties. The systems described by these references control the operation of the hybrid drive systems. Some of these systems utilize multiple clutches and brakes to switch between various operating modes to provide output power from an ICE and an EM. Planetary gear sets are implemented in the described systems that can be replaced by the variable planetary drives described herein. The variators 401, 1940 can be advantageously implemented with one or more other variators 401, 1940 or planetary gear sets to achieve the same configurations described in these references or additional configurations with the additional variability, thereby reducing the number of planetary gear sets required to achieve the same functions in these systems. The control systems can then be easily modified to incorporate the configurations described and incorporated herein that are selected by the designer so that the resulting drive system can change between configurations and achieve the overall functionality that is desired.

U.S. Pat. Nos. 5,846,155, 6,306,057 and 6,344,008 describe hybrid vehicle drive systems in which rotational energy is managed at least in part by a CVT. In these systems, torque is generated by an ICE and an EM and is managed by a combination of planetary gears and a CVT. The embodiments of CVTs/IVTs described and incorporated herein can ideally be directly substituted in these systems for the CVTs that are currently being used in them to simplify the construction and minimize the size of the overall system. Otherwise, the variators 401, 1940 described herein can be implemented in these systems to replace the CVT of those systems and the planetary gear sets utilized in those systems as well.

The embodiments described herein are examples provided to meet the descriptive requirements of the law and to provide examples. The embodiments described herein are examples provided in order to explain and to facilitate the full comprehension and enablement of all that is disclosed herein and the description of these examples is not intended to be limiting in any manner. Therefore, the invention is intended to be defined by the claims that follow and not by any of the examples or terms used herein. Additionally, terms utilized herein have been used in their broad respective senses unless otherwise stated. Therefore, terms should not be read as being used in any restrictive sense or as being redefined unless expressly stated as such.

What is claimed is:

1. A power train comprising:
   a first source of rotational power;
   an electric generator;
   a plurality of balls, each ball having an internal axis of rotation configured to tilt in operation;
   a first disc in contact with the balls, the first disc configured to be nonrotatable;
   a second disc in contact with the balls;
   a rotatable cage adapted to support the plurality of balls axially and radially, the rotatable cage coupled to the first source of rotational power; and
   an idler in contact with the balls and located radially inward of the balls, the idler coupled to the electric generator.

2. The power train of claim 1, further comprising an electric motor operably coupled to the second disc.

3. The power train of claim 1, wherein the first source of rotational power is coupled coaxially with the rotatable cage.

4. The power train of claim 3, wherein the electric generator is coupled coaxially with the idler.

5. The power train of claim 4, further a first gear coupled to the second disc, the first gear mounted on a first axis that is coaxial with the second disc.

6. The power train of claim 5, further comprising a second gear coupled to the first gear, the second gear mounted on a second axis that is parallel to the first axis.

7. The power train of claim 6, further comprising an electric motor coupled to the second gear.

8. The power train of claim 7, further comprising a differential operably coupled to the second gear.

9. The power train of claim 8, wherein the electric motor comprises a shaft having a third axis that is parallel to the second axis.

10. The power train of claim 9, further comprising a third gear that couples the second gear to the shaft of the motor.

11. The power train of claim 10, further comprising a torque transfer means coupled to the second gear, and further comprising a fourth gear that couples said torque transfer means to the differential.

12. A power train comprising:
    an electric generator;
    an electric motor;
    an internal combustion engine;
    a plurality of balls, each ball having an internal axis of rotation configured to tilt in operation;
    a first disc in contact with the balls, the first disc configured to be nonrotatable;
    a second disc in contact with the balls, the second disc operably coupled to the electric motor;
    a rotatable cage adapted to support the plurality of balls axially and radially, the rotatable cage coupled to the internal combustion engine; and
    an idler in contact with the balls and located radially inward of the balls, the idler coupled to the electric generator.

13. The power train of claim 12, wherein the internal combustion engine is coupled coaxially with the rotatable cage.

14. The power train of claim 13, wherein the electric generator is coupled coaxially with the idler.

15. The power train of claim 14, wherein the electric motor is mounted on axis that is parallel to a rotational axis of the second disc.

16. A power train comprising:

a plurality of balls, each ball having an internal axis of rotation configured to tilt in operation;

a first disc configured to react a rolling movement of the balls, the first disc configured to be nonrotatable;

a second disc, the second disc configured to transfer torque to and/or from the balls;

a rotatable cage adapted to constrain axial and radial movements of the balls, the rotatable cage configured to transfer torque to and/or from the balls;

an idler located radially inward of the balls, the idler configured to transfer torque to and/or from the balls;

an electric generator coupled to the idler and mounted coaxially with the idler;

a first source of rotational power coupled to the second disc; and a second source of rotational power coupled to the rotatable cage.

17. The power train of claim 16, wherein the first source of rotational power comprises an electric motor.

18. The power train of claim 17, wherein the second source of rotational power comprise an internal combustion engine.

19. The power train of claim 18, wherein the electric motor comprises a motor shaft that is parallel to an axis of rotation of the second disc.

20. The power train of claim 19, further comprising a differential, and wherein the second disc is operably coupled to the differential.

* * * * *